United States Patent
Kang et al.

(10) Patent No.: US 8,852,002 B2
(45) Date of Patent: Oct. 7, 2014

(54) METHOD OF PROVIDING GAME APPLICATION AND IMAGE DISPLAY DEVICE USING THE SAME

(75) Inventors: Haengjoon Kang, Pyeongtaek-si (KR); Myongwon Suh, Pyeongtaek-si (KR); Rosa Andre, São Paulo (BR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/818,340

(22) PCT Filed: May 19, 2011

(86) PCT No.: PCT/KR2011/003712
§ 371 (c)(1),
(2), (4) Date: Feb. 22, 2013

(87) PCT Pub. No.: WO2012/026666
PCT Pub. Date: Mar. 1, 2012

(65) Prior Publication Data
US 2013/0150158 A1 Jun. 13, 2013

(30) Foreign Application Priority Data

Aug. 23, 2010 (KR) .................. 10-2010-0081318
Apr. 5, 2011 (KR) .................. 10-2011-0031060

(51) Int. Cl.
*A63F 13/00* (2014.01)
(52) U.S. Cl.
USPC .............................. 463/42; 463/25
(58) Field of Classification Search
CPC . G07F 17/32; G07F 17/3202; G07F 17/3223; G07F 17/3227; A63F 9/24
USPC ............................................. 463/16–42
See application file for complete search history.

(56) References Cited

U.S. PATENT DOCUMENTS

| | | | |
|---|---|---|---|
| 8,523,663 B2 * | 9/2013 | Gagner et al. .................. | 463/25 |
| 2007/0259709 A1 * | 11/2007 | Kelly et al. .................... | 463/20 |
| 2010/0041472 A1 * | 2/2010 | Gagner et al. .................. | 463/26 |
| 2010/0317442 A1 * | 12/2010 | Thomas et al. ................. | 463/42 |
| 2010/0323785 A1 * | 12/2010 | Motyl et al. ................... | 463/25 |
| 2011/0212766 A1 * | 9/2011 | Bowers et al. .................. | 463/25 |
| 2011/0212767 A1 * | 9/2011 | Barclay et al. ................. | 463/25 |
| 2012/0004026 A1 * | 1/2012 | Vann .............................. | 463/25 |
| 2012/0028714 A1 * | 2/2012 | Gagner et al. .................. | 463/42 |
| 2012/0028718 A1 * | 2/2012 | Barclay et al. ................. | 463/42 |
| 2012/0202587 A1 * | 8/2012 | Allen et al. .................... | 463/25 |

FOREIGN PATENT DOCUMENTS

| | | |
|---|---|---|
| JP | 2009-521301 | 6/2009 |
| KR | 10-2003-0060738 | 7/2003 |
| KR | 10-2005-0009953 | 1/2005 |
| KR | 10-2006-0122150 | 11/2006 |

OTHER PUBLICATIONS

International Search Report issued in PCT Application No. PCT/KR2011/003712 dated Apr. 4, 2012.

* cited by examiner

*Primary Examiner* — Masud Ahmed
(74) *Attorney, Agent, or Firm* — Ked & Associates LLP

(57) ABSTRACT

Disclosed herein are a method of providing a game application through an image display device and a user terminal connected over a network and a game application provision system employing the method. The method of providing the game application includes assigning a play identifier to the user terminal, executing the game application, generating game execution information, and transmitting the game execution information to the user terminal.

14 Claims, 35 Drawing Sheets

Fig. 18
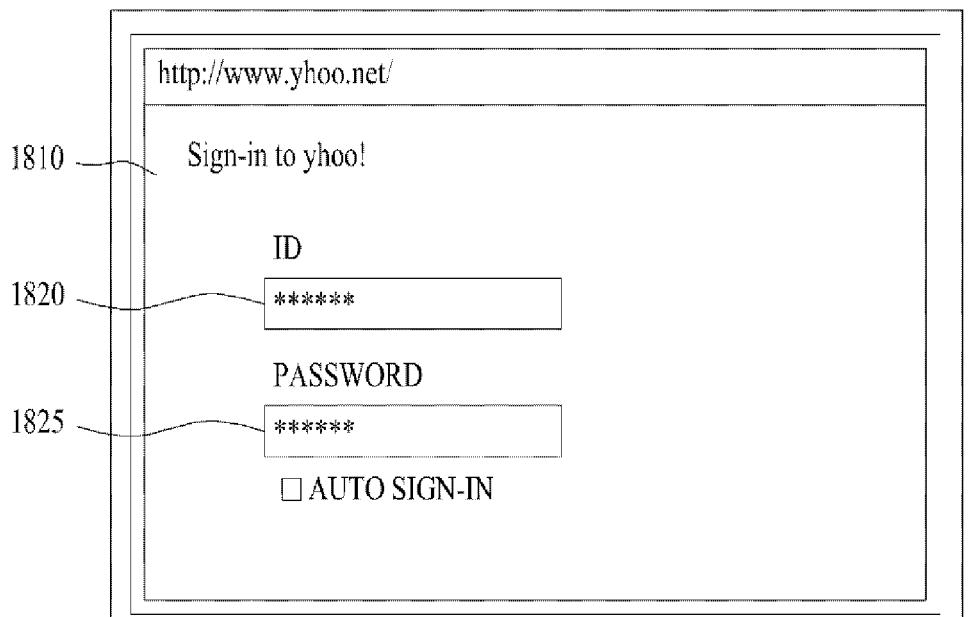
(a)
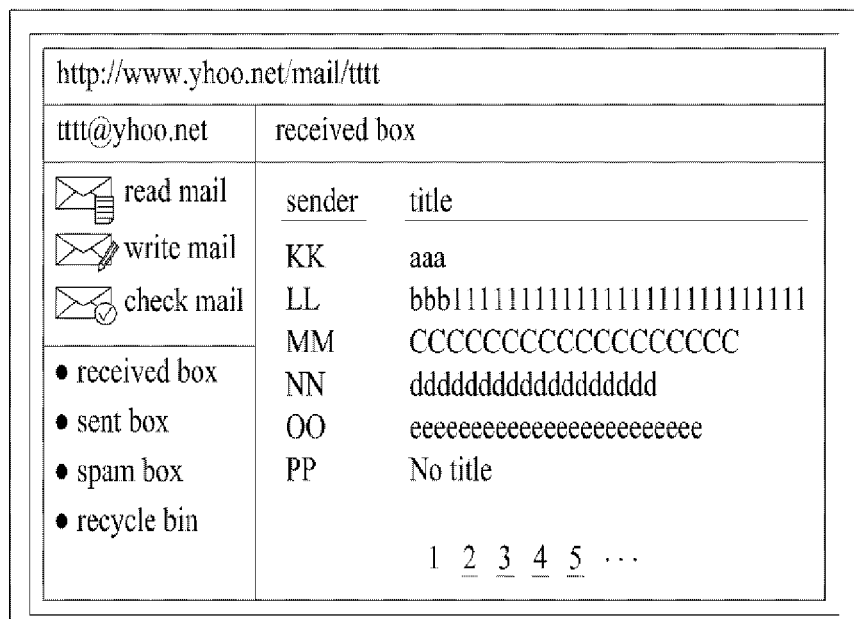
(b)

Fig. 32
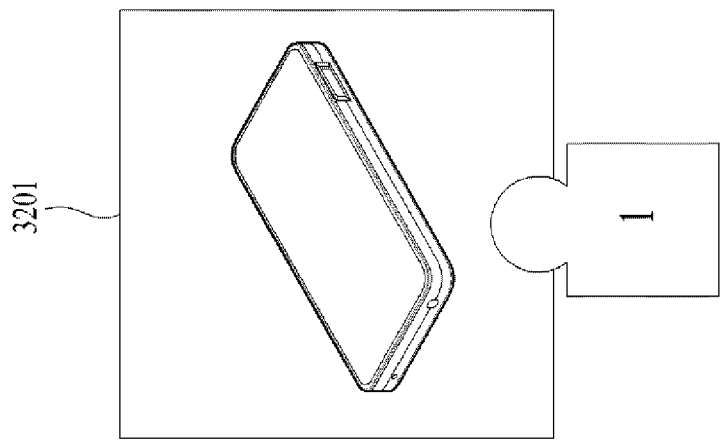
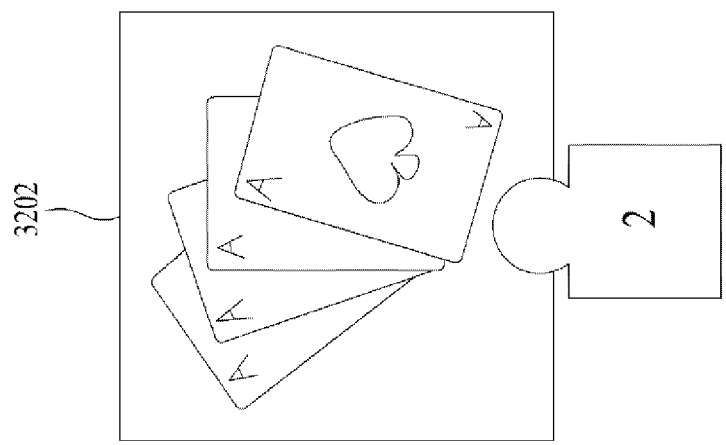
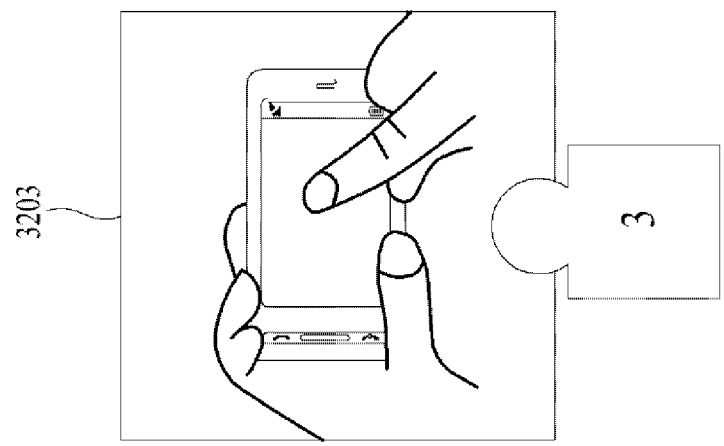

METHOD OF PROVIDING GAME APPLICATION AND IMAGE DISPLAY DEVICE USING THE SAME

TECHNICAL FIELD

The present invention relates to a method of providing a game application through an image display device and a user terminal connected over a network and an image display device using the method, and more particularly, to a method of providing a game application, which can assign a player identifier to a user terminal connected to an image display device over a network and output game execution information corresponding to the assigned player identifier through the user terminal, and an image display device using the method.

BACKGROUND ART

An image display device includes, for example, a function for receiving and processing a broadcast image viewable by a user. The image display device displays a broadcast, which is selected by the user from among broadcast signals transmitted from a broadcast station, on a display. Currently broadcasters are transitioning from analog to digital broadcasting.

Digital broadcasting refers to broadcasting of digital video and audio signals. The digital broadcast has low data loss due to robustness against external noise, error correction, high resolution and a high-definition screen, as compared with an analog broadcast. In addition, digital broadcasting can provide a bidirectional service unlike analog broadcasting.

In order to use digital broadcasting including a variety of content, the performance of an image display device has been improved and the function thereof has been diversified. As the performance of the image display device has been improved, various functions of the image display device, such as gaming, music listening or Internet shopping, using various applications can be performed in addition to a function for receiving an image signal from a broadcast station and viewing a broadcast.

In the case where a game application is used in a conventional image display device, a plurality of players plays the game using one display. Thus, each player may not be suitably displayed on a game screen. In general, since a remote controller of the image display device is used as a game controller, the number of input keys of the remote controller is restricted and key input is inconvenient. Thus, it is difficult to smoothly play the game.

Accordingly, there is a need for a method of providing a game application through an image display device and a user terminal connected over a network such that the game application is used using separate user terminals and an image display device using the same, in order to solve the problems of the conventional image device.

DISCLOSURE OF INVENTION

Technical Problem

An object of the present invention devised to solve the problem lies in a method of providing a game application through an image display device and a user terminal connected over a network such that the game application is smoothly used in the image display device, and an image display device using the same.

Another object of the present invention devised to solve the problem lies in a game play information notification method using an image display device and a user terminal connected over a network, which can store game play information of a game application executed on the image display device in a server connected to the network and output a notification message to the image display device if the stored game play information is changed such that a user recognizes changed information of the game play information without executing the game application, and an image display device using the same.

Solution to Problem

The object of the present invention can be achieved by providing a method of providing a game application of an image display device connected to predetermined user terminals over a network, including assigning a play identifier to the user terminal, executing the game application, generating game execution information, and transmitting the game execution information to the user terminal.

In another aspect of the present invention, provided herein is a game play information notification method of an image display device connected over a network, including receiving a first game play information of an user, receiving a second game play information of the user, checking a change regarding an user ranking information between the first game information and the second game information, and transmitting a notification message regarding the change to an image display device, when the user ranking information is changed.

In a further aspect of the present invention, provided herein is an image display device for executing a game application, including a display configured to display a play screen of the game application, a network interface configured to transmit or receive data to or from predetermined user terminals connected to the image display device over a network, and a controller configured to assign a play identifier to at least one user terminal, execute the game application, generate game execution information, transmit the game execution information corresponding to the player identifier assigned to each of the user terminals, and receive a game play signal from each of the user terminals.

Advantageous Effects of Invention

According to the present invention, it is possible to utilize a user terminal as a game controller without further providing a separate game controller to an image display device.

According to the present invention, by utilizing a separate user terminal as a game controller only by simple setting in an image display device, it is possible to provide a separate game screen to each player and easily input a game play command.

According to the present invention, it is possible to identify change information of game play information while performing another operation using an image display device, even when a user does not execute a game application.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 18 is a diagram showing a fourth embodiment of a UI in either of the image display devices according to the embodiments of the present invention.

FIG. 32 is a diagram showing a game play signal input method according to an embodiment of the present invention.

BEST MODE FOR CARRYING OUT THE INVENTION

Exemplary embodiments of the present invention will be described with reference to the attached drawings.

The terms "module" and "unit" attached to describe the names of components are used herein to help the understanding of the components and thus should not be considered as having specific meanings or roles. Accordingly, the terms "module" and "unit" may be used interchangeably.

An image display device as set forth herein is an intelligent image display device equipped with a computer support function in addition to a broadcast reception function, for example. Since an Internet function is added to a broadcast reception function, the image display device may have user-friendly interfaces such as a handwriting input device, a touchscreen, or a pointing device. Further, because the image display device supports wired or wireless Internet, it is capable of e-mail transmission/reception, Web browsing, banking, gaming, etc. by connecting to the Internet or a computer. To implement these functions, the image display device may operate based on a standard, general-purpose Operating System (OS).

Various applications can be freely added to or deleted from, for example, a general-purpose OS kernel of the image display device according to the present invention. Therefore, the image display device may perform a number of user-friendly functions. The image display device may be a network TV, a Hybrid broadcast broadband TV (HBBTV), a smart TV, etc. for example. The image display device is also applicable to smart phones.

Embodiments of the present invention will be described in detail with reference to the attached drawings, but it should be understood that they are merely illustrative of the present invention and should not be interpreted as limiting the scope of the present invention.

In addition, although the terms used in the present invention are selected from generally known and used terms, some of the terms mentioned in the description of the present invention, the detailed meanings of which are described in relevant parts of the description herein, have been selected at the discretion of the applicant. Furthermore, the present invention must be understood, not simply by the actual terms used but by the meanings of each term lying within.

Figure 1:
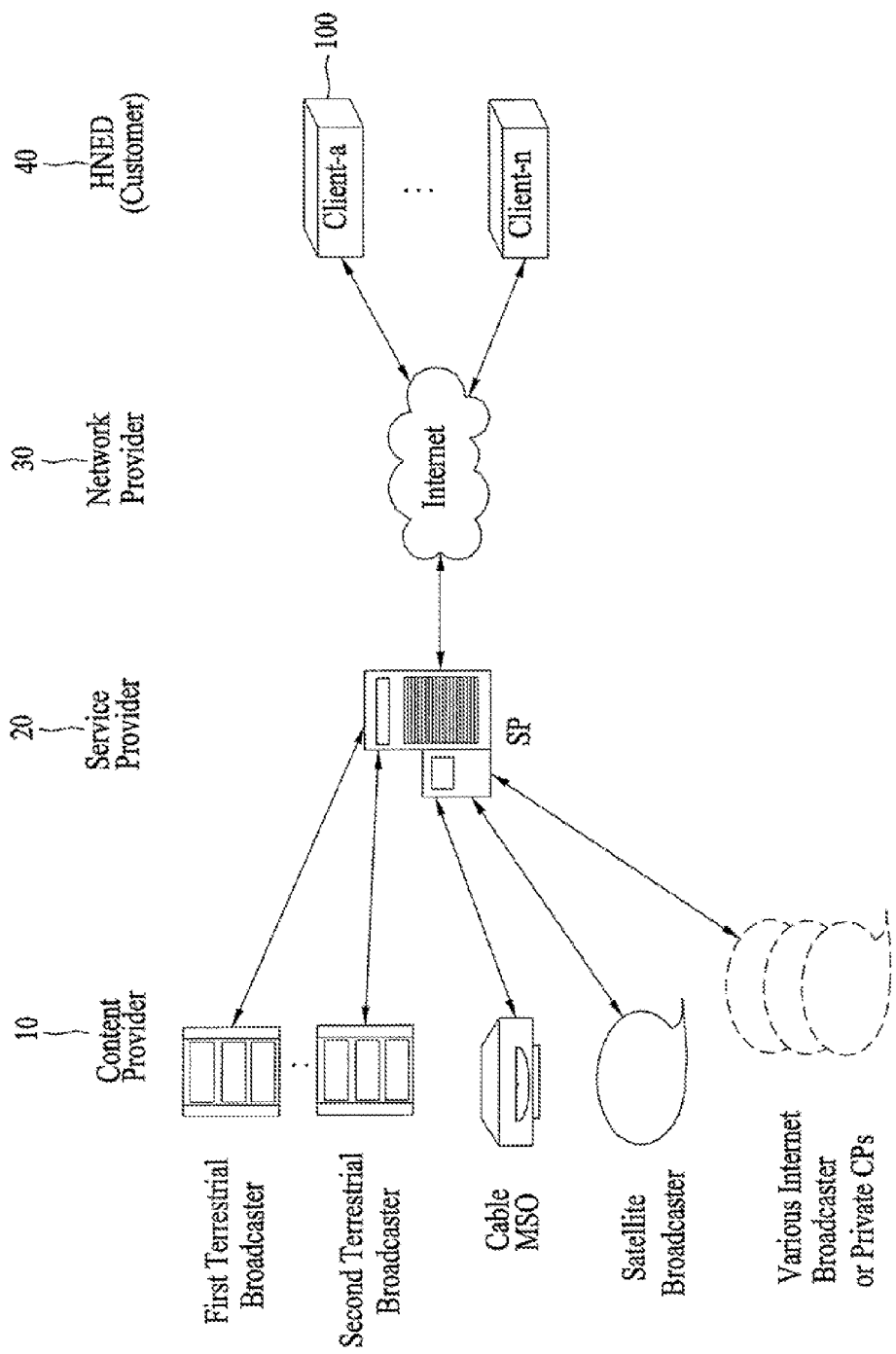
FIG. 1 is a schematic diagram showing an example of a broadcast system including an image display device according to an embodiment of the present invention.

FIG. 1 illustrates the overall configuration of a broadcast system including an image display device according to an embodiment of the present invention.

As shown in FIG. 1, the broadcast system including the image display device according to the embodiment of the present invention may include a Content Provider (CP) 10, a Service Provider (SP) 20, a Network Provider (NP) 30, and a Home Network End Device (HNED) 40. The HNED 40 corresponds to, for example, a client 100 which is an image display device according to an embodiment of the present invention. The client 100 corresponds to the image display device according to the embodiment of the present invention, and the image display device may be a network TV, a smart TV, an Internet Protocol TV (IPTV), etc.

The CP 10 creates and provides a variety of content. The CP 10 may be, for example, a terrestrial broadcaster, a cable System Operator (SO) or Multiple System Operator (MSO), a satellite broadcaster, or an Internet broadcaster, as illustrated in FIG. 1.

Besides broadcast content, the CP 10 may provide various applications, which will be described later in detail.

The SP 20 may provide content received from the CP 10 as a service package. For instance, the SP 20 may package first terrestrial broadcasts, second terrestrial broadcasts, cable MSOs, satellite broadcasts, various Internet broadcasts, and applications and provide the package to users.

The SP 20 may unicast or multicast a service to the client 100. Unicast is a form of transmission in which data is sent from only one transmitter to only one receiver. In an example of unicast transmission, upon receipt of a request for data from a receiver, a server transmits the data to only one receiver. Multicast is a type of transmission or communication in which a transmitter transmits data to a group of receivers. For example, a server may transmit data to a plurality of pre-registered receivers at one time. For multicast registration, the Internet Group Management Protocol (IGMP) may be used.

The NP 30 may provide a network over which a service is provided to the client 100. The client 100 may construct a home network end user (HNED) and receive a service over the HNED.

Content transmitted in the above-described system including the image display device may be protected through conditional access or content protection. CableCard and Downloadable Conditional Access System (DCAS) are examples of such conditional access or content protection systems.

The client 100 may also transmit content over a network. In this case, the client 100 serves as a CP and thus the CP 10 may receive content from the client 100. Therefore, an interactive content service or data service can be provided.

Figure 2:
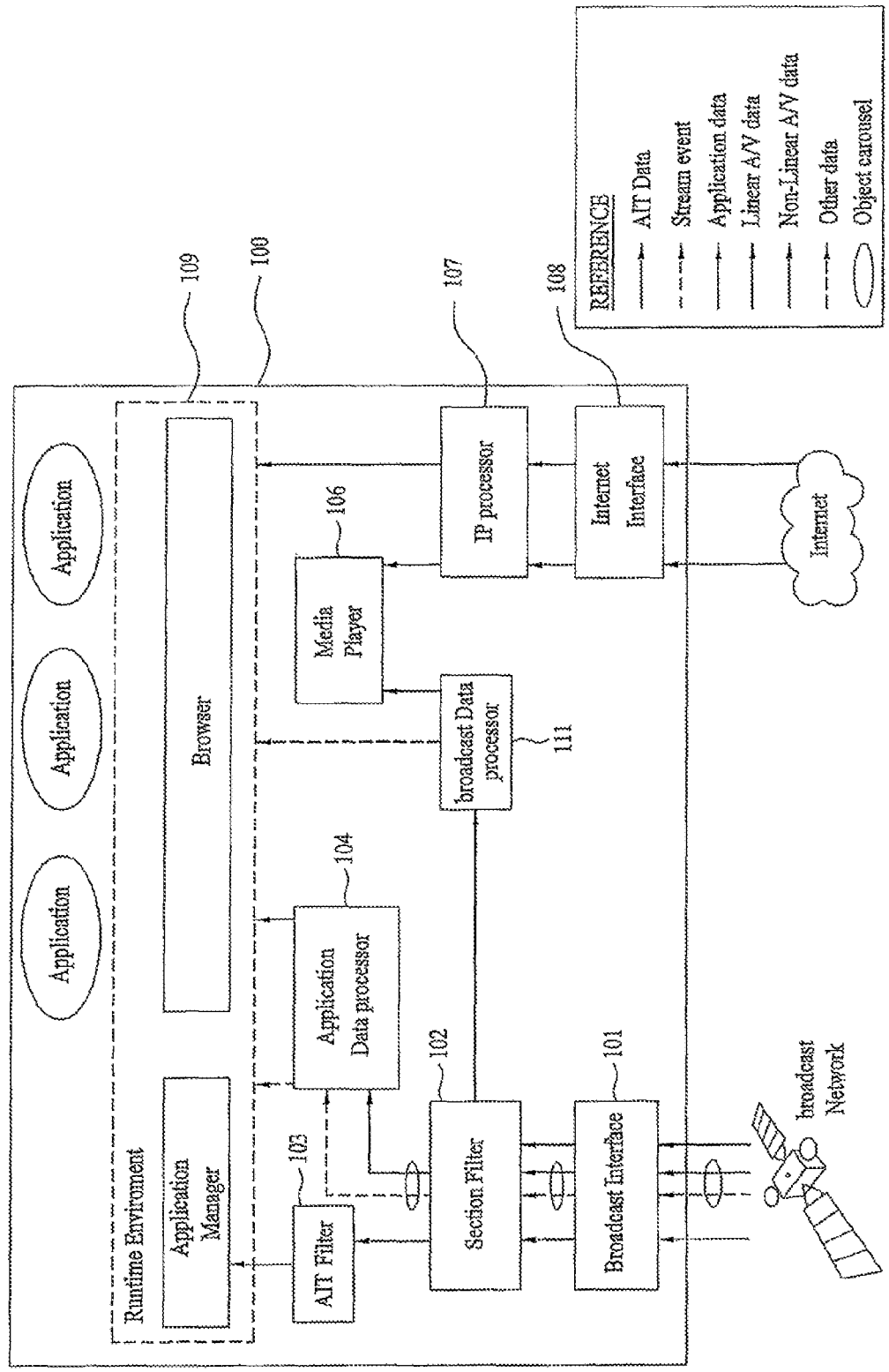
FIG. 2 is a schematic diagram showing another example of a broadcast system including an image display device according to another embodiment of the present invention.

FIG. 2 illustrates the overall configuration of a broadcast system including an image display device according to another embodiment of the present invention.

As shown in FIG. 2, the image display device 100 according to another embodiment of the present invention is connected to a broadcast network and the Internet. The image display device 100 is, for example, a network TV, a smart TV, an HBBTV, etc.

The image display device 100 includes, for example, a broadcast interface 101, a section filter 102, an Application Information Table (AIT) filter 103, an application data processor 104, a broadcast data processor 111, a media player 106, an Internet Protocol (IP) processor 107, an Internet interface 108, and a runtime module 109.

The image display device 100 receives AIT data, real-time broadcast content, application data, and stream events through the broadcast interface 101. The real-time broadcast content may be referred to as linear Audio/Video (A/V) content.

The section filter 102 performs section filtering on the four types of data received through the broadcast interface 101, and outputs the AIT data to the AIT filter 103, the linear A/V content to the broadcast data processor 111, and the stream events and application data to the application data processor 104.

Meanwhile, the image display device 100 receives non-linear A/V content and application data through the Internet interface 108. The non-linear A/V content may be, for example, a Content On Demand (CoD) application.

The non-linear A/V content and the application data are transmitted to the media player 106 and the runtime module 109, respectively.

The runtime module 109 includes, for example, an application manager and a browser as illustrated in FIG. 2. The application manager controls the life cycle of an interactive application using the AIT data, for example. The browser displays and processes the interactive application.

The game application according to one embodiment of the present invention is received through the broadcast interface 101 or the Internet interface 108 shown in FIG. 2.

The game application received through the broadcast interface 101 is transmitted to the runtime module 109 through the application data processor 104. The game application received through the Internet interface 108 is transmitted to the runtime module 109 through the IP processor 107.

The runtime module 109 executes the game application.

Figure 3:
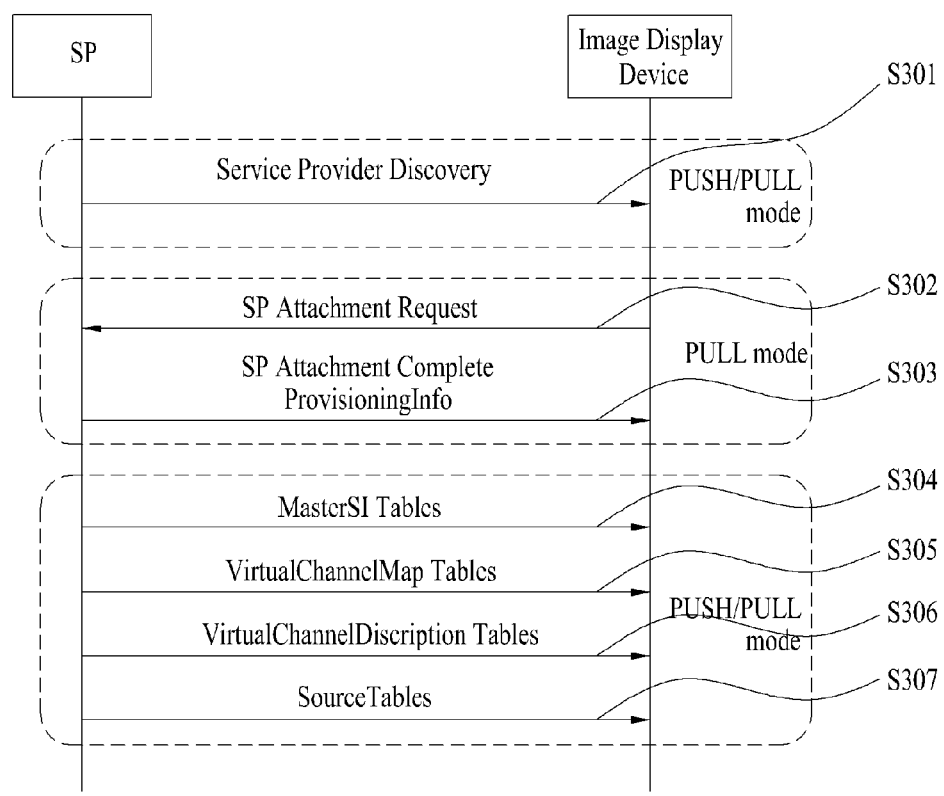
FIG. 3 is a diagram showing steps in which the image display device shown in FIG. 1 or 2 accesses a service provider and receives channel information, etc.

FIG. 3 is a diagram showing steps in which the image display device shown in FIG. 1 or 2 accesses an SP and receives channel information, etc. FIG. 3 is purely exemplary and the method shown in FIG. 3 does not limit the scope of the present invention.

The SP performs an SP discovery operation (S301). The image display device transmits an SP attachment request signal (S302). Upon completion of attachment to the SP, the image display device receives provisioning information from the SP (S303). Further, the image display device receives Master System Information (SI) Tables (S304), receives Virtual Channel Map Tables (S305), receives Virtual Channel Description Tables (S306), and receives Source Tables from the SP (S307).

More specifically, SP Discovery is a process by which SPs that provide IPTV services search for servers providing services to the SPs.

In order to receive information (e.g., SP discovery information) about the service discovery (SD) servers, an SD server address list can be detected, for example, using three methods, specifically use of an address preset in the image display device or an address manually set by a user, Dynamic Host Configuration Protocol (DHCP)-based SP Discovery, and Domain Name System Service (DNS SRV)-based SP Discovery. The image display device accesses a specific SD server using the SD server address list obtained through one of the above three methods and receives an SP Discovery record from the specific SD server. The Service Provider Discovery record includes information needed to perform Service Discovery on an SP basis. The image display device then starts a Service Discovery operation using the SP Discovery record. These operations can be performed in a push mode or a pull mode.

The image display device accesses an SP attachment server specified by an SP attachment locator included in the SP Discovery record and performs a registration procedure (or a service attachment procedure).

Further, after accessing an authentication service server of an SP specified by an SP authentication locator and performing an authentication procedure, the image display device may perform a service authentication procedure.

Once service attachment is successfully completed, a server may transmit data to the image display device in the form of a provision information table.

During service attachment, the image display device may include an Identifier (ID) and location information thereof in data and transmit the data to the service attachment server. Thus the service attachment server may specify a service that the image display device has subscribed to based on the ID and location information. In addition, the service attachment server provides, in the form of a provisioning information table, address information from which the image display device can obtain Service Information (SI). The address information corresponds to access information about a Master SI Table. This method facilitates provision of a customized service to each subscriber.

The SI is divided into a Master SI Table record for managing access information and version information about a Virtual Channel Map, a Virtual Channel Map Table for providing a list of services in the form of a package, a Virtual Channel Description Table that contains details of each channel, and a Source Table that contains access information about actual services.

The image display device shown in FIG. 3 receives the game application according to the embodiment of the present invention from the SP or a virtual channel provided by a broadcast station.

Figure 4:
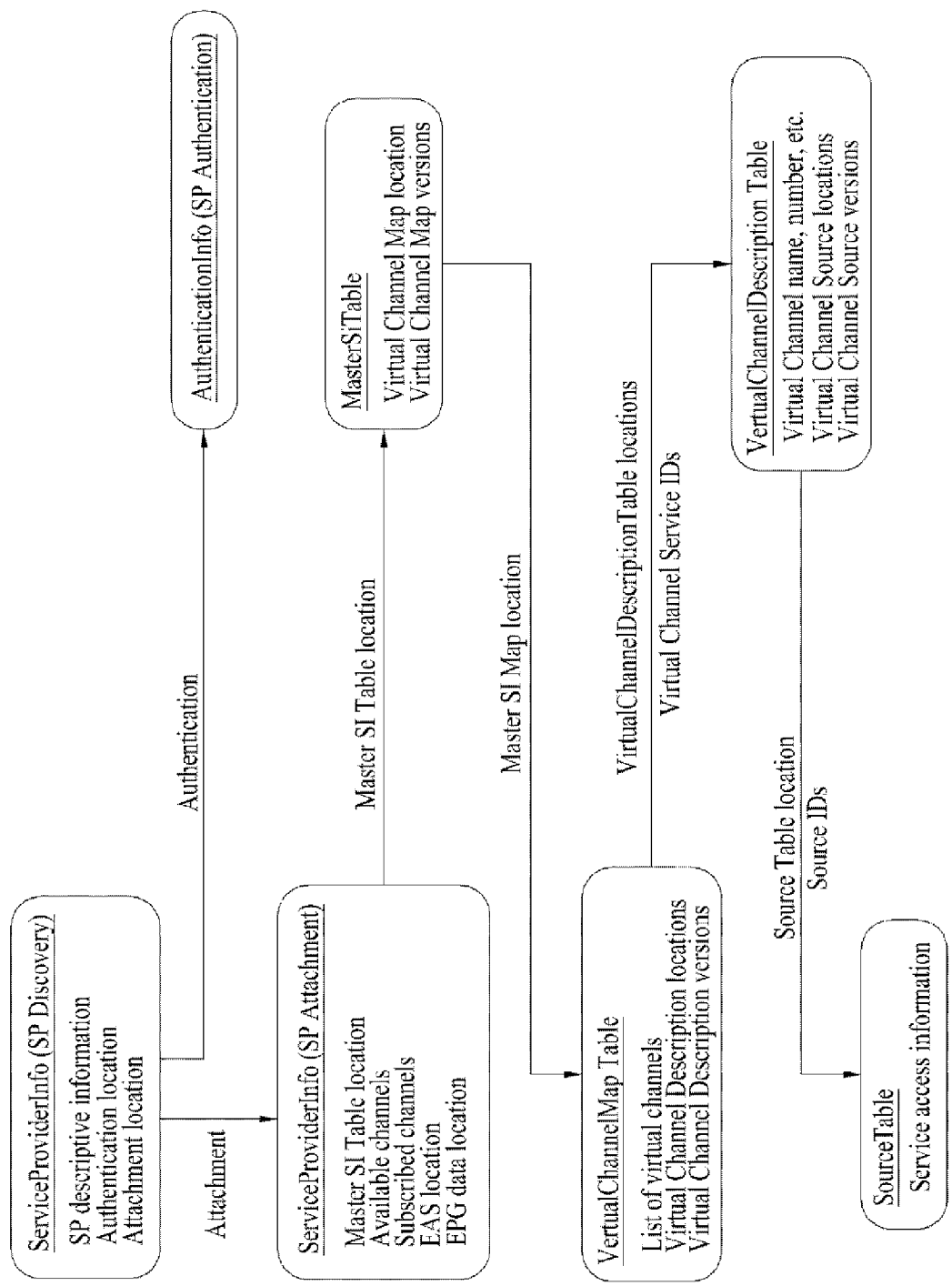
FIG. 4 is a diagram showing an example of data used in the steps shown in FIG. 3.

FIG. 4 is a diagram showing an example of data used in the steps shown in FIG. 3.

FIG. 4 is a detailed diagram of FIG. 3, illustrating a relationship among data in the SI.

A Master SI Table contains information about the location and version of each Virtual Channel MAP.

Each Virtual Channel MAP is identified by its Virtual Channel MAP identifier. Virtual Channel MAP Version specifies the version number of the Virtual Channel MAP. If any of the tables connected to the Master SI Table shown in FIG. 4 in the arrowed direction is modified, the versions of the modified table and overlying tables thereof (up to the Master SI Table) are incremented. Accordingly, a change in any of the SI tables can be readily identified by monitoring the Master SI Table.

For example, when the Source Table is changed, the version of the Source Table is incremented and the version of the Virtual Channel Description Table that references the Source Table is also incremented. In conclusion, a change in any lower table leads to a change in its higher tables and, eventually, a change in the Master SI Table.

One Master SI Table may exist for each SP. However, in the case where service configurations differ for regions or subscribers (or subscriber groups), an SP may have a plurality of Master SI Tables in order to provide a customized service on a unit basis. Thus it is possible to efficiently provide a customized service to a subscriber through the master SI table according to a region in which the subscriber is located and subscriber information regarding the subscriber.

A Virtual Channel Map Table may contain one or more virtual channels. A Virtual Channel Map includes not only details of the channels but information about the locations of the details of the channels. In the Virtual Channel Map Table, Virtual Channel Description Location specifies the location of a Virtual Channel Description Table including the details of the channels.

The Virtual Channel Description Table contains the details of the virtual channels. The Virtual Channel Description Table can be accessed using the Virtual Channel Description Location of the Virtual Channel Map Table.

A Source Table provides information necessary to access actual services (e.g. IP addresses, ports, AV Codecs, transmission protocols, etc.) on a service basis.

The above-described Master SI Table, the Virtual Channel Map Table, the Virtual Channel Description Table and the Source Table are delivered in four logically separate flows, in a push mode or a pull mode. For version management, the Master SI Table may be multicast and thus version changes can be monitored by receiving a multicast stream.

Figure 5:
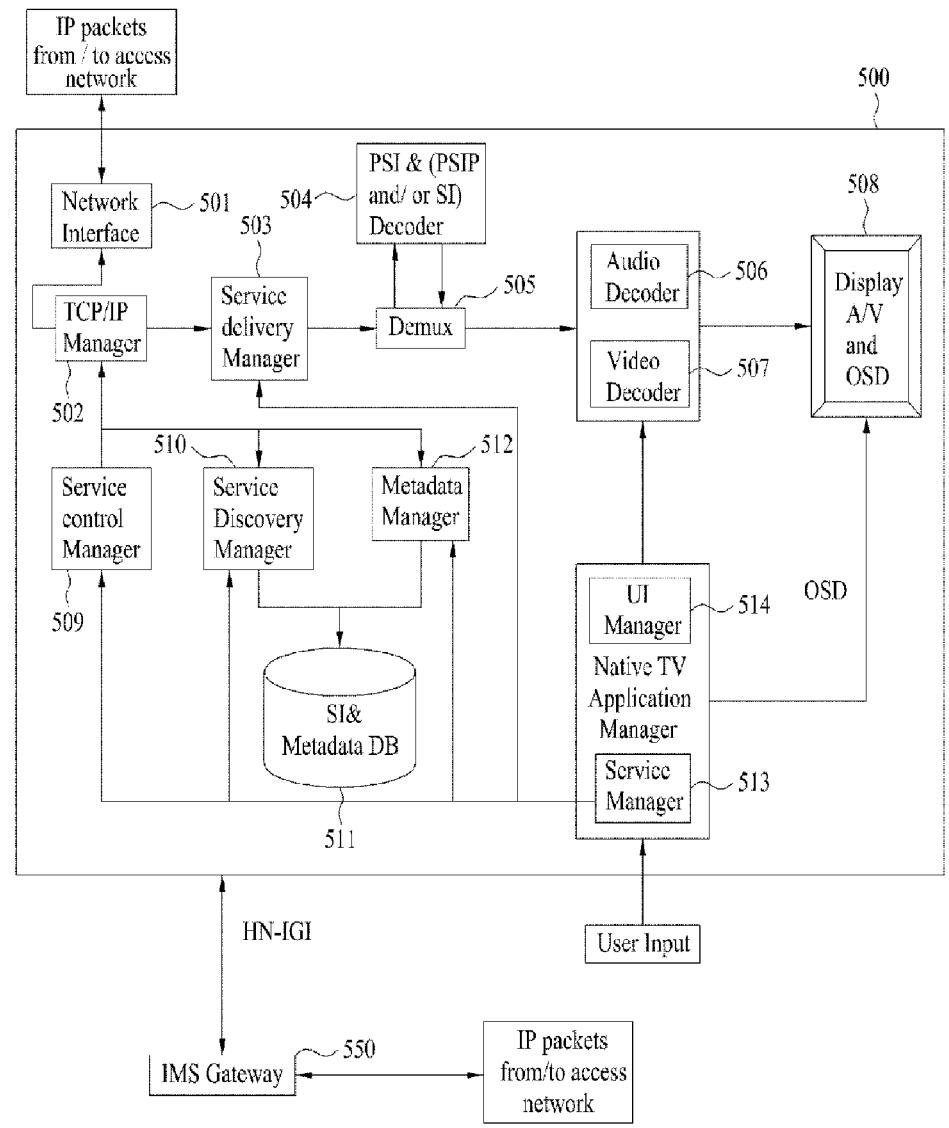
FIG. 5 is a diagram showing an example of the image display device shown in FIG. 1 or 2 in greater detail.

FIG. 5 is a detailed block diagram of the image display device shown in FIG. 1 or 2 according to an embodiment of the present invention. The structure of the image display device in FIG. 5 is purely exemplary and should not be interpreted as limiting the scope of the present invention.

An image display device 500 includes a network interface 501, a Transmission Control Protocol/Internet Protocol (TCP/IP) manager 502, a service delivery manager 503, a demultiplexer (DEMUX) 505, a Program Specific Information (PSI) & (Program and System Information Protocol (PSIP) and/or SI) decoder 504, an audio decoder 506, a video decoder 507, a display A/V and OSD module 508, a service control manager 509, a service discovery manager 510, a metadata manager 512, an SI & metadata database (DB) 511, a User Interface (UI) manager 514, and a service manager 513.

The network interface 501 transmits packets to and receives packets from a network. Specifically, the network interface 501 receives services and content from an SP over the network.

The TCP/IP manager 502 is involved in packet reception and transmission of the image display device 500, that is, packet delivery from a source to a destination. The TCP/IP manager 502 classifies received packets according to appropriate protocols and outputs the classified packets to the service delivery manager 505, the service discovery manager 510, the service control manager 509, and the metadata manager 512.

The service delivery manager 503 controls reception of service data. For example, when controlling real-time streaming data, the service delivery manager 503 may use the Real-time Transport Protocol/Real-time Transport Control Protocol (RTP/RTCP). If real-time streaming data is transmitted over RTP, the service delivery manager 503 parses the received real-time streaming data using RTP and transmits the parsed real-time streaming data to the DEMUX 505 or stores the parsed real-time streaming data in the SI & metadata DB 511 under the control of the service manager 513. In addition, the service delivery manager 503 feeds back network reception information to a server that provides the service using RTCP.

The DEMUX 505 demultiplexes a received packet into audio data, video data and PSI data and transmits the audio data, video data and PSI data to the audio decoder 506, the video decoder 507, and the PSI & (PSIP and/or SI) decoder 504, respectively.

The PSI & (PSIP and/or SI) decoder 504 decodes SI such as PSI. More specifically, the PSI & (PSIP and/or SI) decoder 504 receives and decodes PSI sections, PSIP sections or SI sections demultiplexed by the DEMUX 505.

The PSI & (PSIP and/or SI) decoder 504 constructs an SI DB by decoding the received sections and stores the SI DB in the SI & metadata DB 511.

The audio decoder 506 and the video decoder 507 decode the audio data and the video data received from the DEMUX 505 and output the decoded audio and video data to a user through the display A/V and OSD module 508.

The UI manager 514 and the service manager 513 manage the overall state of the image display device 500, provide UIs, and manage other managers.

The UI manager 514 provides a Graphical User Interface (GUI) in the form of an OSD and performs a reception operation corresponding to a key input received from the user. For example, upon reception of a key input signal regarding channel selection from the user, the UI manager 514 transmits the key input signal to the service manager 513.

The service manager 513 controls managers associated with services, such as the service delivery manager 503, the service discovery manager 510, the service control manager 509, and the metadata manager 512.

The service manager 513 also creates a channel map and selects a channel using the channel map according to the key input signal received from the UI manager 514. The service manager 513 sets the audio/video Packet ID (PID) of the selected channel based on SI of the channel received from the PSI & (PSIP and/or SI) decoder 504 in the demultiplexer 505.

The service discovery manager 510 provides information necessary to select an SP that provides a service. Upon receipt of a channel selection signal from the service manager 513, the service discovery manager 510 detects a service based on the channel selection signal.

The service control manager 509 takes charge of selection and control services. For example, if a user selects a live broadcasting service, such as a conventional broadcasting service, the service control manager selects and controls the service using Internet Group Management Protocol (IGMP) or Real-Time Streaming Protocol (RTSP). If the user selects Video on Demand (VoD), the service control manager 509 selects and controls the service using RTSP. RTSP supports trick mode for real-time streaming. Further, the service control manager 509 may initialize and manage a session through an IP Multimedia Control (IMC) gateway using IP Multimedia Subsystem (IMS) and Session Initiation Protocol (SIP). The protocols are only exemplary and thus other protocols are also applicable.

The metadata manager 512 manages metadata related to services and stores the metadata in the SI & metadata DB 511.

The SI & metadata DB 511 stores the SI decoded by the PSI & (PSIP and/or SI) decoder 504, the metadata managed by the metadata manager 512, and the information required to select an SP, received from the service discovery manager 510. The SI & metadata DB 511 may store system setup data.

The SI & metadata DB 511 may be constructed in a Non-Volatile RAM (NVRAM) or a flash memory.

An IMS Gateway (IG) 550 is a gateway equipped with functions needed to access IMS-based IPTV services.

The UI manager 514 of the image display device 500 shown in FIG. 5 serves to control the game application according to the embodiment of the present invention. In particular, the UI manager 514 operates according to a user input signal.

Figure 6:
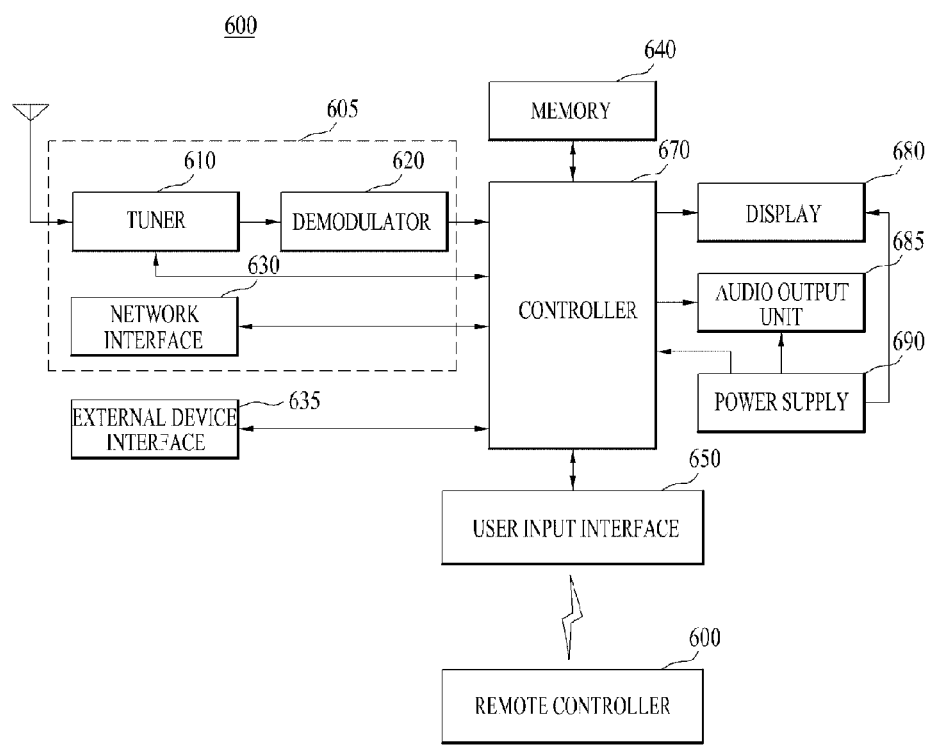
FIG. 6 is a diagram showing another example of the image display device shown in FIG. 1 or 2 in greater detail.

FIG. 6 is a detailed block diagram of the image display device shown in FIG. 1 or 2 according to another embodiment of the present invention.

Referring to FIG. 6, an image display device 600 according to another embodiment of the present invention includes a broadcast receiver 605, an external device interface 635, a memory 640, a user input interface 650, a controller 670, a display 680, an audio output unit 685, a power supply 690, and a camera module (not shown). The broadcasting receiver 605 may include a tuner 610, a demodulator 620 and a network interface 630. As needed, the broadcasting receiver 605 may be configured so as to include only the tuner 610 and the demodulator 620 or only the network interface 630.

The tuner 610 tunes to a Radio Frequency (RF) broadcast signal corresponding to a channel selected by a user from among a plurality of RF broadcast signals received through an antenna and downconverts the tuned RF broadcast signal into a digital Intermediate Frequency (IF) signal or an analog baseband video or audio signal.

More specifically, if the tuned RF broadcast signal is a digital broadcast signal, the tuner 610 downconverts the tuned RF broadcast signal into a digital IF signal DIF. On the other hand, if the tuned RF broadcast signal is an analog broadcast signal, the tuner 610 downconverts the tuned RF broadcast signal into an analog baseband video or audio signal CVBS/SIF. That is, the tuner 610 may be a hybrid tuner capable of processing not only digital broadcast signals but also analog broadcast signals. The analog baseband video or audio signal CVBS/SIF may be directly input to the controller 670.

The tuner 610 may be capable of receiving RF broadcast signals from an Advanced Television Systems Committee (ATSC) single-carrier system or from a Digital Video Broadcasting (DVB) multi-carrier system.

The tuner 610 may sequentially tune to a number of RF broadcast signals corresponding to all broadcast channels previously stored by a channel storage function from a plurality of RF signals received through the antenna and may downconvert the tuned RF broadcast signals into IF signals or baseband video or audio signals.

The demodulator 620 receives the digital IF signal DIF from the tuner 610 and demodulates the digital IF signal DIF.

For example, if the digital IF signal DIF is an ATSC signal, the demodulator 620 may perform 8-Vestigal SideBand (VSB) demodulation on the digital IF signal DIF. The demodulator 620 may also perform channel decoding. For channel decoding, the demodulator 620 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 620 performs Coded Orthogonal Frequency Division Multiple Access (COFDMA) demodulation upon the digital IF signal DIF. The demodulator 620 may also perform channel decoding. For channel decoding, the demodulator 620 may include a convolution decoder (not shown), a de-interleaver (not shown), and a Reed-Solomon decoder (not shown) so as to perform convolution decoding, de-interleaving, and Reed-Solomon decoding.

The demodulator 620 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 620 may include an ATSC demodulator and a DVB demodulator.

The TS output from the demodulator 620 may be input to the controller 670 and thus subjected to demultiplexing and A/V signal processing. The processed video and audio signals are output to the display 680 and the audio output unit 685, respectively.

The external device interface 635 may serve as an interface between an external device and the image display device 600. For interfacing, the external device interface 635 may include an A/V Input/Output (I/O) unit (not shown) and/or a wireless communication module (not shown).

The external device interface 635 may be connected to an external device such as a Digital Versatile Disc (DVD) player, a Blu-ray player, a game console, a camera, a camcorder, or a computer (e.g., a laptop computer), wirelessly or by wire. Then, the external device interface 635 externally receives video, audio, and/or data signals from the external device and transmits the received input signals to the controller 670. In addition, the external device interface 635 may output video, audio, and data signals processed by the controller 670 to the external device. In order to receive or transmit audio, video and data signals from or to the external device, the external device interface 635 includes the A/V I/O unit (not shown) and/or the wireless communication module (not shown).

The A/V I/O unit may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port, in order to input the video and audio signals of the external device to the image display device 600.

The wireless communication module may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA) communication standards.

The external device interface 635 may be connected to various set-top boxes through at least one of the above-described ports and may thus perform an I/O operation with the various set-top boxes.

The external device interface 635 may receive applications or an application list from an adjacent external device and provide the applications or the application list to the controller 670 or the memory 640.

The network interface 630 serves as an interface between the image display device 600 and a wired/wireless network such as the Internet. The network interface 630 may include an Ethernet port for connection to a wired network. For connection to wireless networks, the network interface 630 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 630 may transmit data to or receive data from another user or electronic device over a connected network or another network linked to the connected network. Especially, the network interface 630 may transmit data stored in the image display device 600 to a user or electronic device selected from among users or electronic devices pre-registered with the image display device 600.

The network interface 630 may access a specific Web page over a connected network or another network linked to the connected network. That is, the network interface 630 may access a specific Web page over a network and transmit or receive data to or from a server. Additionally, the network interface 630 may receive content or data from a CP or an NP. Specifically, the network interface 630 may receive content such as movies, advertisements, games, VoD, and broadcast signals, and information related to the content from a CP or an NP. Also, the network interface 630 may receive update information about firmware from the NP and update the firmware. The network interface 630 may transmit data over the Internet or to the CP or the NP.

The network interface 630 may selectively receive a desired application among open applications over a network.

In an embodiment of the present invention, when a game application is executed in the image display device, the network interface 630 may transmit data to or receive data from a user terminal connected to the image display device through a network. In addition, the network interface 630 may transmit specific data to or receive specific data from a server that records game scores.

The memory 640 may store various programs necessary for the controller 670 to process and control signals, and may also store processed video, audio and data signals.

The memory 640 may temporarily store a video, audio and/or data signal received from the external device interface 635 or the network interface 630. The memory 640 may store information about broadcast channels by the channel storage function.

The memory 640 may store applications or a list of applications received from the external device interface 135 or the network interface 630.

The memory 640 may store a variety of platforms which will be described later.

In an embodiment of the present invention, when the image display device provides a game application, the memory 640 may store user-specific information and game play information of a user terminal used as a game controller.

The memory 640 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable and Programmable Read Only Memory (EEPROM). The image display device 600 may reproduce content stored in the memory 640 (e.g. video files, still image files, music files, text files, and application files) to the user.

While the memory 640 is shown in FIG. 6 as configured separately from the controller 670, to which the present invention is not limited, the memory 640 may be incorporated into the controller 670, for example.

The user input interface 650 transmits a signal received from the user to the controller 670 or transmits a signal received from the controller 670 to the user.

For example, the user input interface 650 may receive control signals such as a power-on/off signal, a channel selection signal, and a screen setting signal from a remote controller 611 or may transmit a control signal received from the controller 670 to the remote controller 611, according to various communication schemes, for example, RF communication and IR communication.

For example, the user input interface 650 may provide the controller 670 with control signals received from local keys (not shown), such as inputs of a power key, a channel key, and a volume key, and setting values.

Also, the user input interface 650 may transmit a control signal received from a sensor unit (not shown) for sensing a user gesture to the controller 670 or transmit a signal received from the controller 670 to the sensor unit. The sensor unit may include a touch sensor, a voice sensor, a position sensor, a motion sensor, etc.

The controller 670 may demultiplex the TS received from the tuner 610, the demodulator 620, or the external device interface 635 into a number of signals and process the demultiplexed signals into audio and video data.

The video signal processed by the controller 670 may be displayed as an image on the display 680. The video signal processed by the controller 670 may also be transmitted to an external output device through the external device interface 635.

The audio signal processed by the controller 670 may be audibly output through the audio output unit 685. Also, the audio signal processed by the controller 670 may be transmitted to the external output device through the external device interface 635.

While not shown in FIG. 6, the controller 670 may include a DEMUX and a video processor, which will be described later with reference to FIG. 10.

In addition, the controller 670 may provide overall control to the image display device 600. For example, the controller 670 may control the tuner 610 to tune to an RF broadcast signal corresponding to a user-selected channel or a pre-stored channel.

The controller 670 may control the image display device 600 according to a user command received through the user input interface 650 or according to an internal program. Especially the controller 670 may access a network and download an application or application list selected by the user to the image display device 600 over the network.

For example, the controller 670 controls the tuner 610 to receive a signal of a channel selected according to a specific channel selection command received through the user input interface 650 and processes a video, audio and/or data signal of the selected channel. The controller 670 outputs the processed video or audio signal along with information about the user-selected channel to the display 680 or the audio output unit 685.

As another example, the controller 670 outputs a video or audio signal received from an external device such as a camera or a camcorder through the external device interface 635 to the display 680 or the audio output unit 685 according to an external device video playback command received through the external device interface 650.

The controller 670 may control the display 680 to display images. For instance, the controller 670 may control the display 680 to display a broadcast image received from the tuner 610, an externally input image received through the external device interface 635, an image received through the network interface 630, or an image stored in the memory 640. The image displayed on the display 680 may be a Two-Dimensional (2D) or Three-Dimensional (3D) still image or moving picture.

The controller 670 may control content playback. The content may include any content stored in the image display device 600, received broadcast content, and externally input content. The content includes at least one of a broadcast image, an externally input image, an audio file, a still image, a Web page, or a text file.

Upon receipt of a return-to-home screen input, the controller 670 may control display of the home screen on the display 680.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display device. The card objects may further include at least one of a card object representing a list of connected external devices or a card object representing a call-associated list.

The home screen may further include an application menu including at least one application that can be executed. Accordingly, the game application according to the embodiment of the present invention may be designed in a format selectable through the application menu of the above-described home screen. Further, in the present invention, user convenience may be improved by adding or deleting the game application to or from the application menu according to user selection.

Upon receipt of a card object move input, the controller 670 may control movement of a card object corresponding to the card object move input on the display 680, or if the card object is not displayed on the display 680, the controller 670 may control display of the card object on the display 680.

When a card object is selected from among the card objects on the home screen, the controller 670 may control display of an image corresponding to the selected card object on the display 680.

The controller 670 may control display of an input broadcast image and an object representing information about the broadcast image in a card object representing broadcast images. The size of the broadcast image may be set to a fixed size.

The controller 670 may control display of a set-up object for at least one of image setting, audio setting, screen setting, reservation setting, setting of a pointer of the remote controller, or network setting on the home screen.

The controller 670 may control display of a log-in object, a help object, or an exit object on a part of the home screen.

The controller 670 may control display of an object representing the total number of available card objects or the number of card objects displayed on the display 680 among all card objects, on a part of the home screen.

If one of the card objects displayed on the display 680 is selected, the controller 670 may fullscreen the selected card object to cover the entirety of the display 680.

Upon receipt of an incoming call at a connected external device or the image display device 600, the controller 670 may control focusing-on or shift of a call-related card object among the plurality of card objects.

If an application view menu item is selected, the controller 670 may control display of applications or a list of applications that are present in the image display device 600 or downloadable from an external network.

The controller 670 may control installation and execution of an application downloaded from the external network along with various UIs. Also, the controller 670 may control display of an image related to the executed application on the display 680, upon user selection.

In an embodiment of the present invention, when the image display device provides a game application, the controller 670 may control assignment of player IDs to specific user terminals, creation of game play information by executing the game application, transmission of the game play information corresponding to the player IDS assigned to the user terminals through the network interface 630, and reception of the game play information at the user terminals.

The controller 670 may control detection of user terminals connected to the image display device over a network through the network interface 630, display of a list of the detected user terminals on the display 680 and reception of a selection signal indicating a user terminal selected for use as a user controller from among the detected user terminals through the user input interface 650.

The controller 670 may control output of a game play screen of the game application, inclusive of player information of each user terminal and game play information, through the display 680.

The controller 670 may determine the specific signal received from a user terminal through the network interface 630 as game play information and thus control the game play information to be reflected in the game application in progress.

The controller 670 may control transmission of the game play information of the game application to a specific server connected over a network through the network interface 630.

As another embodiment, upon receipt of information about a change in the game play information from a predetermined server through the network interface 630, the controller 670 may control output of a notification message in a predetermined area of the display 680.

Although not shown, the image display device 600 may further include a channel browsing processor for generating thumbnail images corresponding to channel signals or externally input signals.

The channel browsing processor may receive the TS output from the demodulator 620 or the TS output from the external device interface 635, extract images of the received TS and generate thumbnail images. The thumbnail images may be directly output to the controller 670 or may be output after being encoded. Also, it is possible to encode the thumbnail images into a stream and output the stream to the controller 670. The controller 670 may display a thumbnail list including a plurality of received thumbnail images on the display 680. The thumbnail images may be updated sequentially or simultaneously in the thumbnail list. Therefore, the user can readily identify the content of broadcast programs received through a plurality of channels.

The display 680 may convert a processed video signal, a processed data signal, and an OSD signal received from the controller 670 or a video signal and a data signal received from the external device interface 635 into RGB signals, thereby generating driving signals.

The display 680 may be various types of displays such as a Plasma Display Panel (PDP), a Liquid Crystal Display (LCD), an Organic Light-Emitting Diode (OLED) display, a flexible display, and a 3D display.

The display 680 may also be a touchscreen that can be used not only as an output device but also as an input device.

The audio output unit 685 may receive a processed audio signal (e.g., a stereo signal, a 3.1-channel signal or a 5.1-channel signal) from the controller 670 and output the received audio signal as sound. The audio output unit 685 may employ various speaker configurations.

To sense a user gesture, the image display device 600 may further include the sensor unit (not shown) that has at least one of a touch sensor, a voice sensor, a position sensor, and a motion sensor, as stated before. A signal sensed by the sensor unit may be output to the controller 670 through the user input interface 650.

The image display device 600 may further include the camera unit (not shown) for capturing images of a user. Image information captured by the camera unit may be input to the controller 670.

The controller 670 may sense a user gesture from an image captured by the camera unit or a signal sensed by the sensor unit, or by combining the captured image and the sensed signal.

The power supply 690 supplies power to the image display device 600.

Particularly, the power supply 690 may supply power to the controller 670 which may be implemented as a System On Chip (SOC), the display 680 for displaying an image, and the audio output unit 685 for audio output.

For supplying power, the power supply 690 may include a converter (not shown) for converting Alternating Current (AC) into Direct Current (DC). If the display 680 is configured with, for example, a liquid crystal panel having a plurality of backlight lamps, the power supply 690 may further include an inverter (not shown) capable of performing Pulse Width Modulation (PWM) for luminance change or dimming driving.

The remote controller 611 transmits a user input to the user input interface 650. For transmission of user input, the remote controller 611 may use various communication techniques such as Bluetooth, RF communication, IR communication, Ultra Wideband (UWB) and ZigBee.

In addition, the remote controller 611 may receive a video signal, an audio signal or a data signal from the user input interface 650 and output the received signals visually, audibly or as vibrations.

The above-described image display device 600 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display device 600 illustrated in FIG. 6 is purely exemplary. Depending upon the specifications of the image display device 600 in actual implementation, the components of the image display device 600 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Unlike the configuration illustrated in FIG. 6, the image display device 600 may be configured so as to receive and play back video content through the network interface 630 or the external device interface 635, without the tuner 600 and the demodulator 620 shown in FIG. 6.

The game application according to the embodiment of the present invention is received through the network interface 630 of the image display device 600 shown in FIG. 6. Further, the received game application is stored in the memory 640.

The network interface 630 performs communication with a mobile device executing the above-described game application.

The image display device 600 is an exemplary image signal processing device that processes a stored image or an input image. Other examples of the image signal processing device include a set-top box without the display 680 and the audio output unit 685, a DVD player, a Blu-ray player, a game console, and a computer. The set-top box will be described later with reference to FIGS. 7 and 8.

Figure 7:
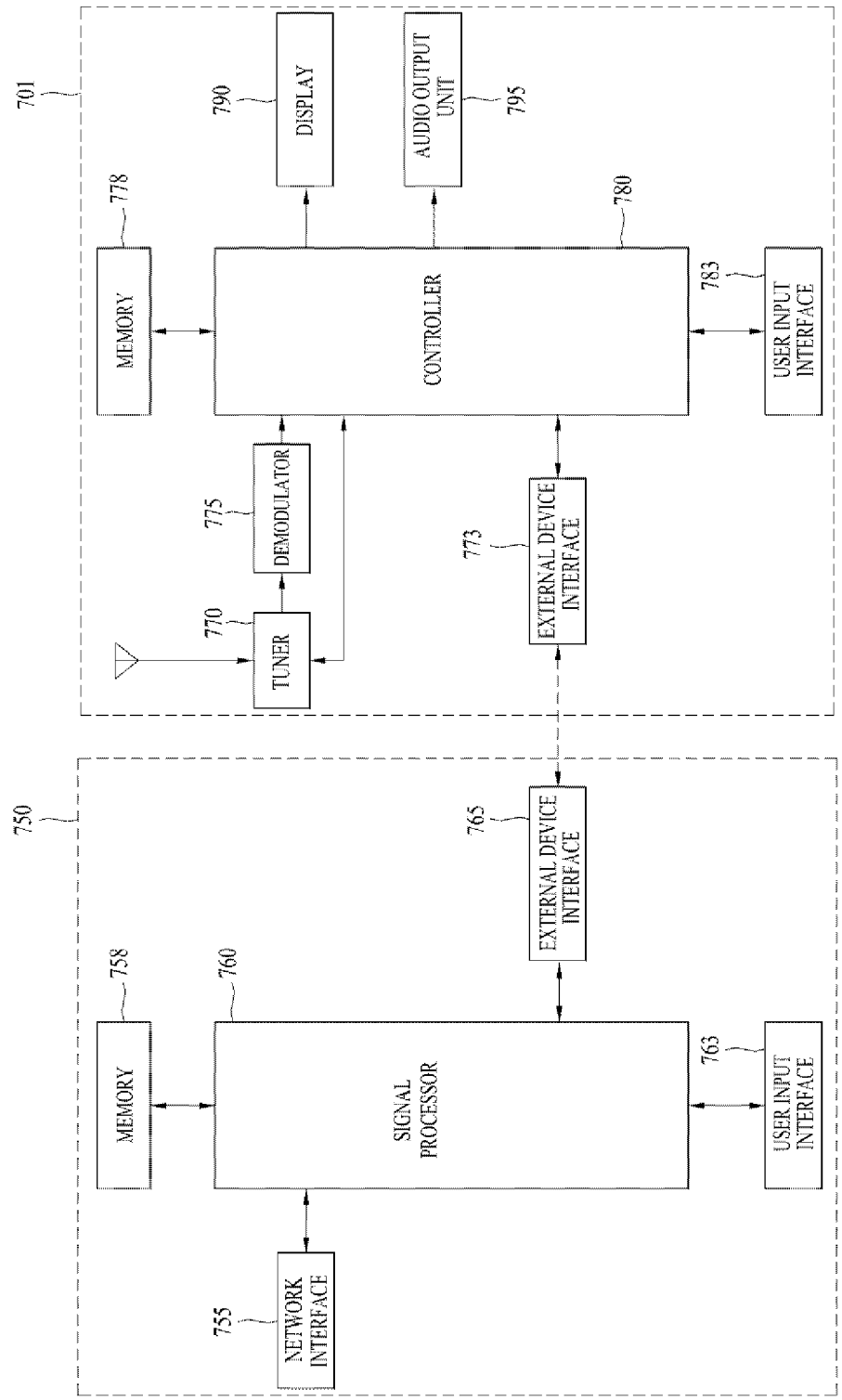
FIGS. 7 and 8 are diagrams showing any one of the image display devices separately as a set-top box and a display device according to embodiments of the present invention.
Figure 8:
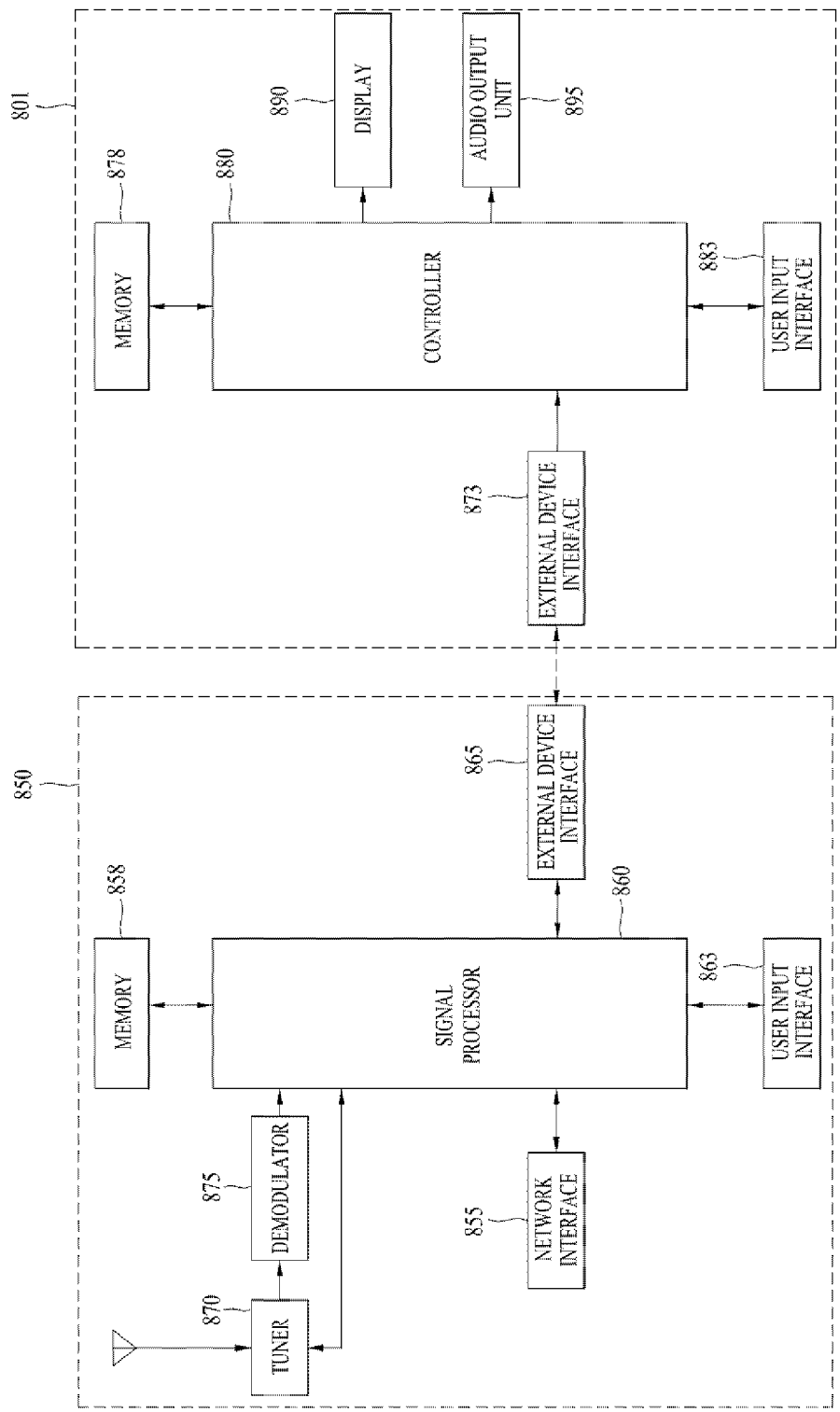

FIGS. 7 and 8 are diagrams illustrating any one of the image display devices separately as a set-top box and a display device according to embodiments of the present invention.

Referring to FIG. 7, a set-top box 750 and a display device 701 may transmit or receive data wirelessly or by wire.

The set-top box 750 may include a network interface 755, a memory 758, a signal processor 760, a user input interface 763, and an external device interface 765.

The network interface 755 serves as an interface between the set-top box 750 and a wired/wireless network such as the Internet. The network interface 755 may transmit data to or receive data from another user or another electronic device over a connected network or over another network linked to the connected network.

The memory 758 may store programs necessary for the signal processor 760 to process and control signals and temporarily store a video, audio and/or data signal received from the external device interface 765 or the network interface 755. The memory 758 may also store platforms shown in FIGS. 11 and 12, as described later.

The signal processor 760 processes an input signal. For example, the signal processor 760 may demultiplex or decode an input video or audio signal. For signal processing, the signal processor 760 may include a video decoder or an audio decoder. The processed video or audio signal may be transmitted to the display device 701 through the external device interface 265.

The user input interface 763 transmits a signal received from the user to the signal processor 760 or a signal received from the signal processor 760 to the user. For example, the user input interface 763 may receive various control signals such as a power on/off signal, an operation input signal, and a setting input signal through a local key (not shown) or the remote controller and output the control signals to the signal processor 760.

The external device interface 765 serves as an interface between the set-top box 750 and an external device that is connected wirelessly or by wire, particularly the display device 701, for data transmission or reception. The external device interface 765 may also interface with an external device such as a game console, a camera, a camcorder, and a computer (e.g. a laptop computer), for data transmission or reception.

The set-top box 750 may further include a media input unit for media playback. The media input unit may be a Blu-ray input unit (not shown), for example. That is, the set-top box 750 may include a Blu-ray player. After signal processing such as demultiplexing or decoding in the signal processor 760, a media signal from a Blu-ray disc may be transmitted to the display device 701 through the external device interface 765 so as to be displayed on the display device 701.

The display device 701 may include a tuner 770, an external device interface 773, a demodulator 775, a memory 778, a controller 780, a user input interface 783, a display 790, and an audio output unit 795.

The tuner 770, the demodulator 775, the memory 778, the controller 780, the user input interface 783, the display 790 and the audio output unit 795 are identical respectively to the tuner 610, the demodulator 620, the memory 640, the controller 670, the user input interface 650, the display 680, and the audio output unit 685 illustrated in FIG. 6 and thus a description thereof is not provided herein.

The external device interface 773 serves as an interface between the display device 701 and a wireless or wired external device, particularly the set-top box 750, for data transmission or reception.

Hence, a video signal or an audio signal received through the set-top box 750 is output through the display 790 or through the audio output unit 795 under control of the controller 780.

Referring to FIG. 8, the configuration of the set-top box 850 and the display device 801 shown in FIG. 8 is similar to that of the set-top box 750 and the display device 701 shown in FIG. 7, except that the tuner 870 and the demodulator 875 reside in the set-top box 850, not in the display device 801. Thus the following description will focus upon such difference.

The signal processor 860 may process a broadcast signal received through the tuner 870 and the demodulator 875. The user input interface 863 may receive a channel selection input, a channel store input, etc.

Figure 9:
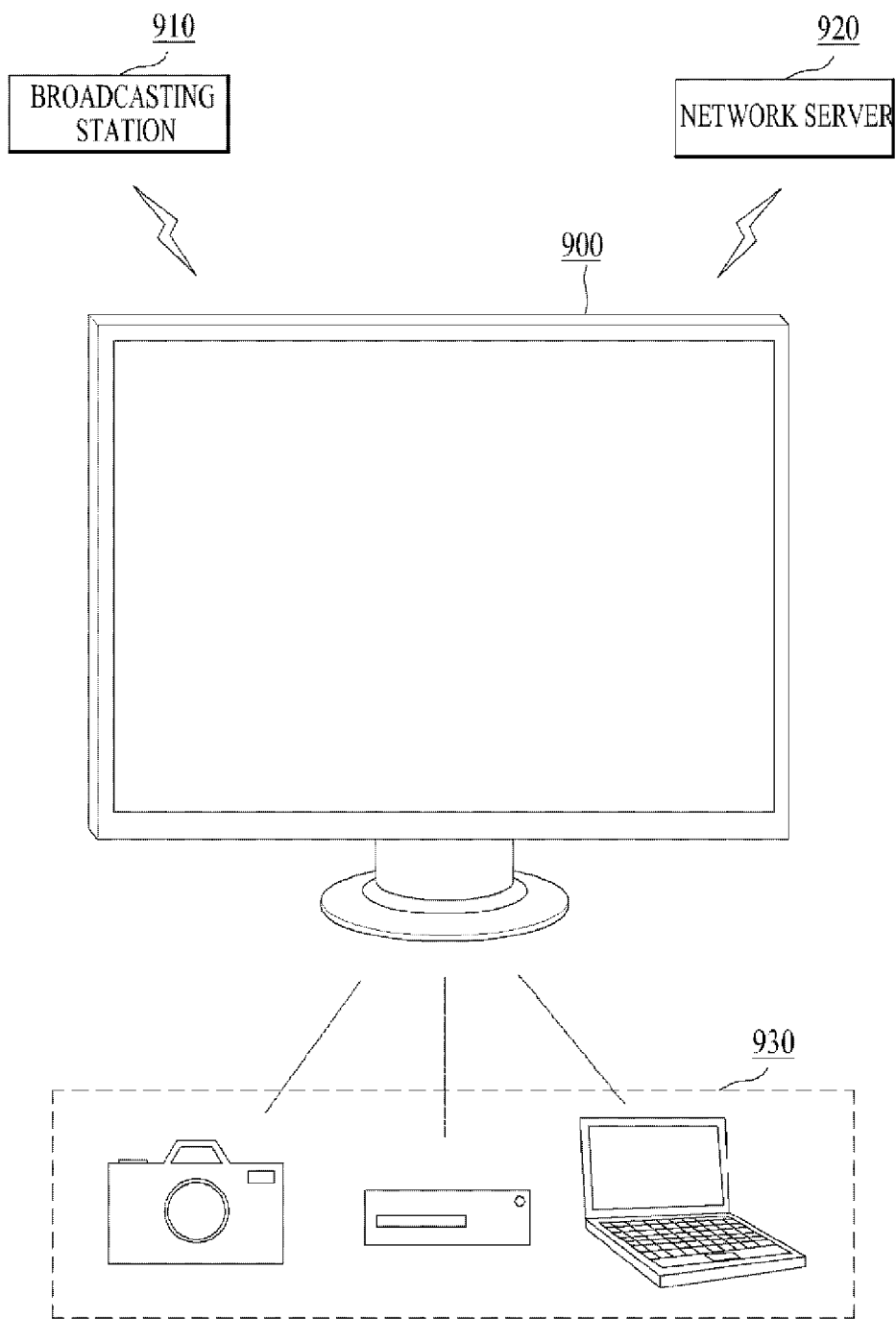
FIG. 9 is a diagram illustrating an operation for communicating with third devices in either of the image display devices according to the embodiments of the present invention.

FIG. 9 is a diagram illustrating an operation for communicating with third devices in either of the image display devices according to the embodiments of the present invention. The image display device shown in FIG. 9 may be one of the above-described image display devices according to the embodiments of the present invention.

As shown in FIG. 9, the image display device 900 according to the embodiment of the present invention may communicate with a broadcast station 910, a network server 920, or an external device 930.

The image display device 900 may receive a broadcast signal including a video signal from the broadcast station 910. The image display device 900 may process the audio and video signals of the broadcast signal or the data signal of the broadcast signal, suitably for output from the image display device 900. The image display device 900 may output video or audio based on the processed video or audio signal.

Meanwhile, the image display device 900 may communicate with the network server 920. The network server 920 is capable of transmitting signals to and receiving signals from the image display device 900 over a network. For example, the network server 920 may be a portable terminal that can be connected to the image display device 900 through a wired or wireless base station. In addition, the network server 920 may provide content to the image display device 900 over the Internet. A CP may provide content to the image display device 900 through the network server.

The image display device 900 may communicate with the external device 930. The external device 930 can transmit and receive signals directly to and from the image display device 900 wirelessly or by wire. For instance, the external device 930 may be a media storage or player. That is, the external device 930 may be any of a camera, a DVD player, a Blu-ray player, a PC, etc.

The broadcast station 910, the network server 920 or the external device 930 may transmit a signal including a video signal to the image display device 900. The image display device 900 may display an image based on the video signal included in the received signal. Also, the image display device 900 may transmit a signal transmitted from the network server 920 to the broadcast station 910 to the external device 930 and may transmit a signal transmitted from the external device 930 to the image display device 900 to the broadcast station 910 or the network server 920. That is, the image display device 900 may transmit content included in signals received from the broadcast station 910, the network server 920, and the external device 930 or may immediately play back the content.

Figure 10:
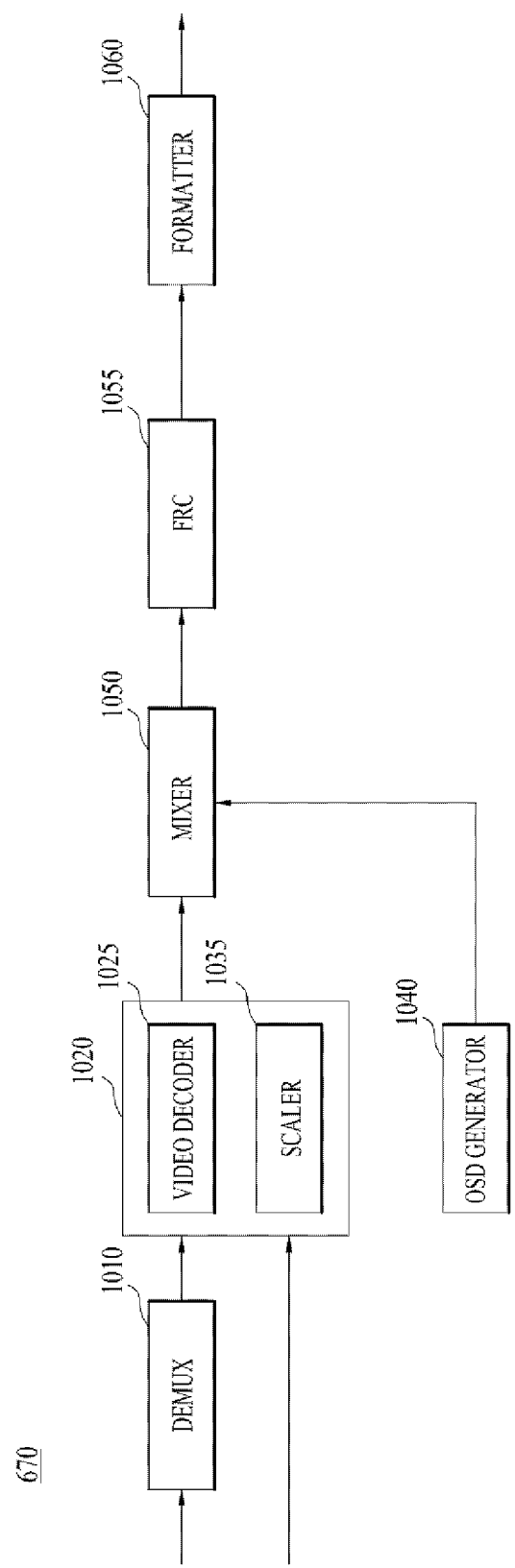
FIG. 10 is a block diagram of a controller shown in FIG. 6.

FIG. 10 is a block diagram of the controller shown in FIG. 6. The controller will be described with reference to FIGS. 10 and 6.

The controller 670 may include a DEMUX 1010, a video processor 1020, an OSD generator 1040, a mixer 1050, a Frame Rate Converter (FRC) 1055, and a formatter 1060 according to an embodiment of the present invention. The controller 670 may further include an audio processor (not shown) and a data processor (not shown).

The DEMUX 1010 demultiplexes an input stream. For example, the DEMUX 1010 may demultiplex an MPEG-2 TS into a video signal, an audio signal, and a data signal. The stream signal input to the DEMUX 1010 may be received from the tuner 610, the demodulator 620 or the external device interface 635.

The video processor 1020 may process the demultiplexed video signal. For video signal processing, the video processor 1020 may include a video decoder 1025 and a scaler 1035.

The video decoder 1025 decodes the demultiplexed video signal and the scaler 1035 scales the decoded video signal so that the video signal can be displayed on the display 680.

The video decoder 1025 may be provided with decoders that operate based on various standards.

If the demultiplexed video signal is, for example, an MPEG-2 encoded video signal, the video signal may be decoded by an MPEG-2 decoder.

On the other hand, if the video signal is an H.264-encoded DMB or DVB-handheld (DVB-H) signal, the video signal may be decoded by an H.264 decoder.

The video signal decoded by the video processor 1020 is provided to the mixer 1050.

The OSD generator 1040 generates an OSD signal autonomously or according to user input. For example, the OSD generator 1040 may generate signals by which a variety of information is displayed as graphics or text on the display 680, based on control signals received from the user input interface 650. The generated OSD signal may include various data such as a UI screen, a variety of menu screens, widgets, icons, etc. of the image display device 600

For example, the OSD generator 1040 may generate a signal by which subtitles are displayed for a broadcast image or Electronic Program Guide (EPG)-based broadcasting information.

The mixer 1050 may mix the decoded video signal processed by the image processor with the OSD signal generated by the OSD generator 1040 and output the mixed signal to the formatter 1060. As the decoded broadcast video signal or the externally input signal is mixed with the OSD signal, an OSD may be overlaid on the broadcast image or the externally input image.

The FRC 1055 may change the frame rate of an input image signal. For example, a frame rate of 60 Hz is converted into a frame rate of 120 or 240 Hz. When the frame rate is to be changed from 60 Hz to 120 Hz, a first frame is inserted between the first frame and a second frame, or a predicted third frame is inserted between the first and second frames. If the frame rate is to be changed from 60 Hz to 240 Hz, three identical frames or three predicted frames are inserted between the first and second frames. It is also possible to maintain the frame rate of the input image without frame rate conversion.

The formatter 1060 changes the format of the signal received from the FRC 355 to suit the display 680. For example, the formatter 1060 may convert a received signal into an RGB data signal. The RGB signal may be output in the form of a Low Voltage Differential Signal (LVDS) or mini-LVDS.

The audio processor (not shown) of the controller 670 may process the demultiplexed audio signal. For audio signal processing, the audio processor (not shown) may have a plurality of decoders.

If the demultiplexed audio signal is a coded audio signal, the audio processor (not shown) of the controller 670 may decode the audio signal. For example, the demultiplexed audio signal may be decoded by an MPEG-2 decoder, an MPEG-4 decoder, an Advanced Audio Coding (AAC) decoder, or an AC-3 decoder.

The audio processor (not shown) of the controller 670 may also adjust the bass, treble or volume of the audio signal.

The data processor (not shown) of the controller 670 may process the demultiplexed data signal. For example, if the demultiplexed data signal is an encoded data signal such as an Electronic Program Guide (EPG) which includes broadcast information specifying the start time, end time, etc. of scheduled broadcast programs of each channel, the controller 670 may decode the data signal. Examples of an EPG include ATSC-Program and System Information Protocol (PSIP) information and DVB-Service Information (SI).

ATSC-PSIP information or DVB-SI may be included in the header of the above-described TS, i.e., a 4-byte header of an MPEG-2 TS.

The block diagram of the controller 670 shown in FIG. 10 is an embodiment of the present invention. Depending upon the specifications of the controller 670, the components of the controller 670 may be combined, or omitted. Or new components may be added to the controller 670.

Figure 11:
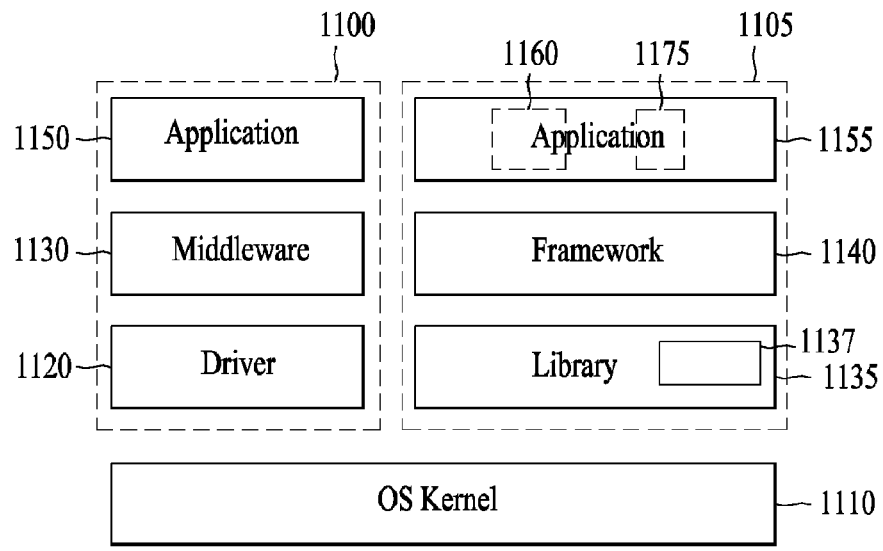
FIG. 11 is a diagram showing an example of a platform architecture for either of the image display devices according to the embodiments of the present invention.

FIG. 11 is a diagram showing an example of a platform architecture for either of the image display devices according to the embodiments of the present invention.

Figure 12:
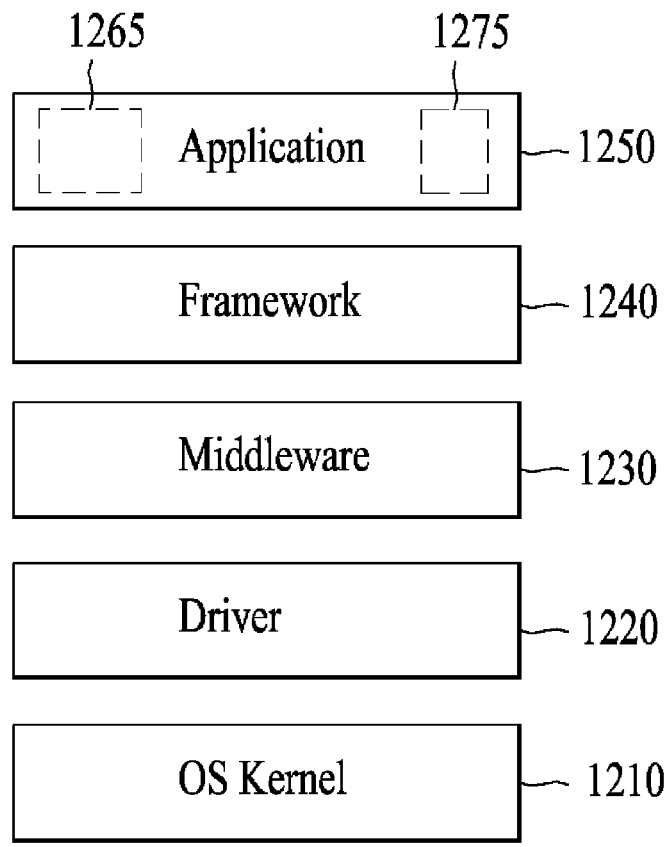
FIG. 12 is a diagram showing another example of a platform architecture for either of the image display devices according to the embodiments of the present invention.

FIG. 12 is a diagram showing another example of a platform architecture for either of the image display devices according to the embodiments of the present invention.

A platform for either of the image display devices according to the embodiments of the present invention may have OS-based software to implement the above-described various operations.

Referring to FIG. 11, a platform for either of the image display devices according to the embodiments of the present invention is of a separate type. The platform may be designed separately as a legacy system platform 1100 and a smart system platform 1105. An OS kernel 1110 may be shared between the legacy system platform 1100 and the smart system platform 405.

The legacy system platform 1100 may include a stack of a driver 1120, middleware 1130, and an application layer 1150 on the OS kernel 1110.

On the other hand, the smart system platform 1105 may include a stack of a library 1135, a framework 1140, and an application layer 1155 on the OS kernel 1110.

The OS kernel 1110 is the core of an operating system. When the image display device is driven, the OS kernel 1110 may be responsible for operation of at least one of control of hardware drivers, security protection for hardware and processors in the image display device, efficient management of system resources, memory management, hardware interfacing by hardware abstraction, multi-processing, or scheduling associated with multi-processing. Meanwhile, the OS kernel 1110 may further perform power management.

The hardware drivers of the OS kernel 1110 may include, for example, at least one of a display driver, a Wi-Fi driver, a Bluetooth driver, a USB driver, an audio driver, a power manager, a binder driver, or a memory driver.

Alternatively or additionally, the hardware drivers of the OS kernel 1110 may be drivers for hardware devices within the OS kernel 1110. The hardware drivers may include a character device driver, a block device driver, and a network device driver. The block device driver may require a buffer for buffering data on a block basis, because data is transmitted on a block basis. The character device driver may not need a buffer since data is transmitted on a basic data unit basis, that is, on a character basis.

The OS kernel 1110 may be implemented based on any of various OSs such as Unix (Linux), Windows, etc. The OS kernel 1110 may be a general-purpose open-source kernel which can be implemented in other electronic devices.

The driver 1120 is interposed between the OS kernel 1110 and the middleware 1130. Along with the middleware 1130, the driver 1120 drives devices for operation of the application layer 1150. For example, the driver 1120 may include a driver(s) for a microcomputer, a display module, a Graphics Processing Unit (GPU), an FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (12C). These drivers operate in conjunction with the hardware drivers of the OS kernel 1110.

In addition, the driver 1120 may further include a driver for the remote controller, especially a pointing device to be described below. The remote controller driver may reside in the OS kernel 1110 or the middleware 1130, instead of the driver 1120.

The middleware 1130 resides between the OS kernel 1110 and the application layer 1150. The middleware 1130 may mediate between different hardware devices or different software programs, for data transmission and reception between the hardware devices or the software programs. Therefore, the middleware 1130 can provide standard interfaces, support various environments, and enable interaction between tasks conforming to heterogeneous communication protocols.

Examples of the middleware 1130 in the legacy system platform 1100 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 1150 that runs atop the middleware 1130 in the legacy system platform 1100 may include, for example, UI applications associated with various menus in the image display device. The application layer 1150 on top of the middleware 1130 may allow editing and updating over a network by user selection. Through the application layer 1150, the user may navigate a desired menu by manipulating the remote controller while viewing a broadcast program.

The application layer 1150 in the legacy system platform 1100 may further include at least one of a TV guide application, a Bluetooth application, a reservation application, a Digital Video Recorder (DVR) application, and a hotkey application.

In the smart system platform 1105, the library 1135 is positioned between the OS kernel 1110 and the framework 1140, forming the basis of the framework 1140. For example, the library 1135 may include Secure Socket Layer (SSL) (a security-related library), WebKit (a Web engine-related library), c library (libc), and Media Framework (a media-related library) specifying, for example, a video format and an audio format. The library 1135 may be written in C or C++. Also, the library 1135 may be exposed to a developer through the framework 1140.

The library 1135 may include a runtime 1137 with a core Java library and a Virtual Machine (VM). The runtime 1137 and the library 1135 form the basis of the framework 1140.

The VM may be a virtual machine that enables concurrent execution of a plurality of instances, that is, multi-tasking. For each application of the application layer 1155, a VM may be allocated and executed. For scheduling or interconnection between the plurality of instances, the binder driver (not shown) of the OS kernel 1110 may operate.

The binder driver and the runtime 1137 may connect Java applications to C-based libraries.

The library 1135 and the runtime 1137 may correspond to the middleware 1130 of the legacy system platform.

In the smart system platform 1105, the framework 1140 includes programs on which applications of the application layer 1155 are based. The framework 1140 is compatible with any application and may allow component reuse, movement or exchange. The framework 1140 may include supporting programs and programs for interconnecting different software components. For example, the framework 1140 may include an activity manager related to activities of applications, a notification manager, and a CP for abstracting common information between applications. This framework 1140 may be written in Java.

The application layer 1155 on top of the framework 1140 includes a variety of programs that can be executed and displayed in the image display device. The application layer 1155 may include, for example, a core application that is a suite providing at least one of e-mail, Short Message Service (SMS), calendar, map, or browser functions. The application layer 1155 may be written in Java.

In the application layer 1155, applications may be categorized into user-undeletable applications 1165 stored in the image display device or user-deletable applications 1175 that are downloaded from an external device or a network and stored in the image display device.

Using the applications of the application layer 1155, a variety of functions such as an Internet telephony service, VoD service, Web album service, Social Networking Service (SNS), Location-Based Service (LBS), map service, Web browsing service, and application search service may be performed through network access. In addition, other functions such as gaming and schedule management may be performed by the applications.

Referring to FIG. 12, a platform for any of the image display devices according to the embodiments of the present invention is of an integrated type. The integrated-type platform may include an OS kernel 1210, a driver 1220, middleware 1230, a framework 1240, and an application layer 1250.

The integrated-type platform shown in FIG. 11 is different from the separate-type platform shown in FIG. 11 in that the library 1135 shown in FIG. 11 is deleted and the application layer 1250 is included as an integrated layer. The driver 1220 and the framework 1240 correspond to the driver 1120 and the framework 1140 of FIG. 11, respectively.

The library 1135 of FIG. 11 may be incorporated into the middleware 1230 of FIG. 12. That is, the middleware 1230 may include both the legacy system middleware and the image display system middleware. As described before, the legacy system middleware includes MHEG or ACAP as data broadcasting-related middleware, PSIP or SI middleware as broadcasting information-related middleware, and DLNA middleware as peripheral device communication-related middleware, and the image display system middleware includes SSL as a security-related library, WebKit as a Web engine-related library, libc, and Media Framework as a media-related library. The middleware 1230 may further include the above-described runtime.

The application layer 1250 may include a menu-related application, a TV guide application, a reservation application, etc. as legacy system applications, and e-mail, SMS, a calendar, a map, and a browser as image display system applications.

In the application layer 1250, applications may be categorized into user-undeletable applications 1265 that are stored in the image display device and user-installable or user-deletable applications 1275 that are downloaded from an external device or a network and stored in the image display device.

The platforms shown in FIGS. 11 and 12 may be general-purpose ones that can be implemented in many other electronic devices as well as in image display devices. The platforms of FIGS. 11 and 12 may be stored or loaded in the memory 640, the controller 670, or any other processor (not shown) or may be stored or load in the SI & metadata DB 711, the UI manager 714 or the service manager 713 shown in FIG. 5. To execute applications, an additional application processor (not shown) may be further provided.

The game application according to the embodiment of the present invention is located in the application layer shown in FIG. 11 or 12.

In particular, if the game application is installed in a process of producing a display device (e.g., TV), the display device is designed such that a user of the display device may not arbitrarily access or delete the game application.

Figure 13:
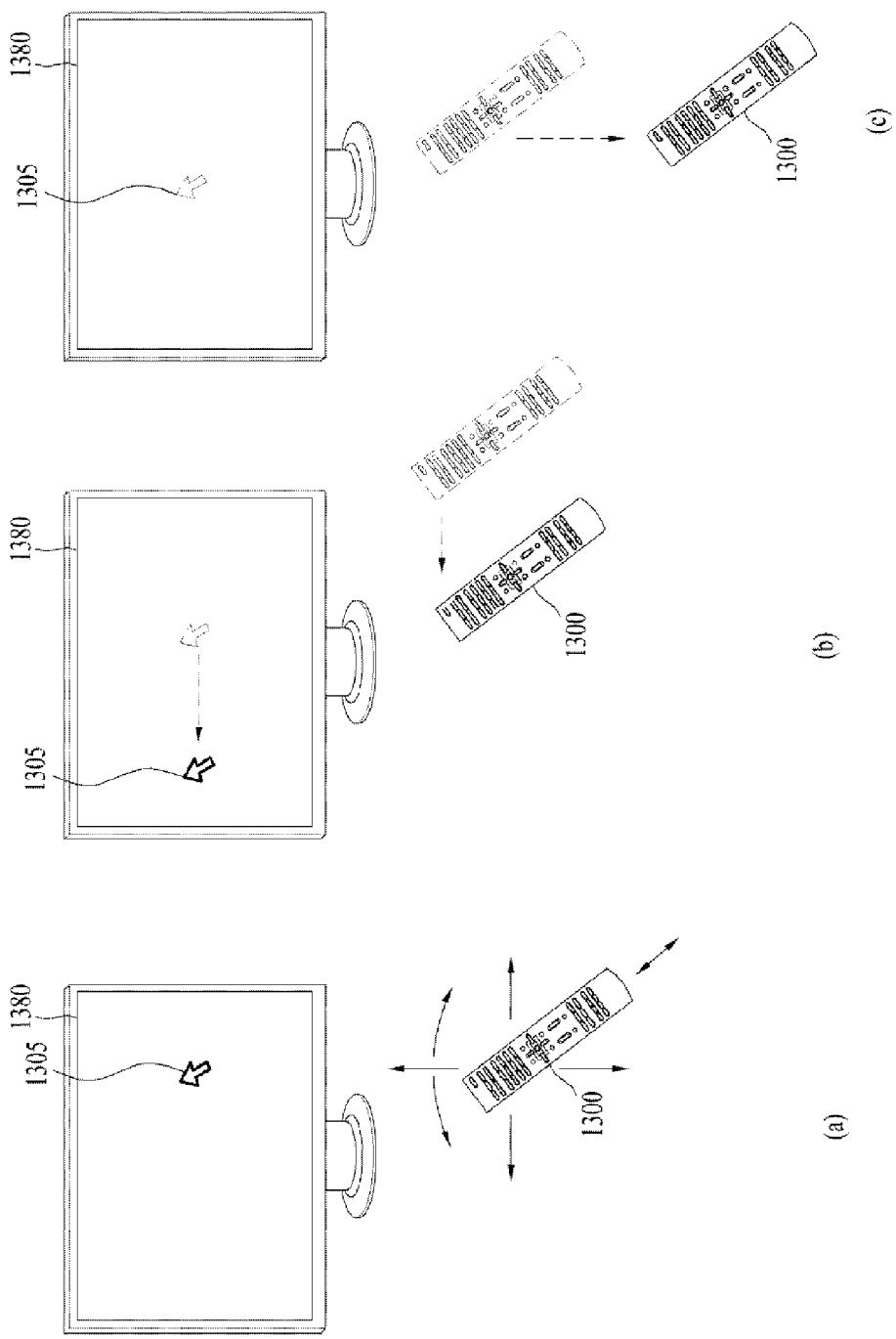
FIG. 13 is a diagram showing a method of operating a remote controller for controlling any one of the image display devices according to the embodiments of the present invention.

FIG. 13 illustrates a method for controlling either of the image display devices according to the embodiments of the present invention using a remote controller.

FIG. 13(a) illustrates a pointer 1305 representing movement of the remote controller 1300 displayed on the display 1380.

The user may move or rotate the remote controller 1300 up and down, side to side (FIG. 13(b)), and back and forth (FIG. 13(c)). The pointer 1305 displayed on the display 1380 of the image display device moves according to the movement of the remote controller 1300. Since the pointer 1305 moves in accordance with the movement of the remote controller 1300 in a 3D space as shown in FIG. 13, the remote controller 1300 may be referred to as a pointing device.

Referring to FIG. 13(b), if the user moves the remote controller 1300 to the left, the pointer 1305 moves to the left on the display 1380.

A sensor of the remote controller 1300 detects movement of the remote controller 1300 and transmits motion information of the remote controller 1300 to the image display device. Then, the image display device calculates the coordinates of the pointer 1305 from the motion information of the remote controller 1300. The image display device then displays the pointer 1305 at the calculated coordinates.

Referring to FIG. 13(c), while pressing a predetermined button of the remote controller 1300, the user moves the remote controller 1300 away from the display 1380. Then, a selected area corresponding to the pointer 1305 may be zoomed in on and enlarged on the display 1380. On the contrary, if the user moves the remote controller 1300 toward the display 180, the selected area corresponding to the pointer 1305 is zoomed out and thus contracted on the display 1380. On the contrary, when the remote controller 1300 moves away from the display 1380, the selected area may be zoomed out and when the remote controller 1300 approaches the display 180, the selected area may be zoomed in.

With the predetermined button of the remote controller 1300 pressed, the up, down, left and right movements of the remote controller 1300 may be ignored. That is, when the remote controller 1300 moves away from or approaches the display 1380, only the back and forth movements of the remote controller 1300 are sensed, while the up, down, left and right movements of the remote controller 1300 are ignored. Unless the predetermined button is pressed in the remote controller 1300, the pointer 1305 moves in accordance with the up, down, left or right movement of the remote controller 1300.

The movement speed and direction of the pointer 1305 may correspond to the movement speed and direction of the remote controller 1300.

The pointer of the present specification is an object displayed on the display 1380 in correspondence with the movement of the remote controller 1300. Therefore, the pointer 1305 may have various shapes other than the arrow illustrated in FIG. 13. For example, the pointer 1305 may be a dot, a cursor, a prompt, a thick outline, etc. The pointer 1305 may be displayed across a plurality of points, such as a line and a surface, as well as at a single point on horizontal and vertical axes.

Figure 14:
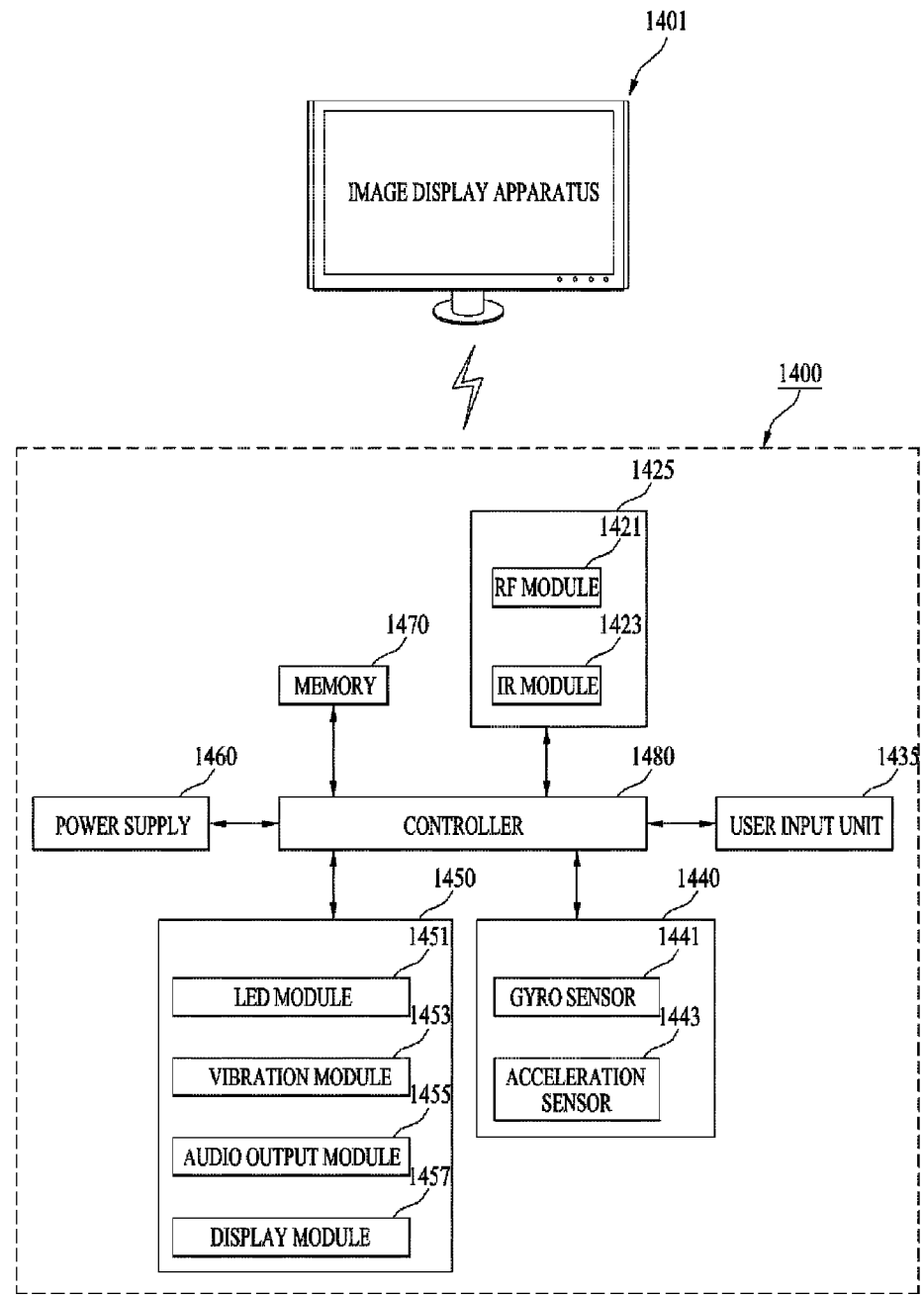
FIG. 14 is a block diagram of a remote controller for controlling either of the image display devices according to the embodiments of the present invention.

FIG. 14 is a detailed block diagram of the remote controller in either of the image display devices according to an embodiment of the present invention.

Referring to FIG. 14, the remote controller 1400 may include a wireless communication module 1425, a user input unit 1435, a sensor unit 1440, an output unit 1450, a power supply 1460, a memory 1470, and a controller 1480.

The wireless communication module 1425 transmits signals to and/or receives signals from either of the above-described image display devices according to the embodiments of the present invention, that is, the image display device 1401.

The remote controller 1400 may include an RF module 1421 for transmitting RF signals to and/or receiving RF signals from the image display device 1401 according to an RF communication standard. The remote controller 1400 may also include an IR module 1423 for transmitting IR signals to and/or receiving IR signals from the image display device 1401 according to an IR communication standard.

In the present embodiment, the remote controller 1400 transmits motion information representing movement of the remote controller 1400 to the image display device 1401 through the RF module 221.

The remote controller 1400 may also receive signals from the image display device 1401 through the RF module 1421. As needed, the remote controller 1400 may transmit commands such as a power on/off command, a channel switch command, or a volume change command to the image display device 1401 through the IR module 1423.

The user input unit 1435 may include a keypad, a plurality of buttons, a touchpad and/or a touchscreen. The user may enter commands associated with the image display device 1401 to the remote controller 1400 by manipulating the user input unit 1435. If the user input unit 1435 includes a plurality of hard buttons, the user may input various commands associated with the image display device 1401 to the remote controller 1400 by pressing the hard buttons. Alternatively or additionally, if the user input unit 1435 includes a touchscreen displaying a plurality of soft keys, the user may input various commands associated with the image display device 1401 to the remote controller 1400 by touching the soft keys. The user input unit 1435 may also include various input tools other than those set forth herein, such as a scroll key and/or a jog wheel, which should not be construed as limiting the present invention.

The sensor unit 1440 may include a gyro sensor 241 and/or an acceleration sensor 1443.

The gyro sensor 1441 may sense movement of the remote controller 1400.

For example, the gyro sensor 1441 may sense movement of the remote controller 1400 in X, Y, and Z-axis directions. The acceleration sensor 1443 may sense the speed of the remote controller 1400. The sensor unit 1440 may further include a distance sensor for sensing the distance between the remote controller 1400 and the display device 1401.

The output unit 1450 may output a video and/or audio signal corresponding to manipulation of the user input unit 1435 or corresponding to a signal received from the image display device 1401. The user may easily identify whether the user input unit 1435 has been manipulated or whether the image display device 1401 has been controlled, based on the video and/or audio signal output by the output unit 1450.

The output unit 1450 may include a Light Emitting Diode (LED) module 1451 which is turned on or off whenever the user input unit 1435 is manipulated or whenever a signal is received from or transmitted to the image display device 1401 through the wireless communication module 1425, a vibration module 1453 which generates vibrations, an audio output module 1455 which outputs audio data, and/or a display module 1457 which outputs video data.

The power supply 1460 supplies power to the remote controller 1400. If the remote controller 1400 remains stationary for a predetermined time or longer, the power supply 1460 may, for example, reduce or shut off supply of power to the spatial remote controller 1400 in order to save power. The power supply 1460 may resume power supply if a predetermined key of the remote controller 1400 is manipulated.

The memory 1470 may store various types of programs and application data necessary to control or drive the remote controller 1400. The remote controller 1400 may wirelessly transmit signals to and/or receive signals from the image display device 1401 over a predetermined frequency band with the aid of the RF module 1421. The controller 1480 of the remote controller 1400 may store information regarding the frequency band used for the remote controller 1400 to wirelessly transmit signals to and/or wirelessly receive signals from the paired image display device 1401 in the memory 1470, for later use.

The controller 1480 provides overall control to the remote controller 1400. The controller 1480 may transmit a signal corresponding to a key manipulation detected from the user input unit 1435 or a signal corresponding to motion of the remote controller 1400, as sensed by the sensor unit 1440, to the image display device 1401.

In association with the embodiments of the present invention, the remote controller 1400 may correspond to a user terminal necessary to execute a game application.

Accordingly, in association with gaming by the game application of the present invention, a signal input through the user input unit 1435 of the remote controller 1400 is analyzed by the controller 1480 and is transmitted to the image display device through the wireless communication module 1425, thereby being applied to the played game. That is, the game may be played by controlling a card or a pointer displayed on the image display device.

In the embodiment, the remote controller may determine a distance between the image display device and the remote controller using the wireless communication module 1425 or the distance sensor (not shown). If the remote controller moves away from the image display device, a game main screen (shown in FIG. 30) displayed on the image display device is enlarged and, if the remote controller approaches the image display device, the game main screen is reduced. Enlargement and reduction may be inversely controlled according to user setting.

In another embodiment, enlargement and reduction may be performed only when the distance between the remote controller and the image display apparatus is changed in a state in which a predetermined button of the remote controller 1400 is pressed.

Figure 15:
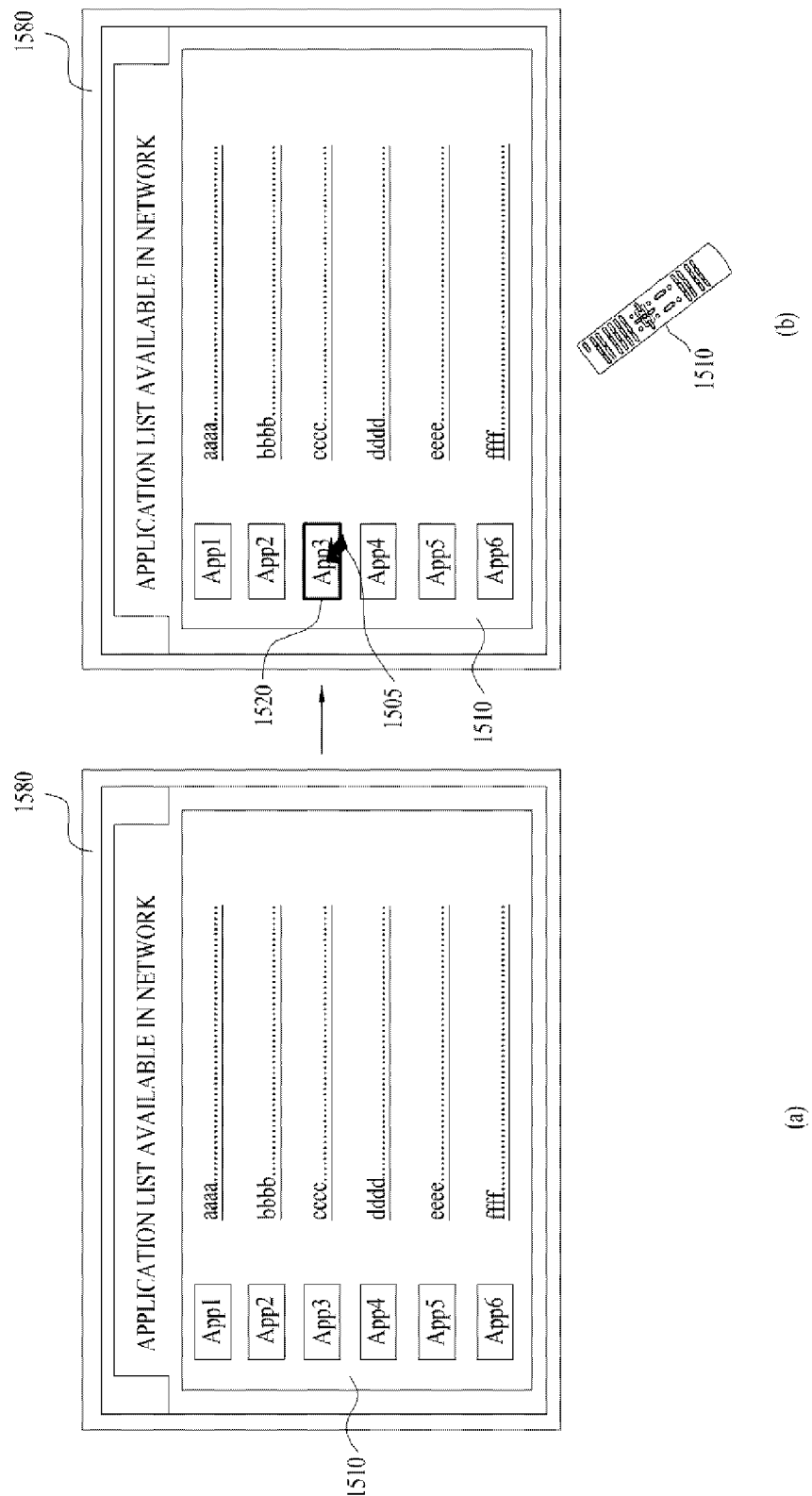
FIG. 15 is a diagram showing a first embodiment of a user interface (UI) in either of the image display devices according to the embodiments of the present invention.

FIG. 15 is a diagram showing a first embodiment of a UI in either of the image display devices according to embodiments of the present invention.

Figure 16:
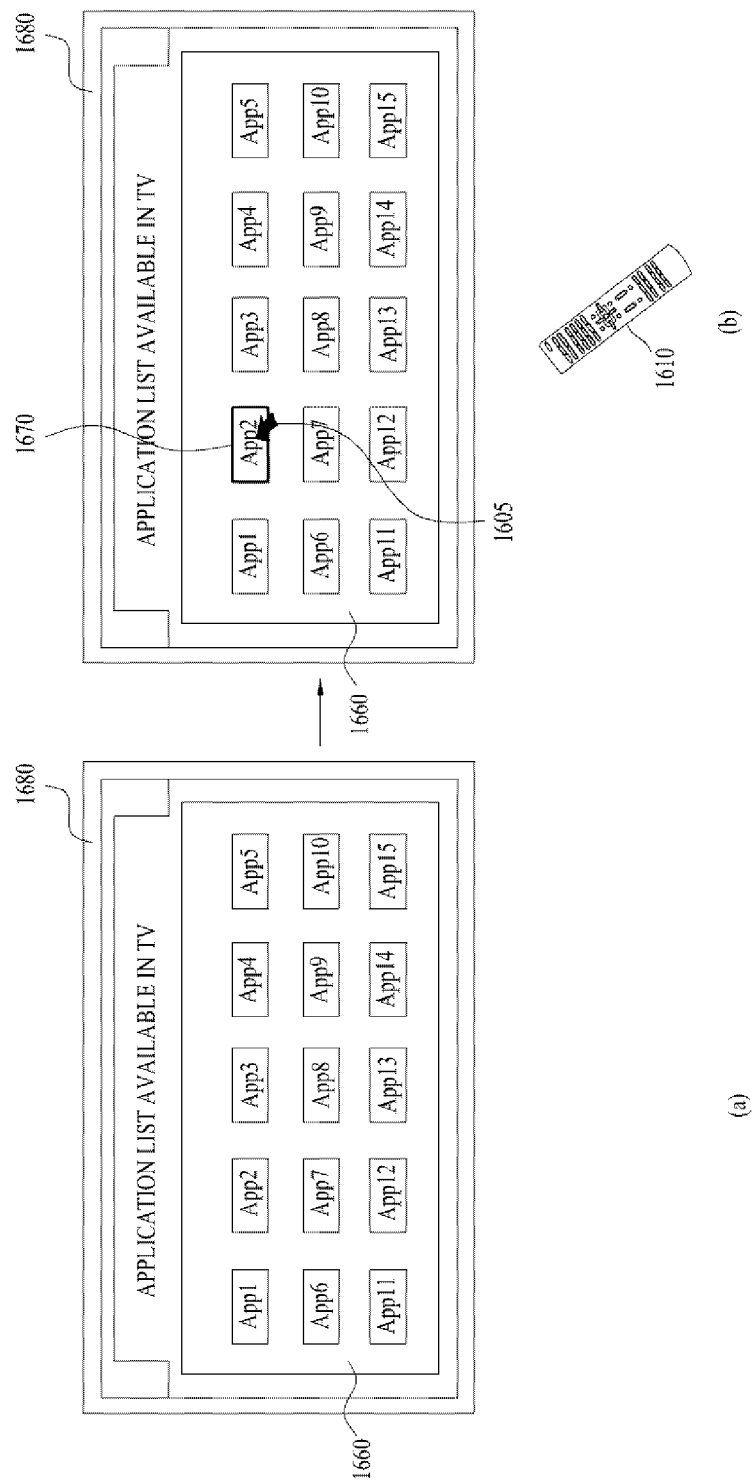
FIG. 16 is a diagram showing a second embodiment of a UI in either of the image display devices according to the embodiments of the present invention.

FIG. 16 is a diagram showing a second embodiment of a UI in either of the image display devices according to the embodiments of the present invention.

Figure 17:
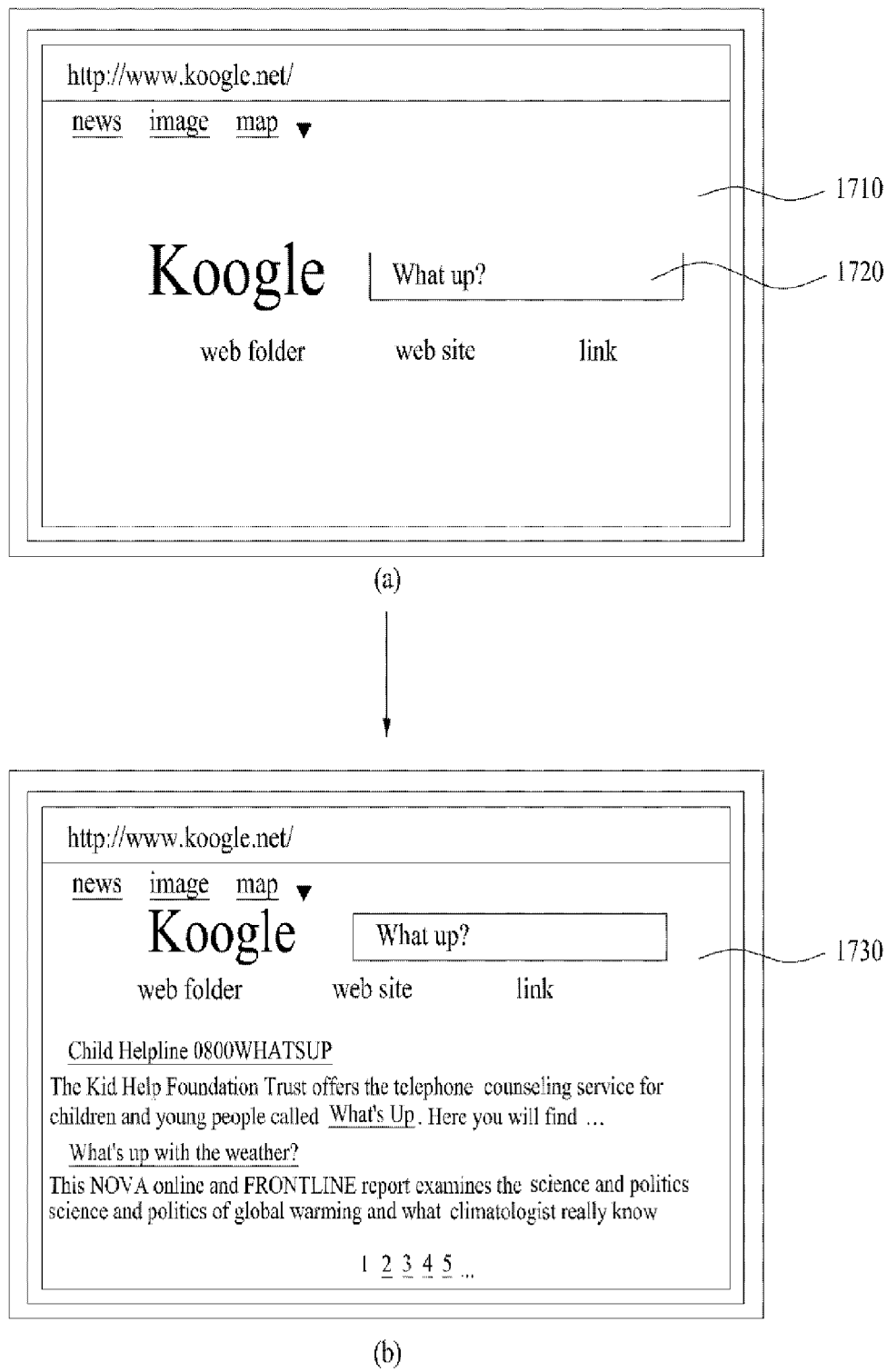
FIG. 17 is a diagram showing a third embodiment of a UI in either of the image display devices according to the embodiments of the present invention.

FIG. 17 is a diagram showing a third embodiment of a UI in either of the image display devices according to the embodiments of the present invention.

FIG. 18 is a diagram showing a fourth embodiment of a UI in either of the image display devices according to the embodiments of the present invention.

Figure 19:
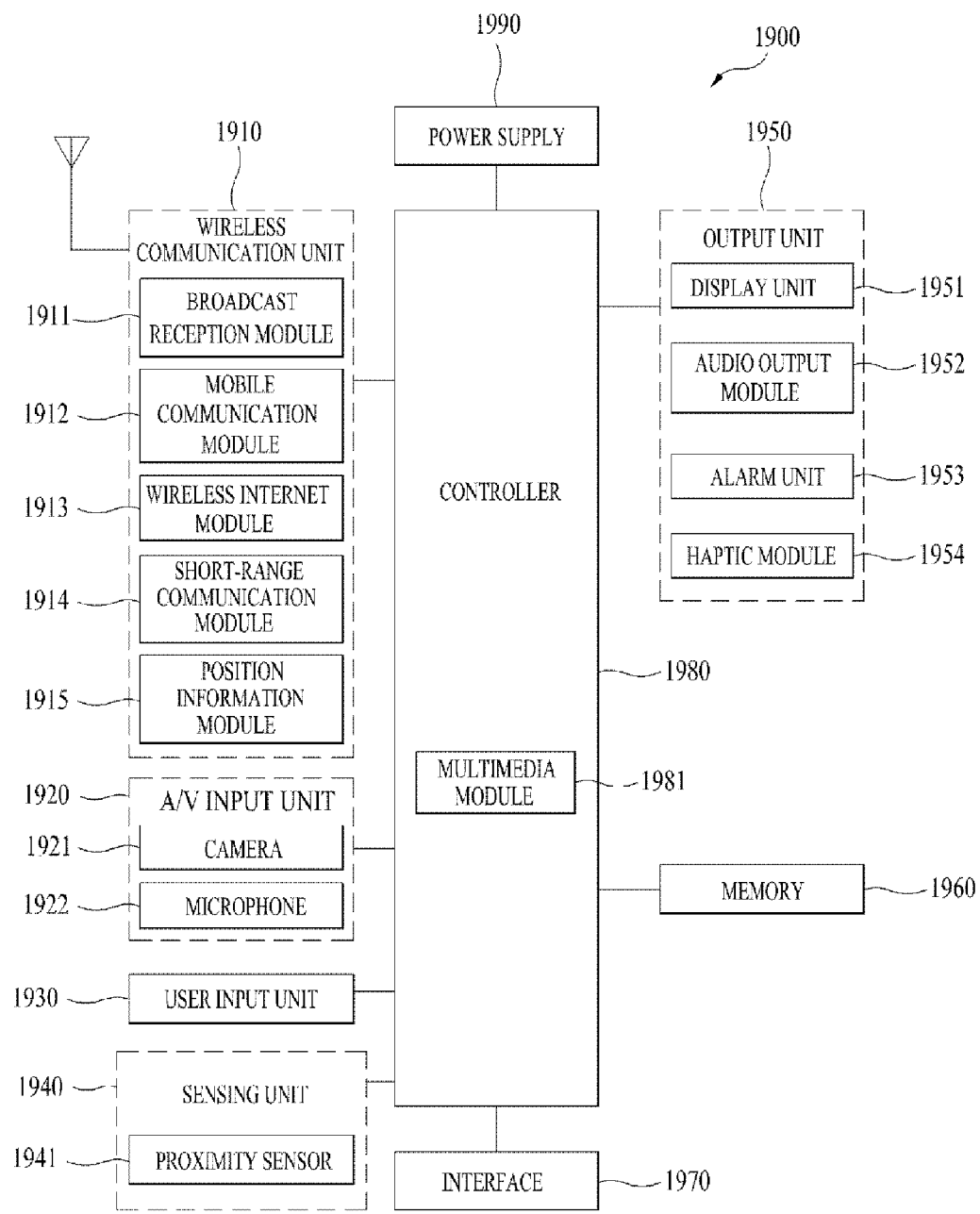
FIG. 19 is a block diagram of a user terminal which can be used as a game controller according to an embodiment of the present invention.

FIG. 19 is a block diagram of a user terminal which can be used as a game controller according to an embodiment of the present invention.

Referring to FIG. 15, an application list received over a network is displayed on the display 1580. A user may directly access a CP or an NP, search for various applications, and download the applications from the CP or the NP.

Specifically, FIG. 15(*a*) illustrates an application list 1510 available in a connected server, displayed on the display 180. The application list 1510 may include an icon representing each application and a brief description of the application. Because each of the image display devices according to the embodiments of the present invention is capable of full browsing, it may enlarge the icons or descriptions of applications received from the connected server on the display 1580. Accordingly, the user can readily identify applications.

FIG. 15(*b*) illustrates selection of one application 1520 from the application list 1510 using the pointer 1505 of the remote controller 1510. Thus, the selected application 1520 may be easily downloaded.

In association with the embodiment of the present invention, a game application according to the present invention may be included in the application list 1510.

The game application included in the application list 1510 may include a game application for performing a game play process and providing a display screen to the image display device and a game application for performing a user control function necessary to play a game.

Accordingly, a user may select a game application according to the embodiment of the present invention from the application list 1510 and download the game application to the image display device or the user terminal.

FIG. 16 illustrates an application list of the image display device, displayed on the display 1680. Referring to FIG. 16(*a*), when the user selects an application list view menu by manipulating the remote controller 1610, a list of applications 1660 stored in the image display device according to each of the embodiments of the present invention is displayed on the display 1680. While only icons representing the applications are shown in FIG. 16, the application list 1660 may further include brief descriptions of the applications, like the application list illustrated in FIG. 15. Therefore, the user can readily identify the applications.

FIG. 16(*b*) illustrates selection of one application 1670 from the application list 1660 using the pointer 1205 of the remote controller 1610. Thus, the selected application 1670 may be easily executed.

While it is shown in FIG. 16 that the user selects a desired item by moving the pointer 1605 using the remote controller 1610, the application may be selected in many other ways. For example, the user may select a specific item using a cursor displayed on the screen by combined input of an OK key and a direction key of a local key (not shown) or the remote controller 1610.

In another example, if the remote controller has a touch pad, the pointer 1605 moves on the display 1680 according to touch input of the touch pad. Thus the user may select a specific item using the touch-based pointer 1605.

FIG. 17 illustrates a Web page displayed on the display of the image display device.

Specifically, FIG. 17(*a*) illustrates a Web page 1710 with a search window 1720, displayed on the display. The user may enter a character into the search window 1720 by use of character keys (not shown) of a keypad displayed on a screen, character keys (not shown) of local keys, or character keys (not shown) of the remote controller.

FIG. 17(*b*) illustrates a search result page 1730 having search results matching a keyword entered into the search window, displayed on the display. Since the image display devices according to the embodiments of the present invention are capable of fully browsing a Web page, the user can easily read the Web page.

FIG. 18 illustrates another Web page displayed on the display.

Specifically, FIG. 18(*a*) illustrates a mail service page 1810 including an ID input window 1820 and a password input window 1825, displayed on the display. The user may enter a specific numeral and/or text into the ID input window 1820 and the password input window 1825 using a keypad (not shown) displayed on the mail service page, character keys (not shown) of local keys, or character keys (not shown) of the remote controller. Hence, the user can log in to a mail service.

FIG. 18(*b*) illustrates a mail page displayed on the display, after a user logs in to the mail service. For example, the mail page may contains items "read mail", "write mail", "sent box", "received box", "recycle bin", etc. In the "received box" item, mail may be ordered by sender or by title.

The image display devices according to the embodiments of the present invention are capable of full browsing when displaying a mail service page. Therefore, the user can conveniently use the mail service.

FIG. 19 is a block diagram of a user terminal according to an embodiment of the present invention.

The user terminal is a mobile terminal 1900 and includes a wireless communication module 1910, an audio/video (A/V) input unit 1920, a user input unit 1930, a sensing unit 1940, an output unit 1950, a memory 1960, an interface 1970, a controller 1980, and a power supply 1990. Since the components shown in FIG. 19 are not mandatory, the number of components included in the mobile terminal may be increased or decreased.

Hereinafter, the above components will be sequentially described.

The wireless communication module 1910 may include one or more modules for performing wireless communication between the mobile terminal 1900 and a wireless communication system or the mobile terminal 1900 and a network in which the mobile terminal 1900 is located. For example, the wireless communication module 1910 may include a broadcast reception module 1911, a mobile communication module 1912, a wireless Internet module 1913, a short-range communication module 1914 and a position information module 1915.

The broadcast reception module 1911 receives a broadcast signal and/or broadcast-related information from an external broadcast management server through a broadcast channel.

The mobile communication module 1912 transmits or receives a wireless signal to or from at least one of a base station, an external terminal and a server over a mobile communication network. The wireless signal may include a voice call signal, a video call signal or various types of data associated with transmission and reception of a text/multimedia message.

The wireless Internet module 1913 is an internal or external module for wireless Internet access which may be provided to the mobile terminal 1900. For wireless Internet access, a Wireless Local Area Network (WLAN) (i.e., Wi-Fi), Wireless Broadband (Wibro), World Interoperability for Microwave Access (WiMax), and High Speed Downlink Packet Access (HSDPA) may be used.

The short-range communication module 1914 performs short range communication. For short-range wireless communication, Bluetooth, Radio-Frequency IDentification (RFID), Infrared Data Association (IrDA), Ultra WideBand (UWB), and ZigBee may be used.

The wireless Internet module 1913 or the short-range communication module 1914 may transmit or receive data to or from a predetermined image display device such that the user terminal is used as a user controller of a predetermined game application.

For example, when a user searches the image display device for a user terminal connected over a network and a user terminal to be used as a user controller is selected during search, the image display device may transmit a predetermined control signal to the wireless communication unit of the selected user terminal and performs an operation for using the selected terminal as the user controller. If the user inputs a predetermined signal through the user terminal, the user terminal may transmit the predetermined signal to the image display device through the wireless communication unit so as to play the game application.

The position information module 1915 acquires the position of the mobile terminal and representative examples thereof include a Global Position System (GPS) module.

Referring to FIG. 19, the A/V input unit 1920 inputs an audio signal or a video signal and may include a camera 1921 and a microphone 1922. The camera 1921 processes an image frame such as a still image or a moving image obtained by an image sensor in a video communication mode or an image capture mode. The processed image frame may be displayed on the display 1951.

The microphone 1922 receives an external audio signal in a call mode, a recording mode or a voice recognition mode and processes the audio signal into electrical voice data. The microphone 1922 may perform various noise elimination algorithms for eliminating noise occurring when the external audio signal is received.

The user input unit 1930 generates input data enabling the user to control the operation of the terminal. The user input unit 1930 may include a keypad, a dome switch, a touchpad (static pressure/static electrical), a jog wheel and a jog switch.

The sensing unit 1940 detects a current state of the mobile terminal 1900 such as whether the mobile terminal 1900 is opened or closed, the position of the mobile terminal 1900, or whether or not the user has contacted the mobile terminal 1900 and generates a sensing signal for controlling the operation of the mobile terminal 1900. The sensing unit 1940 may sense whether the mobile terminal 1900 is opened or closed when the mobile terminal 1900 is a slide phone. The sensing unit 1940 may also be responsible for sensing functions associated with whether or not the power supply unit 1990 is supplying power or whether or not the interface unit 1970 is coupled to an external device. The sensing unit 1940 may include a proximity sensor 1941.

The sensing unit 1940 may generate a signal to be used as a predetermined game play signal if the user terminal is used as a user controller of a predetermined game application which is being executed by the image display device according to the embodiment.

For example, if the game application is a poker game, a user may shake the user terminal such that the sensing unit 1940 generates a predetermined control signal. Then, the generated signal may be transmitted to the image display device through the wireless communication unit 1910 so as to input a command for reducing a stake in the poker game.

The output unit 1950 is provided to output an audio or video signal or a tactile signal and may include the display unit 1951, an audio output module 1952, an alarm unit 1953, and a haptic module 1954.

The display unit 1951 displays (outputs) information processed in the mobile terminal 1900. For example, when the mobile terminal 1900 is in a communication mode, the display unit 1951 displays a communication-related User Interface (UI) or Graphical User Interface (GUI). When the mobile terminal 1900 is in a video communication mode or an image capture mode, the display unit 1951 may display captured or received images and may display a corresponding UI or GUI.

The display unit 1951 may include at least one of a liquid crystal display (LCD), a thin film transistor-liquid crystal display (TFT-LCD), an organic light-emitting diode (OLED), a flexible display, and a 3D display.

A part of the above displays may be a transparent or light-transmittable display. Representative examples of the transparent display include a Transparent OLED (TOLED). The back side of the display unit 1951 may have a light-transmittable structure. By this structure, the user may view an object located on the back side of the terminal body through an area corresponding to the display unit 1951 of the terminal body.

The display unit 1951 may output a predetermined game play screen if the user terminal 1900 is used as a user controller of a game application which is being executed in a predetermined image display device.

For example, if the game application is a poker game, a hidden card corresponding to a player identifier assigned to the user terminal 1900 may be output on the display unit 1951.

Two or more display units 1951 may be provided according to implementations of the mobile terminal 1900. For example, a plurality of display units may be separately or integrally provided on one surface of the mobile terminal 1900 or may be respectively provided on different surfaces of the mobile terminal 1900.

If the display unit 1951 and a sensor (hereinafter, referred to as a touch sensor) for detecting a touch operation have a layered structure (hereinafter, referred to as a touchscreen), the display unit 1951 may function as an input device as well as an output device. The touch sensor may be a touch film, a touch sheet or a touch pad.

The touch sensor may be configured to convert a change in pressure applied to a specific portion of the display unit 1951 or a change in capacitance generated in a specific portion of the display unit 1951 into an electrical input signal. The touch sensor may be configured to detect not only a touch location and area but also touch pressure.

If a touch input of the touch sensor is detected, a signal(s) corresponding thereto is sent to a touch controller. The touch controller processes the signal(s) and then transmits data corresponding to the processed signal(s) to the controller 1980. Thus, the controller 1980 may check which portion of the display unit 1951 is touched.

In the embodiment, if the user terminal is used as a user controller of a game application which is being executed by the image display device, the touch input of the touch sensor is used to play the game.

For example, if the game application is a poker game, when the user touches a portion, in which a predetermined card is displayed, of the display unit 1951 of the user terminal, the touch sensor detects the input and transmits a signal corresponding to the input to the touch controller and the controller 1980 and transmits the signal to the image display device for executing the game application through the wireless communication unit 1910. The image display device receives the signal and inputs a user operation for exhibiting the predetermined card in the poker game.

Referring to FIG. 19, the proximity sensor 1941 may be disposed near the touchscreen and an internal region of the mobile terminal surrounded by the touchscreen. The proximity sensor 1941 can detect the presence or absence of an object that is approaching or near to a predetermined detection surface without physical contact based on electromagnetic force or infrared rays. The proximity sensor has long life span and a wider variety of applications as compared to a contact sensor.

Examples of the proximity sensor 1941 include a transmission photoelectric sensor, a direct reflection photoelectric sensor, a mirror reflection photoelectric sensor, a high-frequency oscillation proximity sensor, a capacitive proximity sensor, a magnetic proximity sensor, and an infrared proximity sensor. If the touchscreen is static electrical, the proximity sensor is configured to detect the proximity of the pointer by a change in an electric field according to the proximity of the pointer. In this case, the touchscreen (touch sensor) may be regarded as a proximity sensor.

Hereinafter, for convenience of description, an action in which the pointer approaches the touchscreen without contact so as to recognize the location of the point on the touchscreen is referred to as "proximity touch" and an action in which the pointer contacts the touchscreen is referred to as "contact touch". A proximity touch location of the pointer on the touchscreen refers to a location in which the pointer vertically corresponds to the touchscreen when the proximity touch of the pointer is performed.

The proximity sensor 1941 detects proximity touch and proximity patterns (e.g., a proximity touch distance, a proximity touch direction, a proximity touch speed, a proximity touch time, a proximity touch location, a proximity touch movement state, etc.). Information corresponding to the detected proximity touch operation and proximity touch pattern may be output on the touchscreen.

The audio output module 1952 may output audio data received from the wireless communication module 1910 or stored in the memory 1960 in a call signal reception mode, a communication mode, a recording mode, a voice recognition mode, or a broadcast reception mode. The audio output module 1952 may output an audio signal associated with a function (e.g., an incoming call sound, a message reception sound, etc.) performed by the mobile terminal 1900. The audio output module 1952 may include a receiver, a speaker, a buzzer, etc.

The alarm unit 1953 outputs a signal notifying the user that an event has occurred in the mobile terminal 1900. Examples of the event occurring in the mobile terminal 1900 include incoming call reception, message reception, key signal input, and touch input. The alarm unit 1953 outputs a signal notifying the user of the occurrence of an event in a different form from the audio or video signal, that is, in the form of vibrations. Since the video signal or the audio signal may be output through the display unit 1951 or the audio output unit 1952, the display unit 1951 or the audio output unit 1952 may be regarded as the alarm unit 1953.

The haptic module 1954 generates a variety of tactile effects that the user can feel. A typical example of the tactile effect generated by the haptic module 1954 is vibration. The haptic module 1954 may adjust the intensity and pattern of vibration generated by the haptic module 1954. For example, the haptic module 1954 may combine different vibrations and output the combined vibration or sequentially output different vibrations.

In addition to vibration, the haptic module 1954 may generate various tactile effects such as a stimulus effect by an arrangement of pins that move perpendicular to the touched skin surface, a stimulus effect by air blowing or suction through an air outlet or inlet, a stimulus effect through brushing of the skin surface, a stimulus effect through contact with an electrode, a stimulus effect using electrostatic force, and a stimulus effect through temperature change using an endothermic or exothermic element.

The haptic module 1954 may be implemented so as to allow the user to perceive such effects not only through direct tactile sensation but also through kinesthetic sensation of fingers, hands, or the like of the user. Two or more vibration modules 1954 may be provided.

The memory 1960 may store a program for operation of the controller 1980 and may temporarily store input or output data (for example, a phonebook, messages, still images, and moving images). The memory 1960 stores data regarding vibrations and sounds of various patterns output when a touch input of the touchscreen is detected.

The memory 1960 may include a storage medium of at least one of a variety of types including a flash memory type, a hard disk type, a multimedia card micro type, a card memory type (for example, SD or XD memory), RAM, Static Random Access Memory (SRAM), ROM, Electrically Erasable Programmable Read-Only Memory (EEPROM), Programmable Read-Only Memory (PROM), magnetic memory, magnetic disk, optical disc. The mobile terminal 1900 may operate in association with a web storage that performs a storage function of the memory 1960 over the Internet.

The interface 1970 serves as an interface with all external devices connected to the mobile terminal 1900. The interface 1970 may receive data from an external device, receive power from and transmit power to the components of the mobile terminal 1900 or transmit data of the mobile terminal 1900 to an external device. Examples of the interface 1970 include a wired/wireless headset port, an external battery charger port, a wired/wireless data port, a memory card port, a port for connecting a device including an identity module, an audio Input/Output (I/O) terminal port, a video I/O terminal port, and an earphone port.

The identity module is a chip for storing a variety of information for authenticating use rights of the mobile terminal 1900 and includes a User Identity Module (UIM), a Subscriber Identity Module (SIM), a Universal Subscriber Identity Module (USIM), etc. The device (hereinafter, referred to as an identity device) including the identity module may be manufactured in the form of a smart card. Accordingly, the identity device may be connected to the terminal 1900 through a port.

The controller 1980 controls the overall operation of the mobile terminal 1900. For example, the controller 1980 performs control and processing associated with voice communication, data communication, video communication, and the like. The controller 1980 may include a multimedia playback module 1981 for multimedia reproduction. The multimedia playback module 1981 may be implemented in the controller 1980 or may be implemented separately from the controller 1980.

The controller 1980 may perform a pattern recognition process for recognizing handwriting input and drawing input performed on the touchscreen.

If the user terminal is used as a user controller of a game application which is being executed in the image display device, the controller 1980 may control output of predetermined game execution information on the display 1951 and transmission of a signal of each module or sensor of the user terminal to the image display device.

That is, according to the embodiment, if a predetermined signal indicating that the user terminal is selected as the user controller is received from the image display device, the controller 1980 controls reception of the predetermined game execution information through the wireless communication unit 1910, output of the predetermined game execution information to the display 1951, and transmission of a touch signal sensed by the touch sensor, a location change signal determined by a location information module, etc. to the image display device which is executing the game application through the wireless Internet module 1913 or the short-range communication module 1914.

Under control of the controller 1980, the power supply unit 1990 receives external power or internal power and supplies power required for operation to each component.

Figure 20:
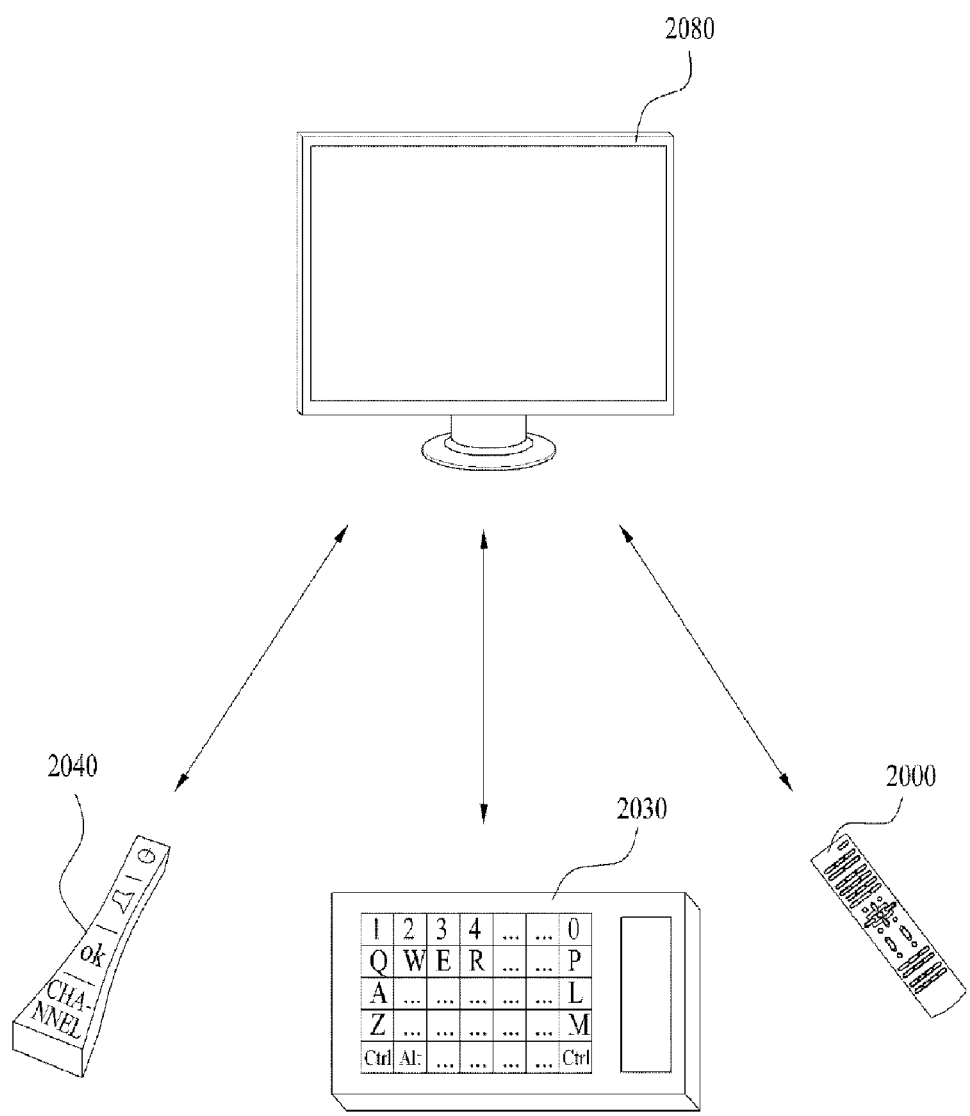
FIG. 20 is a diagram showing remote controllers of an image display device according to an embodiment of the present invention.

FIG. 20 is a diagram showing remote controllers of an image display device according to an embodiment of the present invention.

In the embodiment, in order to perform various operations of the present invention, various User Input Devices (UIDs) which can perform wired/wireless communication with the image display device 2080 may be used as a remote controller.

In the communication unit, various communication standards such as Bluetooth, Radio-Frequency IDentification (RFID), Infrared Data Association (IrDA), Ultra WideBand (UWB), ZigBee, and Digital Living Network Alliance (DLNA) may be used.

The UID may include a magic remote controller 2040, a remote controller 2030 including a keyboard and a touch pad, etc. in addition to a general remote controller 2000.

The general remote controller 2000 includes predetermined key input buttons and a numeric keypad.

The magic remote controller 2040 includes a gyro sensor mounted therein and recognizes vibrations or rotation of a hand holding the remote controller. When a user moves in all directions while holding the remote controller, a pointer moves and thus the user can readily select a desired broadcast channel or menu item.

The remote controller 2030 including the keyboard and the touch pad may be used to input text to the image display device and to input a signal for moving the pointer or enlarging or reducing a photo or a moving image through the touch pad.

That is, predetermined text input or menu item selection according to the embodiment of the present invention may be readily performed through the above-described various UIDs.

Figure 21:
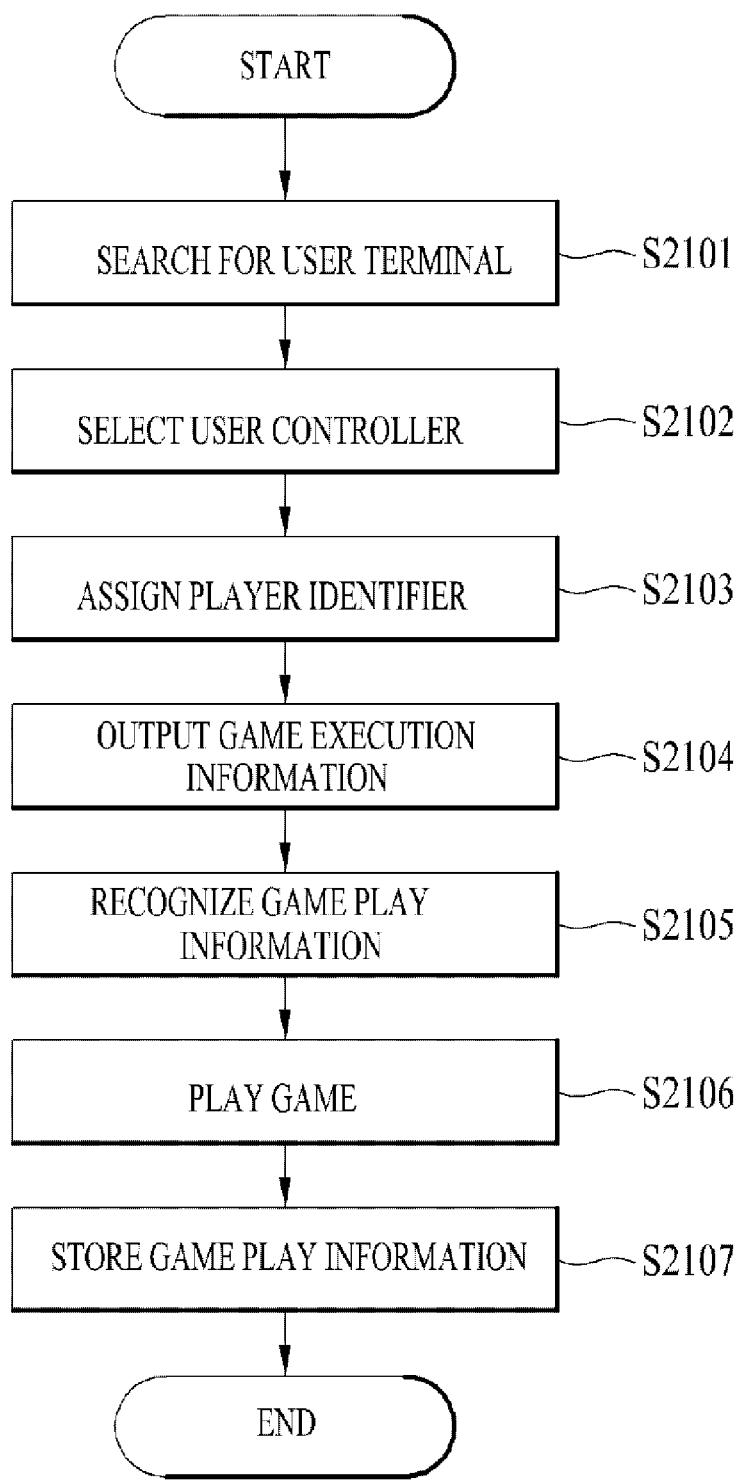
FIG. 21 is a flowchart illustrating a process of providing a game application according to an embodiment of the present invention.

FIG. 21 is a flowchart illustrating a process of providing a game application according to an embodiment of the present invention.

Referring to FIG. 21, the image display device according to the embodiment of the present invention searches for user terminals connected over a network and outputs a list of user terminals on the display of the image display device (S2101).

The network connection unit may include an Ethernet port for connection to a wired network and include Wireless Local Area Network (WLAN) (i.e., Wi-Fi), Wireless Broadband (WiBro), World Interoperability for Microwave Access (WiMax), and High Speed Downlink Packet Access (HS-DPA), for connection to wireless networks.

The list of user terminals may be configured by searching networks in the image display device whenever a game application is executed or the user terminals searched for when a game application is executed in the past are stored in the memory of the image display device and the list of user terminals may be configured using the stored user terminals.

Next, the image display device enables the user to select a user terminal to be used as a user controller (S2102).

The image display device enables the user to select user terminals to be used as the user controller from the list of user terminals such that the number of user terminals corresponds to the number of game players.

Next, if the number of game players is 3 and the number of selected user terminals is 3, unique player identifiers, namely, player 1, player 2 and player 3 are respectively assigned to the three game players (S2103). According to an embodiment, the user may select and input a unique player identifier.

Next, the game execution information is output to the image display device and the user terminals (S2104).

At this time, different game execution information may be output to the image display device and the user terminals.

For example, if the game application is a poker game application, betting information and opened card information commonly necessary for a plurality of game players are displayed to the display of the image display device and hidden card information of each player may be output to the display of each user terminal. Thus, the users can easily play the game.

Next, game play information is recognized through the user terminal (S2105) and the game of the image display device is played using the recognition information (S2106).

The user terminal which will be used as the user controller may include a motion recognition sensor and a touch sensor and transmit signals sensed by the sensors to the image display device so as to play the game.

For example, if the game application is a poker game, it is recognized that the user folds when the user puts the display of the user terminal including the motion recognition sensor face down. If a touch input is performed through the touch sensor of the user terminal, a command for discarding a held card or increasing a stake may be input.

Next, the image display device stores game play information in a predetermined server (S2107).

For example, if the game application is a poker game, the amount of cash possessed by the user, win/loss information, user ranking information, etc. are stored in the predetermined server over the network and may be checked as desired by the user.

Thus, the users who use the game application share the game play information.

Accordingly, even when a separate game controller is not additionally included in the image display device, the user can use the user terminal as the game controller.

In addition, since the user plays the game using the function of the user terminal, that is, receives a separate game screen through the user terminal on a player basis or inputs a command necessary to play the game, the user can more conveniently and efficiently use the game application.

Figure 22:
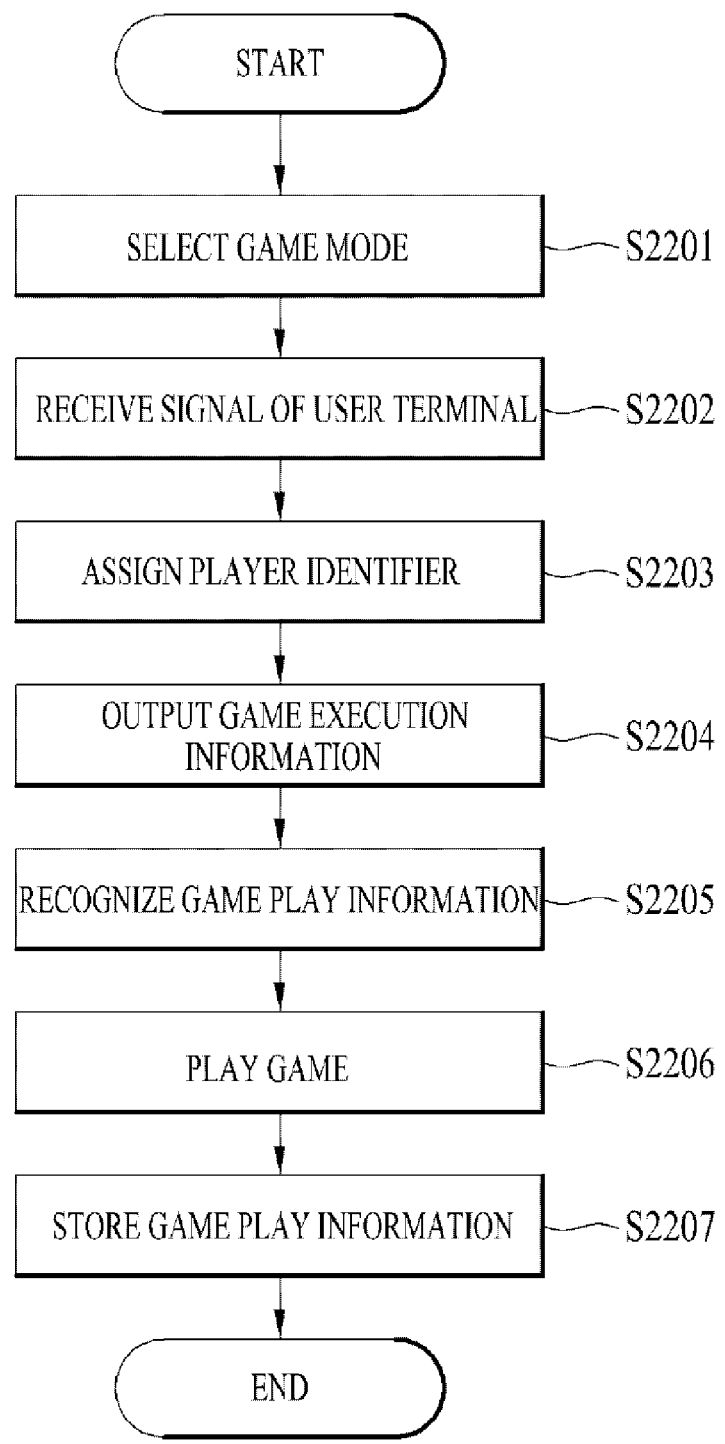
FIG. 22 is a flowchart illustrating a process of providing a game application according to another embodiment of the present invention.

FIG. 22 is a flowchart illustrating a process of providing a game application according to another embodiment of the present invention.

In the embodiment of the present invention, unlike FIG. 21, the image display device opens a game room for playing a game, receives room IDs from user terminals, and assigns player identifiers to the user terminals, thereby playing a game.

That is, first, if the game application is executed, the image display device receives a game mode selection signal (S2201).

In the embodiment, if the game is played using the game application, the image display device may set a game mode by changing the number of users included in the played game.

That is, for example, a single player mode, a two-player mode, a four-player mode, etc. may be used.

Next, the image display device opens a game room according to the game mode selection signal.

Accordingly, if the game mode setting signal is received from the user, the image display device opens the game room according to the set game mode and assigns a room ID to the opened game room. The room ID may include a unique room ID of the image display device, a room ID received from the user, or a randomly assigned room ID.

The menu screen for setting the game mode will be described in detail below with reference to FIG. 24.

Next, a signal is received from the user terminal (S2202).

Figure 26:
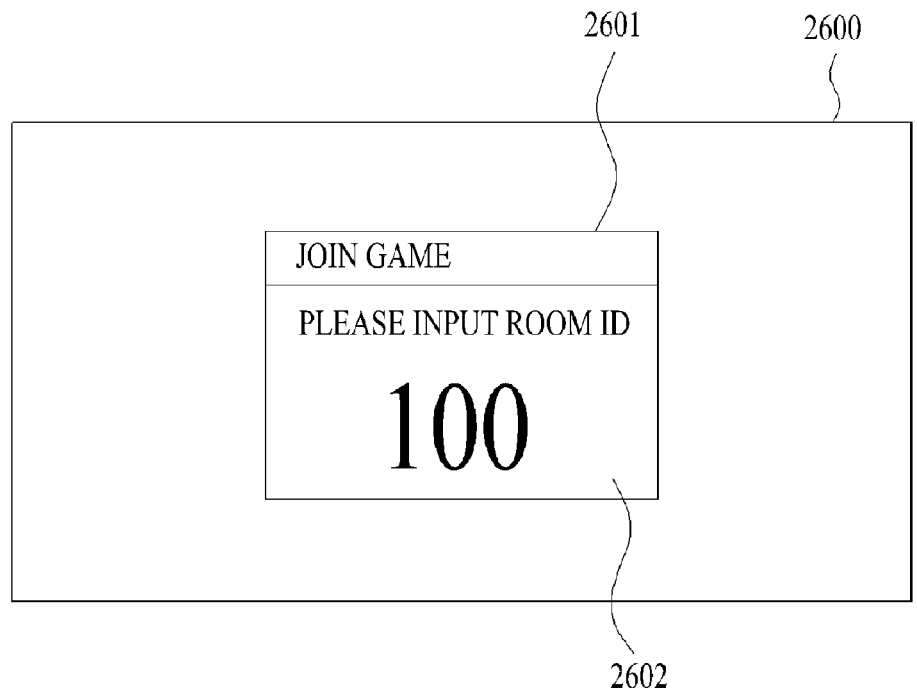
FIG. 26 is a diagram showing a display screen including a room ID input menu according to an embodiment of the present invention.

The image display device displays a room ID input menu shown in FIG. 26 and receives a room ID from a predetermined user terminal.

That is, if the image display device and the predetermined user terminal are connected over a wired/wireless network and a specific character string corresponding to the room ID is input to the user terminal, the user terminal transmits the specific character string to the image display device and the image display device determines whether the transmitted specific character string matches the room ID of the opened game room.

For example, the specific character string corresponds to an alphabet, a number or a combination of them. In other words, the room ID may be an alphabet (a, b, c, A, B, C . . . ), a number (1, 2, 3 . . . ) or a combination of them (SYK7, 111XYZ . . . ).

Next, a player identifier is assigned to the user terminal to which the room ID is input (S2203).

The image display device may assign the player identifier to the user terminal to which the specific string is input, if the specific character string transmitted from the user terminal matches the room ID of the opened game room for playing the game.

Figure 28:
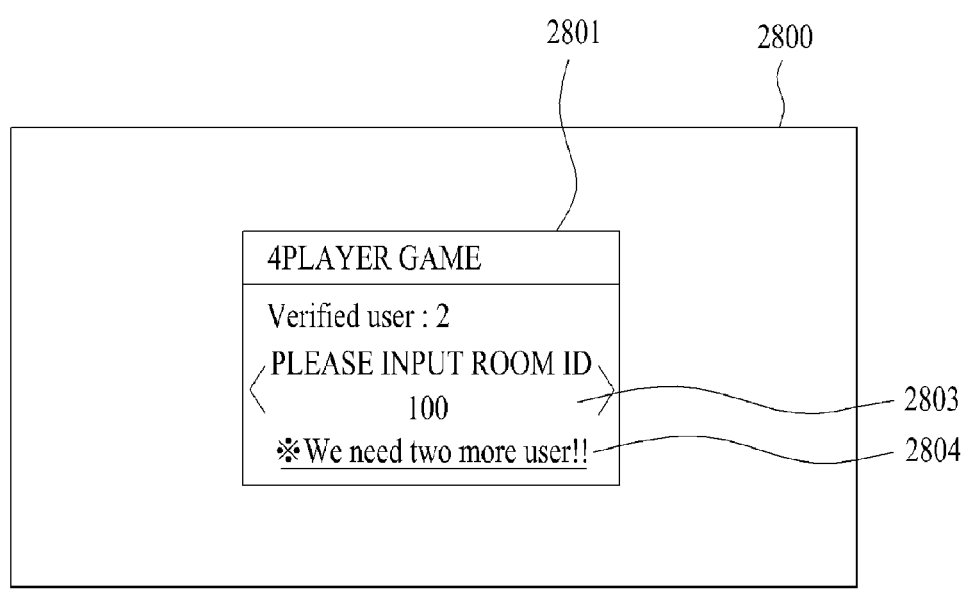
FIG. 28 is a diagram showing a display screen including a room ID input menu according to another embodiment of the present invention.

If a game mode requiring a plurality of user terminals is set, the image display device displays a room ID input menu shown in FIG. 28 such that player identifiers are assigned to user terminals corresponding in number to the number of user terminals required to play the game.

In addition, step S2204 of outputting game execution information to step S2207 of storing game play information are equal to steps S2104 to S2107 of FIG. 21 and thus a detailed description thereof will be omitted.

Figure 23:
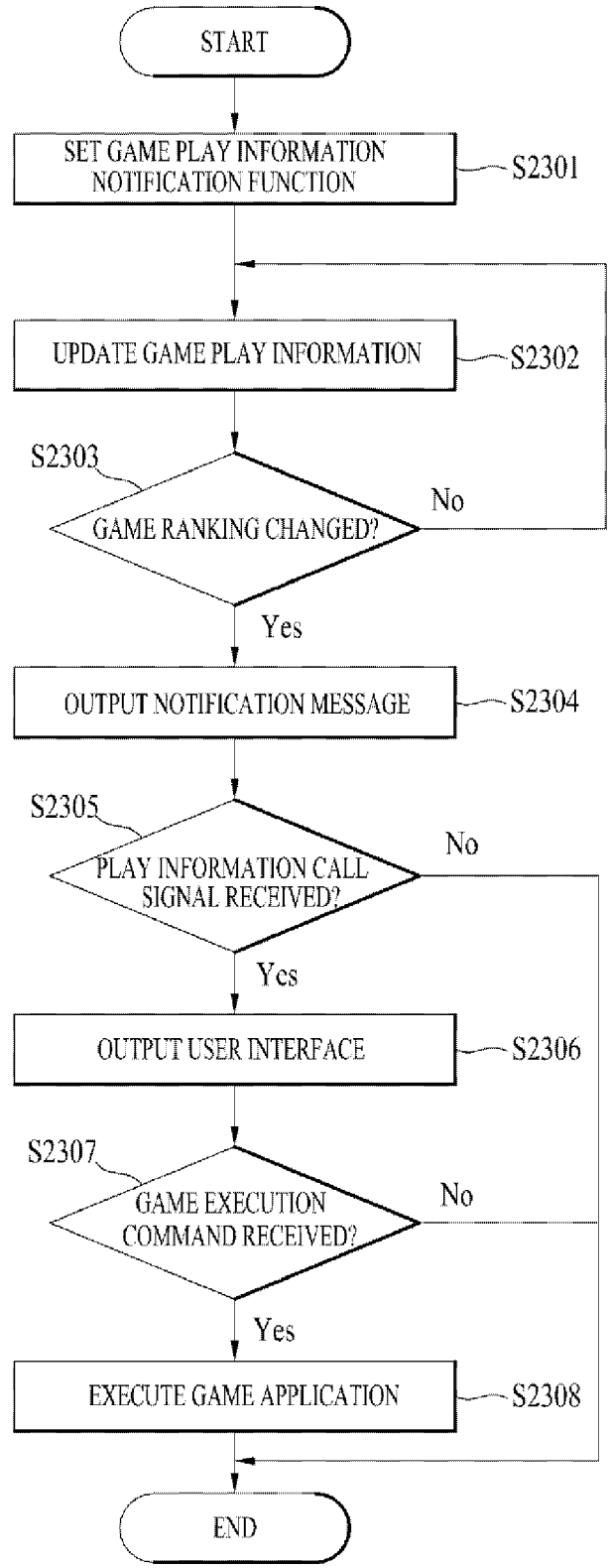
FIG. 23 is a flowchart illustrating a game play information notification method according to an embodiment of the present invention.

FIG. 23 is a flowchart illustrating a game play information notification method according to an embodiment of the present invention.

Referring to FIG. 23, a game play information alarm function is set in the image display device according to one embodiment of the present invention (S2301).

In the embodiment, if the user wishes to receive an alarm message of game play information while utilizing predetermined content through the image display device, a predetermined menu item of the image display device may be selected so as to set the game play information alarm function.

Next, a predetermined server updates game play information stored in the server (S2302).

As described with reference to FIG. 21, if a predetermined image display device transmits game play information, the server updates the game play information previously stored therein to the received game play information.

In the embodiment, the game play information may include at least one of game score information, game win/loss information and game win rate information.

Next, the server determines whether or not game user ranking is changed according to the game score due to update (S2303).

For example, it is determined whether user ranking has been changed from 1st to 2nd or 3rd according to the update of the game score. In the embodiment, user ranking may be set according to win/loss information and stake information in addition to the game score.

Next, if user ranking has been changed, the server sends a predetermined signal to the image display device and the image display device outputs a predetermined alarm message to the display (S2304).

The alarm message may include information about user ranking change and may also include image data according to the type of the game application.

Next, the image display device determines whether a game play information call signal is received (S2305).

The game play information call signal includes a selection signal indicating that the user selects the alarm message using a predetermined pointer or a signal input by the user using a hot key of the remote controller or the image display device.

If the game play information call signal is received, the image display device outputs a user interface including game play information on the display (S2306).

The user interface may include current user ranking information and change information so as to enable the user to identify the game play information change and include a shortcut menu item of the game application so as to enable the user to easily execute the game application.

Next, the image display device determines whether the image display device receives a shortcut signal of the game application (S2307).

The user inputs a selection signal of a shortcut menu item of the user interface or a hot-key input signal of the remote controller or the image display device through the user input interface so as to input the shortcut signal of the game application.

Next, the image display device executes the game application (S2308) upon receiving the shortcut signal of the game application.

That is, when the user inputs the shortcut signal of the game application through the user input interface, the controller of the image display device controls execution of the game application in the image display device.

Accordingly, according to the present invention, it is possible to readily identify the change information of the game play information even when the user does not execute the game application while performing another operation using the image display device.

Figure 24:
FIG. 24 is a diagram showing a display screen including a game mode setup menu according to an embodiment of the present invention.

FIG. 24 is a diagram showing a display screen 2400 including a game mode setup menu according to an embodiment of the present invention.

In the embodiment, the image display device may receive the game menu setup signal from the user if the user executes the game application.

That is, the image display device may set different game modes according to the number of users who play the game and thus receive a user input signal for setting the game modes, when playing the game using the game application.

Referring to FIG. 24, the image display device may display the game mode setup menu. Accordingly, the user may select a single game mode 2401 so as to play a single-player game, select a 2-player mode 2402 so as to play a two-player game or select a 4-player mode 2403 so as to play a four-play game using a predetermined user input device in a state in which the game mode setup menu is displayed.

Figure 35:
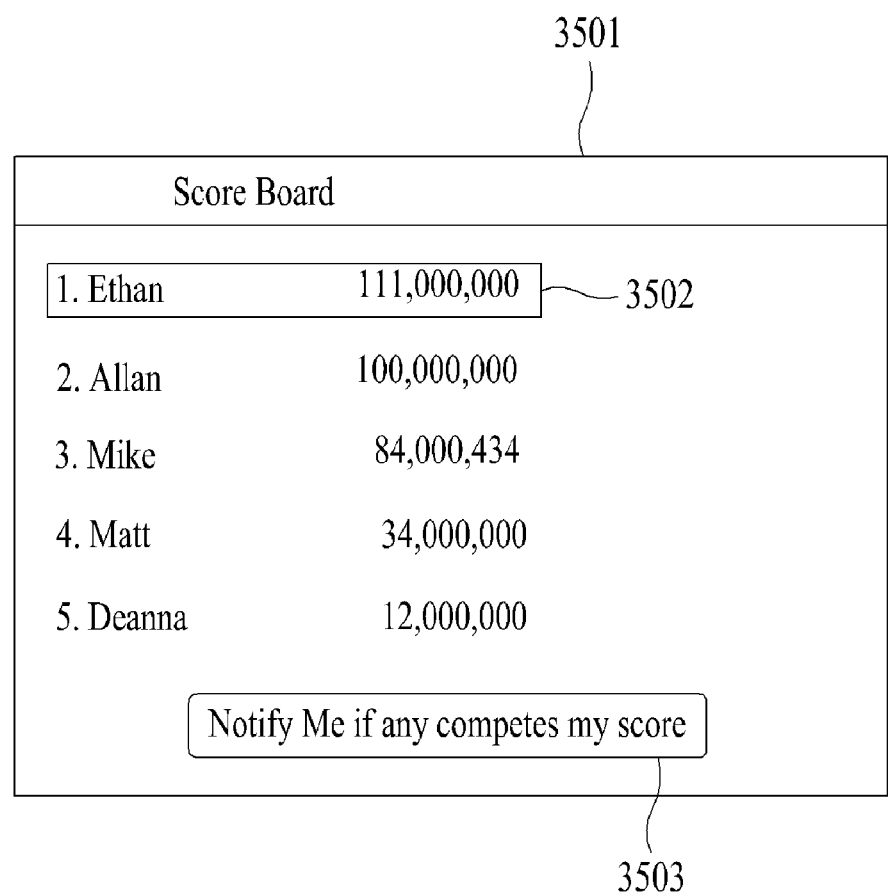
FIG. 35 is a diagram showing a display screen including a game score board according to an embodiment of the present invention.

By selecting a score board call menu 2404, a score board may be displayed as shown in FIG. 35.

In the embodiment, the image display device may display the screen shown in FIG. 26 and receive a room ID, when the user selects a predetermined game mode.

Accordingly, the image display device may send information regarding a mode, which can be implemented by the game application, to the user and the user may readily select a desired mode using the menu screen shown in FIG. 24.

Figure 25:
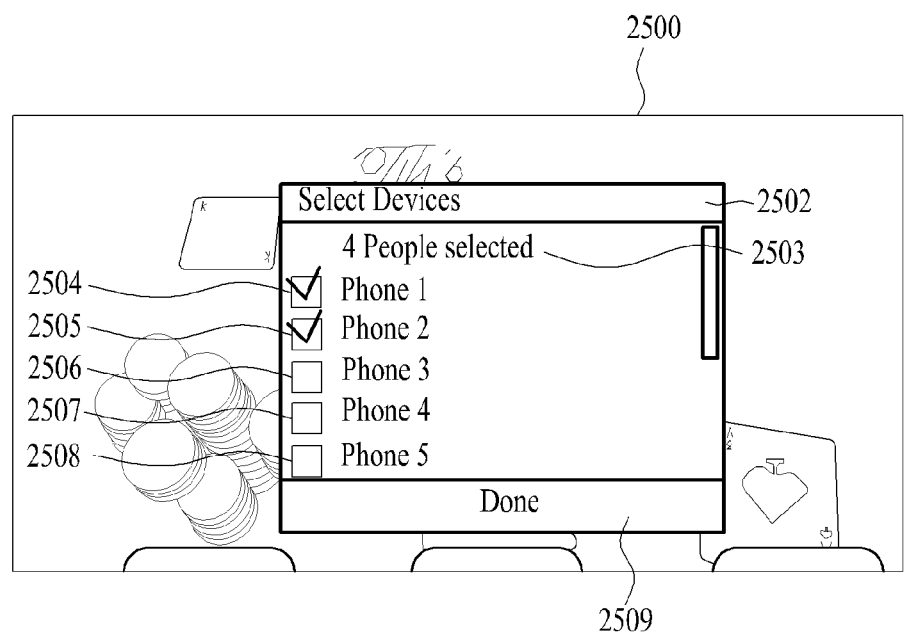
FIG. 25 is a diagram showing a display screen including a user controller selection menu according to an embodiment of the present invention.

FIG. 25 is a diagram showing a display screen including a user controller selection menu according to an embodiment of the present invention.

More specifically, the user interface for setting a user terminal used as the user controller in the image display device according to one embodiment of the present invention is shown.

Referring to FIG. 25, the image display device searches for user terminals connected over the network and outputs the user terminals so as to enable the user to select a user terminal which will be used as the user controller.

For example, the image display device displays the user interface including the user controller setup menu (2500). The user controller setup menu may include a list 2502 of user terminals connected to the image display device over the network.

For connection to networks, various communication standards such as Bluetooth, Wireless Local Area Network (WLAN) (i.e., Wi-Fi), Wireless Broadband (WiBro), World Interoperability for Microwave Access (WiMax), and High Speed Downlink Packet Access (HSDPA) may be used.

The user terminal may include various devices capable of performing image display and network connection, such as a mobile communication terminal or a tablet PC.

The user interface includes information 2503 regarding the number of game players and the user selects a user terminal to be used as the game controller from the list of the user terminals. The selected user terminals 2504 and 2505 may be displayed so as to be distinguishable from the unselected user terminals 2506, 2507 and 2508.

The user may select a user controller setup completion menu item 2509 so as to complete user controller selection, if the selection of the user terminal to be used as the user controller is completed.

The user may readily identify the user terminal which can be currently used as the user controller through the user interface and readily select the user terminal to be used as the user controller.

FIG. 26 is a diagram showing a display screen 2600 including a room ID input menu according to an embodiment of the present invention.

In the embodiment, the image display device may receive a room ID input signal for assigning a player identifier from a user terminal used as the game controller, if the game application is executed.

That is, the image display device may open a game room for playing a game and assign a room ID to the opened game room, if a game mode is selected. In the embodiment, the room ID may be any character or number or may be a specific character or number set by a user.

Accordingly, the image display device may display a room ID input menu 2601 as shown in FIG. 26. The room ID input menu 2601 may include information 2602 regarding the room ID of the currently opened game room.

Therefore, the user can check that the room ID assigned to the game room of the game which is currently being played is "100". Then, the user may input "100" to the user terminal so as to receive a play identifier from the image display device using the user terminal. Thus, the user terminal can be used as a game controller.

Figure 27:
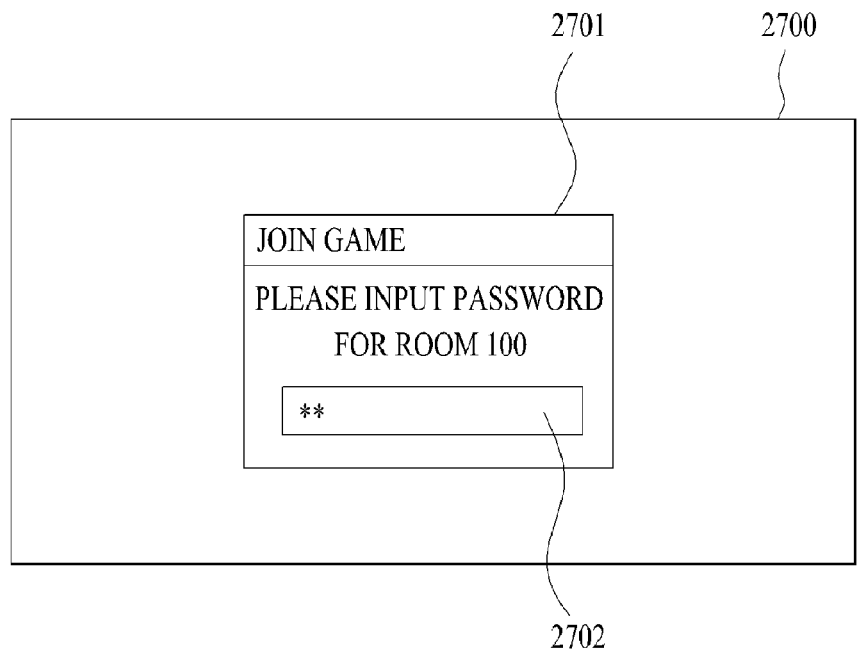
FIG. 27 is a diagram showing a display screen including a password input menu according to an embodiment of the present invention.

FIG. 27 is a diagram showing a display screen 2700 including a password input menu according to an embodiment of the present invention.

In the embodiment, if a user opens a game room for playing a game through an image display device and the image display device receives a certain room ID from a predetermined user terminal so as to play the game, the image display device may request a predetermined password input when the user terminal is used as the game controller.

That is, in order to prevent a user terminal which is unwanted by a person who opens a game room from being erroneously set as the game controller, the user may set a predetermined password to the game room.

Accordingly, when the user inputs a specific room ID on the room ID input request screen shown in FIG. 26, a password input menu 2701 may be displayed on the display screen of the image display device or the display screen of the user terminal.

The user may input a password to a password input window 2702 using the user terminal. The input password may be displayed as special characters as shown in FIG. 28, for security.

In the embodiment, an On Screen Display (OSD) keyboard for inputting the password may be displayed on the display screen of the image display device or the user terminal.

That is, the user may input the password to the password input window 2702 and receive the game player identifier, thereby playing the game.

If the wrong password is input or a password is not input for a predetermined time or longer, the image display device may display an error message and may not assign a game player identifier to the user terminal.

FIG. 28 is a diagram showing a display screen 2800 including a room ID input menu according to another embodiment of the present invention.

In the embodiment, if a game mode of a game which is being played on the image display device includes a plurality of game players, the image display device may include information regarding the number of game players required for the room ID input menu 2801 and the number of checked players.

That is, for example, if the user selects a 4-player game mode and opens a game room having a room ID of "100", the image display device may display "4 PLAYER GAME" in the room ID input menu 2801 and notify the user that four players are needed for game play. The room ID input menu may include information 2803 indicating that the room ID is "100", information 2803 regarding the number of user terminals through which the room ID of "100" is input, and information 2804 regarding the number of user terminals which are additionally needed.

In addition, the above information may be changed according to the input of the room IDs using the user terminal. That is, if another user terminal inputs "100" as the room ID, information included in the room ID input menu 2801 may be changed to "verified User: 3" and "We need one or more users".

The image display device may display an error message if the room ID input signals of the user terminals corresponding in number to the number of players necessary to play the game are not received.

That is, the user can readily check information regarding the number of user terminals required to play the game, the number of user terminals that have input the room IDs, and the additional number of user terminals required.

Figure 29:
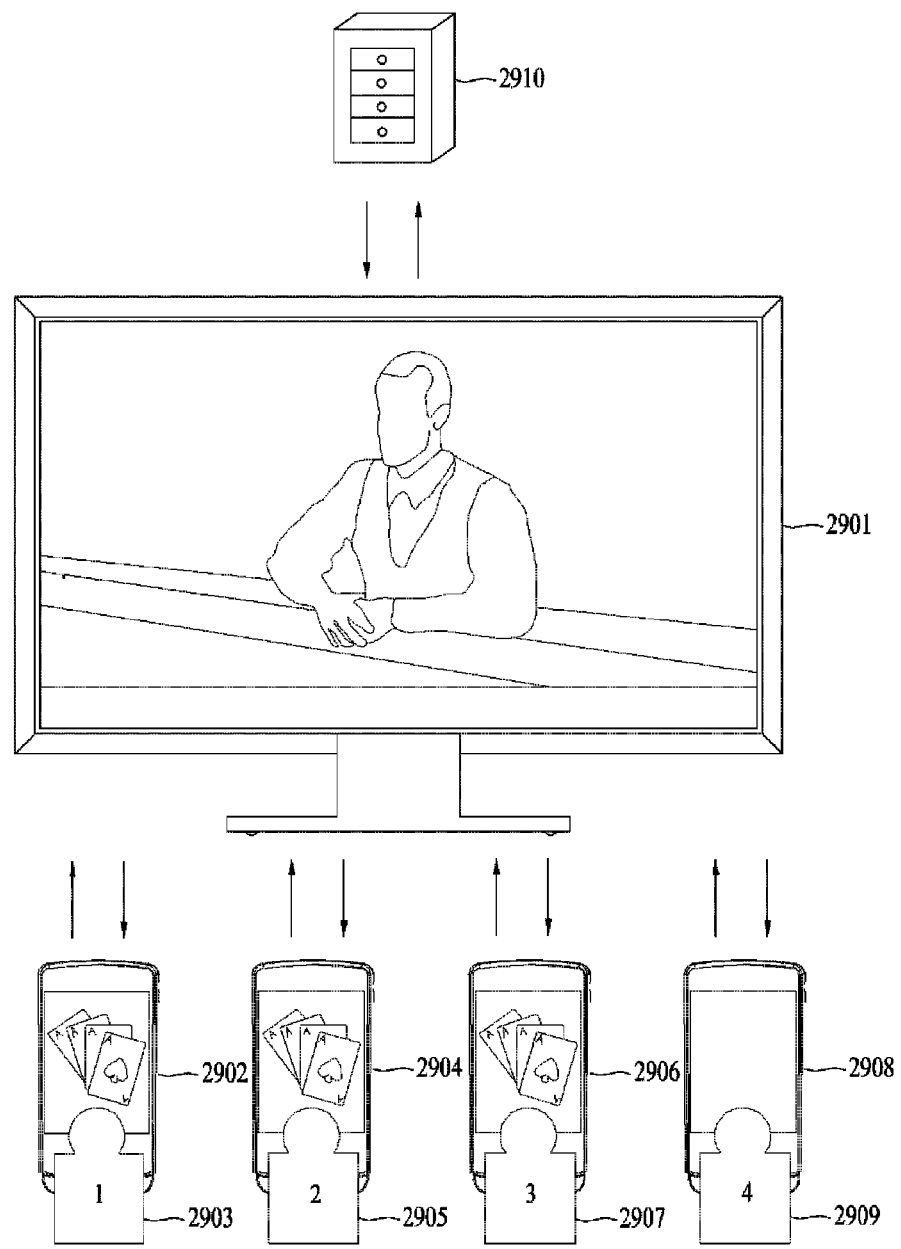
FIG. 29 is a diagram showing a game application provision system according to an embodiment of the present invention.

FIG. 29 is a diagram showing a game application provision system according to an embodiment of the present invention.

Referring to FIG. 29, an image display device 2901 outputs a screen for executing a game application and user terminals 2902, 2904 and 2906 selected as user controllers receive game play information according to player identifiers respectively assigned to the user terminals and output the game play information. The game play information is not output to the display of a user terminal 2908 which is not selected as the user controller.

The user terminal may transmit a touch recognition signal or a motion recognition signal of the user terminal to the image display device over a network and the image display device may receive the signal and execute the game application using the received signal.

Figure 30:
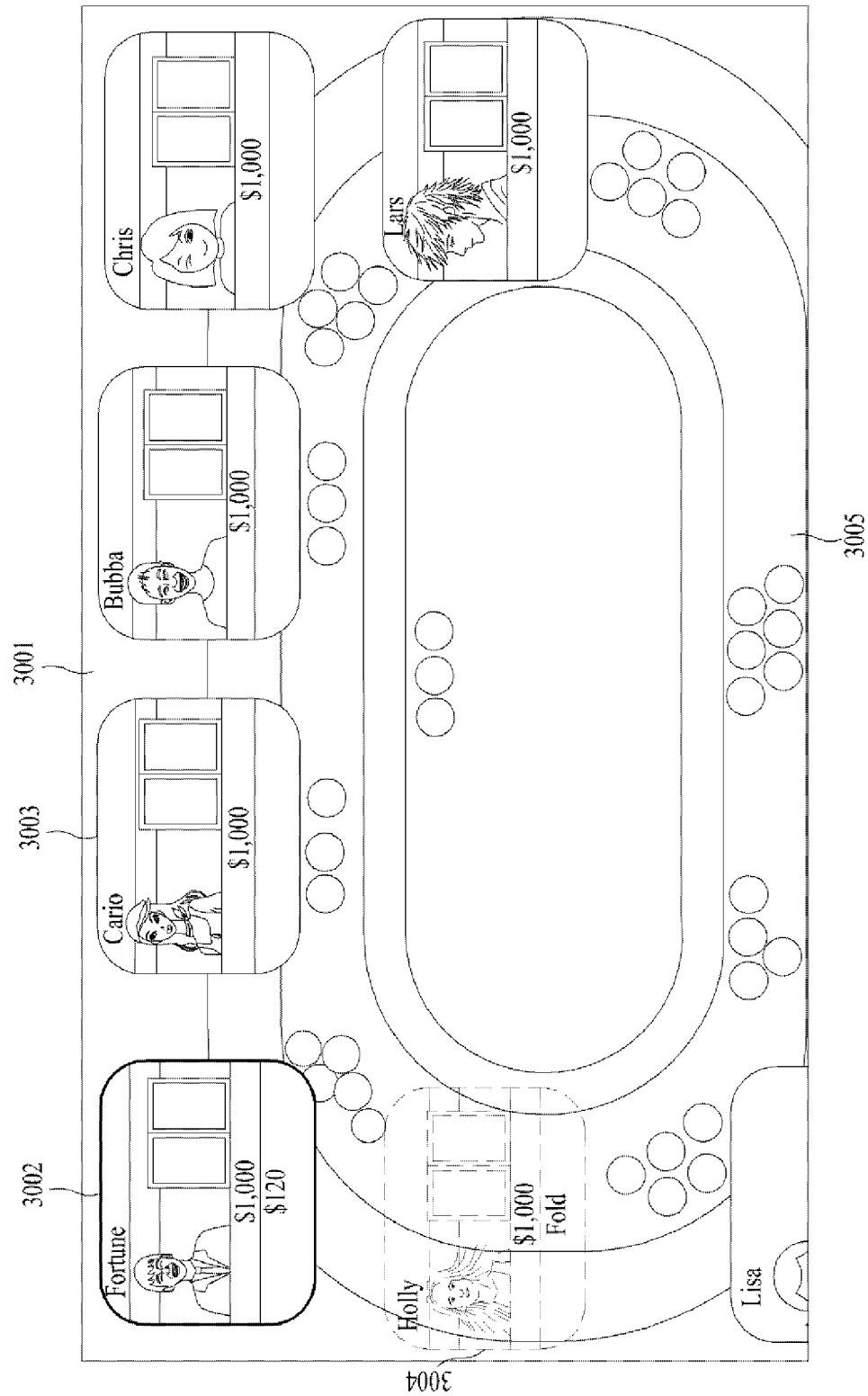
FIG. 30 is a diagram showing a game play screen according to an embodiment of the present invention.

In the embodiment, if the game application is a poker game application, the image display device 2901 may display a dealer and a game play screen shown in FIG. 30 on the display and the user terminal selected as the user controller may output hidden cards of each player on the display.

Each user may put the user terminal face down so as to fold or touch the display of the user terminal so as to perform a draw operation.

The image display device 2901 may transmit game play information of the game application to a predetermined server 2910 connected over a network. The game play information may include game score information, game win/loss information and win rate information.

The server 2910 may store the game play information received from the image display device and transmit the game play information to the image display device when a predetermined image display device requests game play information transmission. The server may include a CP server for providing the game application, a server for storing game play information, an SP server, etc.

In the embodiment of the present invention, different applications may be installed in a device functioning as a server and a device functioning as a controller.

That is, for example, if an image display device performs a game play process and a user terminal receives and transmits a user input to the image display device so as to play a game, all data of the game application may be stored in the image display device and only data for receiving the user input necessary to play the game and data for transmitting the received input to the image display device may be stored in the user terminal.

That is, in the embodiment of the present invention, the game application installed in the image display device may open a game room, generate a room ID and display the room ID, and may generate and display a game play screen when a user inputs the room ID to play the game. In addition, the game application installed in the image display device may assign a unique identifier to each user who plays the game.

That is, in the embodiment of the present invention, the game application installed in the user terminal may operate as the game controller with respect to the game played in the image display device. Accordingly, it is possible to receive the room ID used to play the game, transmit the received room ID to the image display device, display a card image on the display of the user terminal, and receive a user input so as to play the game.

Accordingly, the user can play the game using the data stored in the image display device and the user terminal.

In addition, even when the storage capacity of the user terminal is small, in the present invention, since the game application can be executed using a small amount of data, it is possible to efficiently utilize the storage capacity of the user terminal.

FIG. 30 is a diagram showing a game play screen according to an embodiment of the present invention.

More specifically, a user interface of a game play screen for player information and game play information in an image display device according to an embodiment of the present invention is shown.

The user interface 3001 of the game play screen may include player information and game play information of each user terminal.

In the embodiment, if the game application is a poker game application, the image display device may display information 3002 regarding a player whose turn it is in the game play screen 3001, information 3003 regarding another player playing the game, and information 3004 regarding a player who has folded. The information regarding each player may include information regarding a nickname of the player, the number of cards held by the player, the amount of money possessed by the player, and a stake of the player. In addition, open cards and game bet information of a game table 3005 may be further output.

In the embodiment, since the game play screen is output on the display of the image display device, all players can readily identify game play information.

Figure 31:
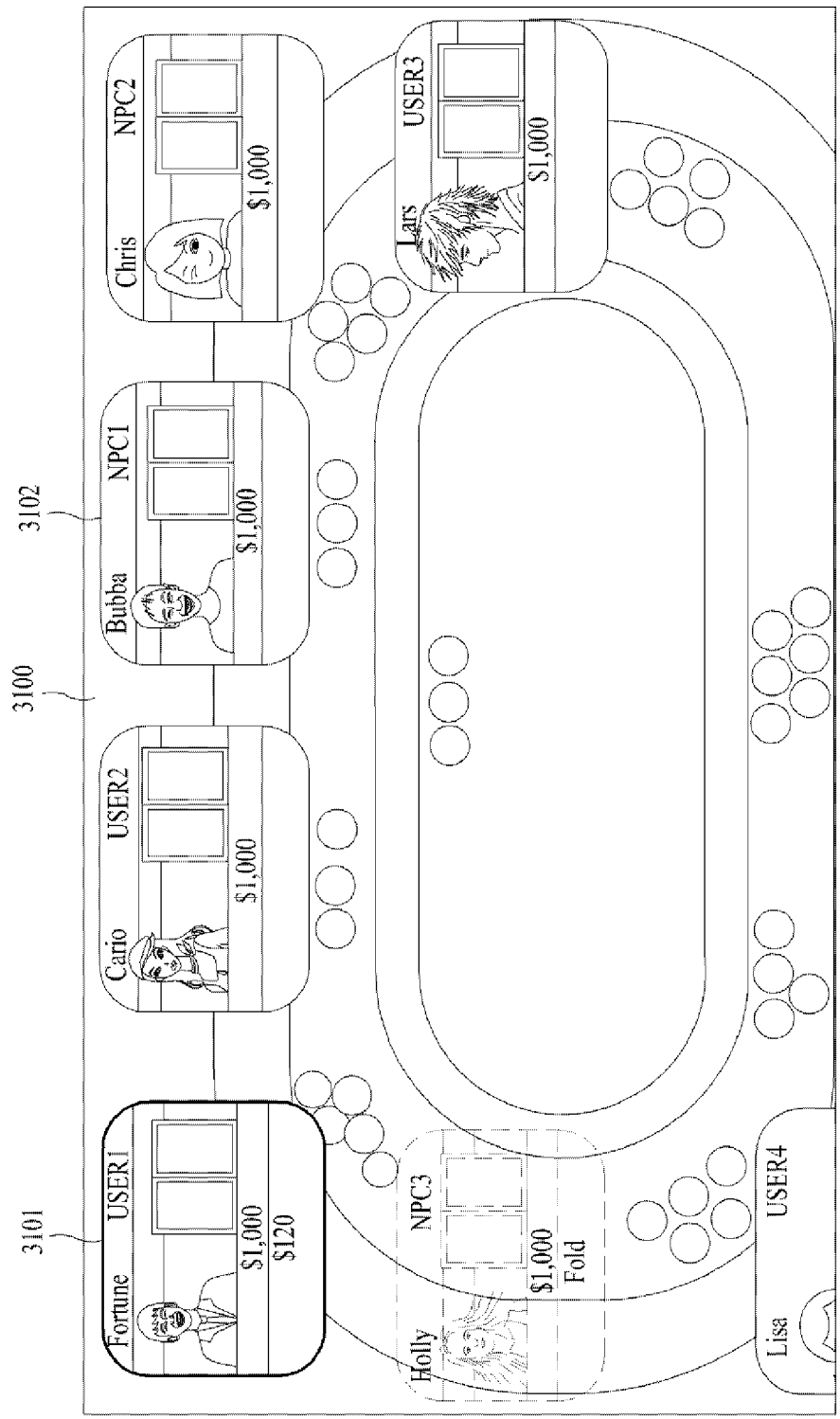
FIG. 31 is a diagram showing a game play screen according to another embodiment of the present invention.

FIG. 31 is a diagram showing a game play screen according to another embodiment of the present invention.

In the embodiment, an image display device can enable a plurality of game players to play a game using a game application, enable users to control a predetermined number of game players of the plurality of game players, and enable a controller of the image display device to control the other game players.

That is, some of the plurality of game players may include non-player characters (NPC). The NPC refers to a player who performs a game operation under the control of the controller of the image display device, not under the control of the user, among the players who play the game. Accordingly, if the NPC player is used, the user may play the game requiring a plurality of players alone.

Accordingly, the image display device may display a game player controlled by the user in a state of including an assigned player identifier "USER 1" 3101 and display an NPC player in a state of including an NPC identifier "NPC 1" 3102 on a game play screen 3100.

Therefore, the user can distinguish a player controlled by the user from a player controlled by the image display device.

FIG. 32 is a diagram showing a game play signal input method according to an embodiment of the present invention.

More specifically, an embodiment of recognizing a motion information signal of a user terminal and a touch input signal used as game play information in the user terminal is shown.

In the embodiment, in the case where a mobile terminal including a motion recognition sensor and a touch sensor is used as a game controller and a user places the mobile terminal face down (3201), the image display device receives motion information of the mobile terminal and determines that the user has folded. When the user does not input a command (3202), the image display device determines that the user continues to play the game and, when the user discards a card or bets a chip (3203), the image display device determines that the card is discarded or the stake is increased.

Using the above input method, the user can more intuitively and conveniently input the game play signal, thus providing a more immersive gaming experience.

Figure 33:
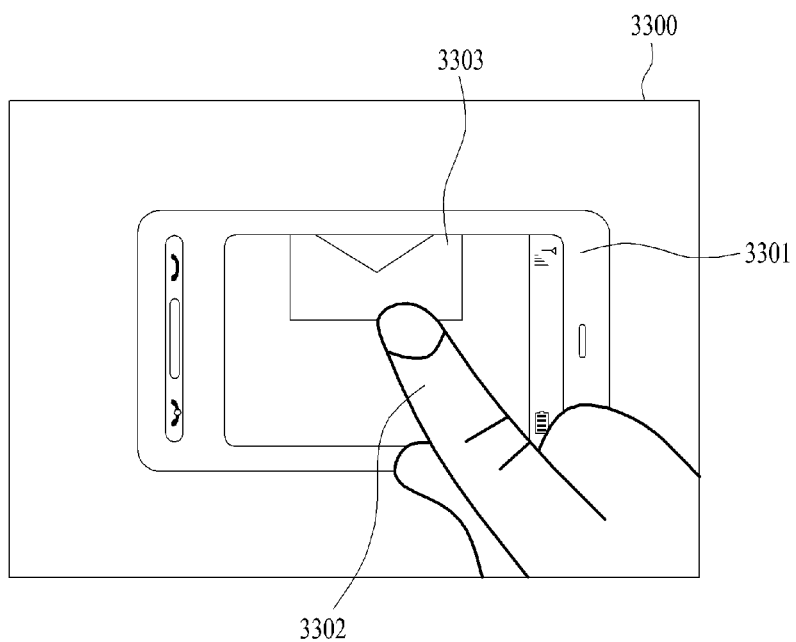
FIG. 33 is a diagram showing a game play signal input method according to another embodiment of the present invention.

FIG. 33 is a diagram showing a game play signal input method 3300 according to another embodiment of the present invention.

As described with reference to FIG. 32, the user may input a predetermined signal necessary to play a game using a touch sensor of a user terminal 3301.

That is, for example, a signal for pushing a card displayed on the user terminal is input so as to place the card face up.

In the embodiment, in order to prevent malfunction, a game play signal may be applied only when a specific input signal is input, not when a touch signal is input.

That is, for example, as shown in FIG. 33, in the case where the user performs an operation of pushing a card 3303 out on a touch pad of the user terminal 3301 using a finger 3302, it is recognized that the game play signal is input only when more than half of the card 3303 is pushed out on the screen of the touch pad.

The signal input through the user terminal is applied to the game only when a specific threshold is set and a signal exceeding the set threshold is input, such as when the finger 3302 of the user reaches an edge of the touch pad, when the card is pushed out by a predetermined length or a predetermined ratio, or when a signal is input by touching the touch pad with the finger 3302 of the user for a predetermined time or longer.

In another embodiment, the signal input through the finger 3302 of the user or another input means may be applied to the game when more than half of the displayed card image is pushed out or when the displayed card image continues to be touched with the finger 3302 of the user for 1 to 3 seconds or for a predetermined time.

Figure 34:
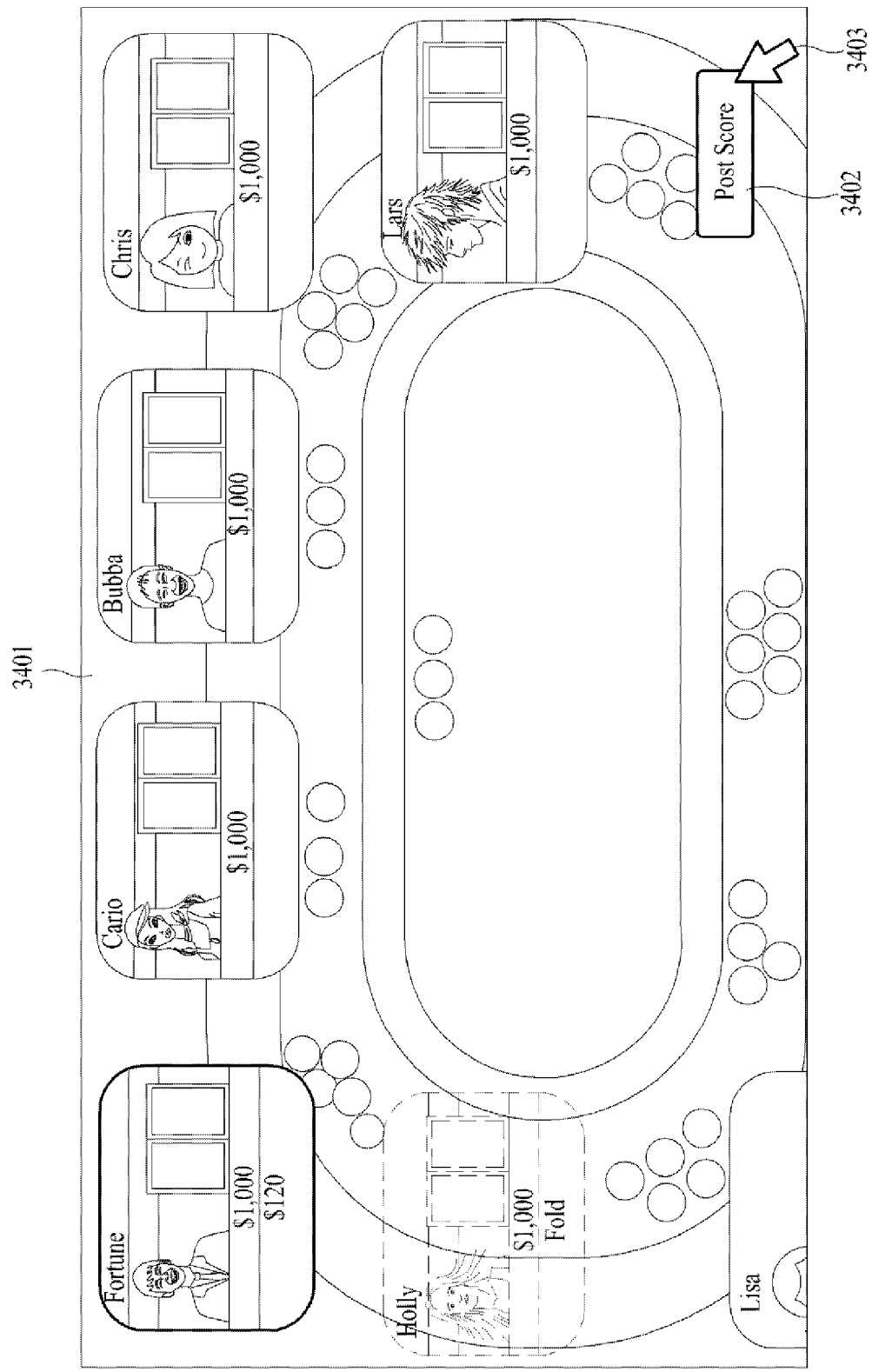
FIG. 34 is a diagram showing a game play screen including a game score update menu item according to another embodiment of the present invention.

FIG. 34 is a diagram showing a game play screen 3401 including a game score update menu item according to another embodiment of the present invention.

More specifically, a user interface for storing game play information in a server connected over a network in an image display device according to an embodiment of the present invention is shown.

The image display device may output a user interface including a menu item 3402 for uploading game play information to a predetermined server in the same user interface 3401 as the game play screen of FIG. 30 or 31.

If a user selects the upload menu item through a pointer input 3403 or a hot key input, the image display device may upload game play information including a win/loss information, stake information and winning rate information of the user to the predetermined server over the network.

FIG. 35 is a diagram showing a display screen 3501 including a game score board according to an embodiment of the present invention.

More specifically, a user interface including a menu item for setting game play information and a game play information notification function in an image display device according to one embodiment of the present invention is shown.

In the embodiment, the image display device may include a current game score of each user and ranking information according to a game score in a user interface 3501 including game play information. In addition, a highest ranked user may be displayed to be distinguished from the other users (3502).

The image display device may include a menu item 3503 for outputting a notification message of change information to a predetermined user if game play information is changed.

In the embodiment, the image display device may further include avatar image data, a recent access date, a winning rate, location information, etc. of each user in the game play information and output the game play information.

According to the present invention, it is possible to improve interest in and concern for the game play of the user.

Figure 36:
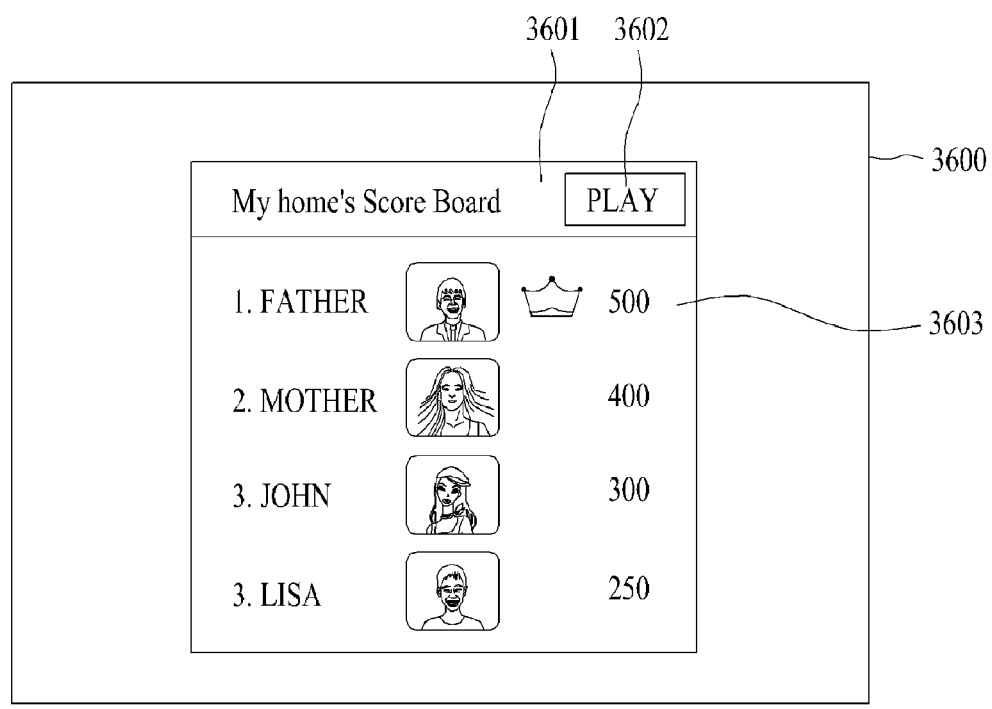
FIG. 36 is a diagram showing a display screen including a game score board according to another embodiment of the present invention.

FIG. 36 is a diagram showing a display screen 3600 including a game score board according to another embodiment of the present invention.

In the embodiment, the image display device may display a score board 3601 including only game score of users included in a specific group.

That is, for example, the image display device may display the score board 3601 including only the game score of the family members of home in which the image display device is located. Accordingly, the score board 3601 may deliver ranking information including only the game score 3603 of father, mother, John and Lisa, who are family members, to the user.

In the embodiment, image information including an avatar image of the user may be included. In addition, the user may check the game score and ranking through the score board 3601 and select a selection signal of a game play button 3602 so as to immediately switch the screen to a game play screen.

In another embodiment, the specific group may be a group including only family members as shown in FIG. 36, a group including company members, a group including school members, a group including people residing within a specific region, etc.

Figure 37:
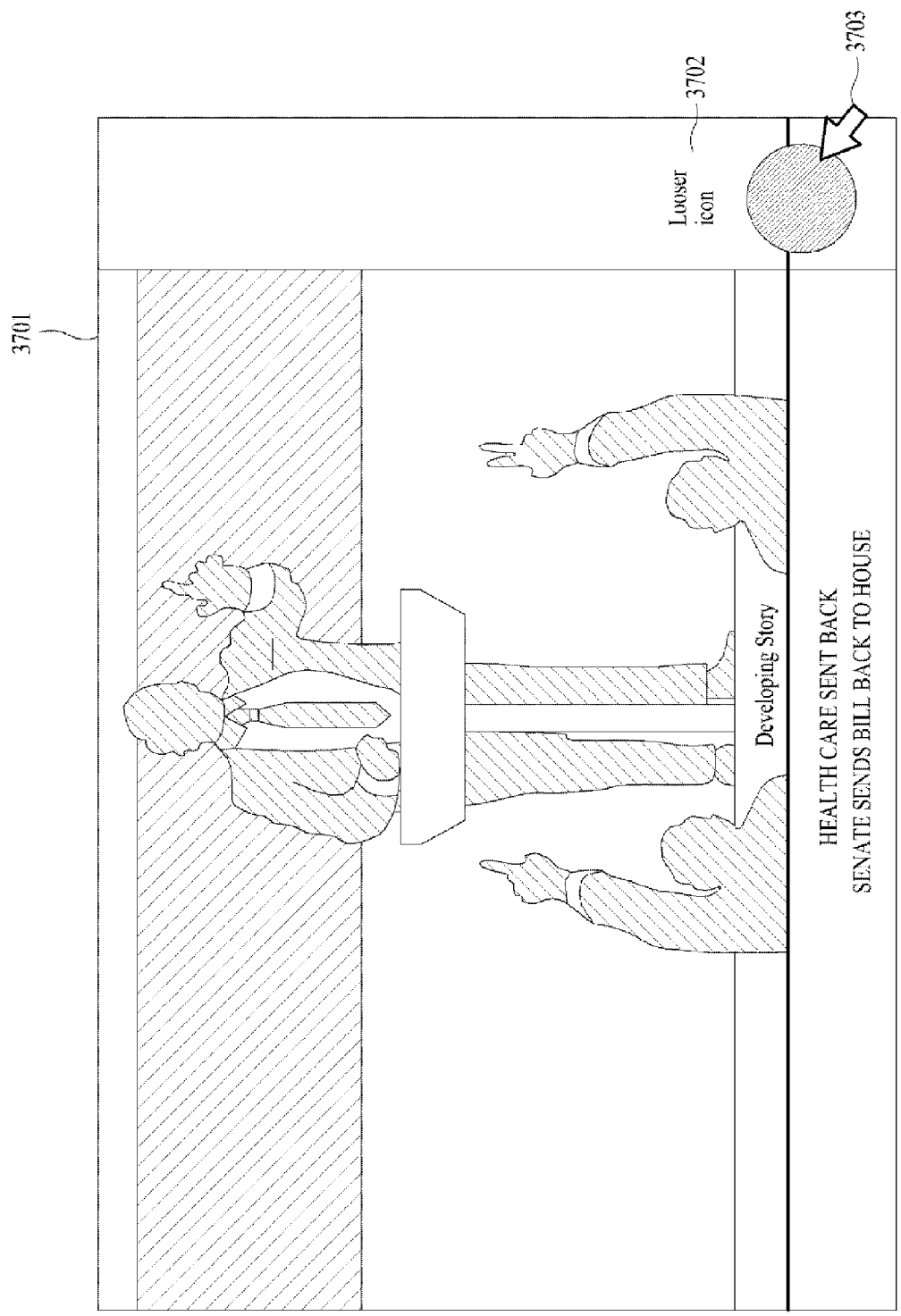
FIG. 37 is a diagram showing a display screen including a game score notification message according to an embodiment of the present invention.

FIG. 37 is a diagram showing a display screen 3701 including a game score notification message according to an embodiment of the present invention.

More specifically, a user interface 3701 for outputting a notification message while viewing a broadcast in an image display device according to one embodiment of the present invention is shown.

In the embodiment, the image display device may output a notification message 3702 in a predetermined region of the display of the image display device, even when a user views a broadcast, executes predetermined content, or execute another application through the image display device.

The notification message may include a predetermined character representing a user ranking change and image data representing the type of the game application.

In addition, if the user selects the notification message through a pointer input 3703 or a hot key input, a user interface including the game play information of FIG. 16 may be output to the display of the image display device.

Therefore, according to the present invention, it is possible to conveniently identify game play information even when the user performs another operation using the image display device.

Figure 38:
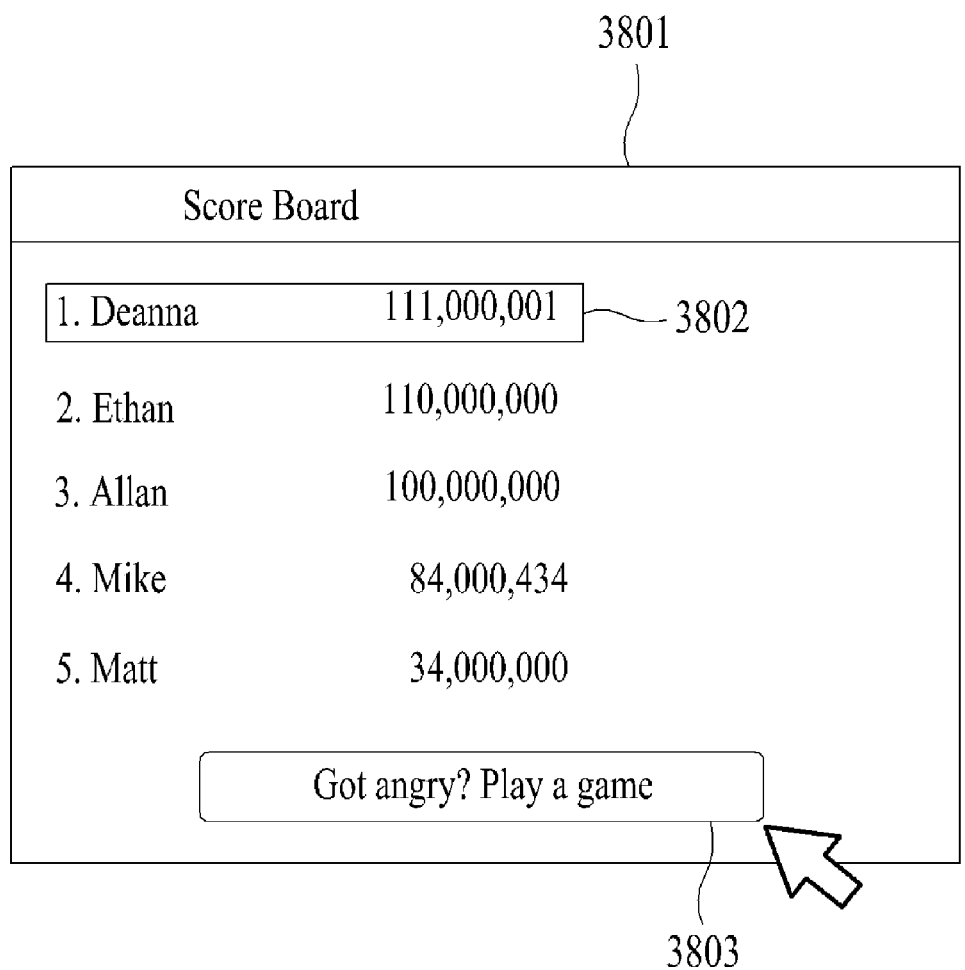
FIG. 38 is a diagram showing a display screen including a shortcut menu item of a game application according to an embodiment of the present invention.

FIG. 38 is a diagram showing a display screen 3801 including a shortcut menu item of a game application according to an embodiment of the present invention.

More specifically, a user interface 3801 including a shortcut menu of a game application and game play information in the image display device according to one embodiment of the present invention is shown.

In the embodiment, when the user selects the notification message in the user interface of FIG. 37, the image display device may output the user interface 3801. The user interface includes a shortcut menu item 3803 of the game application in addition to the information of FIG. 35.

Using the above user interface, the user can conveniently execute the game application.

The image display device and the method for operating the same according to the foregoing exemplary embodiments are not restricted to the exemplary embodiments set forth herein. Therefore, variations and combinations of the exemplary embodiments set forth herein may fall within the scope of the present invention.

The method for operating an image display device according to the foregoing exemplary embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

MODE FOR THE INVENTION

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention relates to a method of providing a game application through an image display device and a user terminal connected over a network and an image display device using the method. Therefore, the present invention has an industrial applicability.

The invention claimed is:

1. A method for controlling an image display device in a state where a game application is executed, the image display device is connected to at least one user terminal over a network and the game application is stored in a memory of the image display device, the method comprising:
   searching for one or more user terminals currently connected over the network;
   displaying a user interface including a list of the searched user terminals on a display;
   receiving a signal for selecting one or more user terminals from the list of the searched user terminals through the user interface;
   assigning a predetermined play identifier to the selected user terminal;

generating first game execution information and second game execution information which is different from the first game execution information;

transmitting the second game execution information to the selected user terminal; and displaying the first game execution information on the display.

2. The method according to claim 1, further comprising:
receiving a game mode selection signal;
opening a game room according to the selected game mode;
assigning a room ID to the opened game room;
receiving the room ID from the selected user terminal; and
assigning the player identifier to the selected user terminal.

3. The method according to claim 1, further comprising displaying a game play screen including player information corresponding to the user terminal to which the player identifier is assigned.

4. The method according to claim 1, further comprising:
receiving command signal from a touch sensor or motion controller; and controlling the game application based on the command signal.

5. The method according to claim 1, further comprising transmitting game play information of the game application to a server connected over the network.

6. An image display device in a state where a game application is executed, comprising:
a memory configured to store the game application;
a display configured to display a play screen of the game application;
a network interface configured to transmit or receive data to or from predetermined user terminals connected to the image display device over a network; and
a controller configured to search for one or more user terminals currently connected over the network, display a user interface including a list of the searched user terminals on the display, receive a signal for selecting one or more user terminals from the list of the searched user terminals through the user interface, assign a predetermined play identifier to the selected user terminal, generate first game execution information and second game execution information which is different from the first execution information, transmit the second game execution information corresponding to the predetermined player identifier assigned to the selected user terminals, display the first game execution information on the display and receive a game play signal from selected user terminals.

7. The image display device according to claim 6, wherein the controller receives a game mode selection signal, opens a game room according to the selected game mode, assigns a room ID to the opened game room, and assigns the predetermined player identifier to the selected user terminal.

8. The image display device according to claim 6, wherein the display displays a game play screen including player information corresponding to one or more user terminals to which the player identifier is assigned.

9. The image display device according to claim 6, wherein:
the network interface recognizes and receives at least one of a touch input signal detected by a touch sensor of each of the user terminals and a motion information signal detected by a motion recognition sensor of each of the user terminals, and
the controller determines the received signal as game play information and applies the game play information to the game application of the image display device.

10. The image display device according to claim 6, wherein the controller transmits game play information of the game application to a predetermined server connected over the network through the network interface.

11. An image display device for executing a game application, comprising:
a memory configured to store the game application;
a display configured to display a play screen of the game application;
a network interface configured to transmit or receive data to or from a predetermined server; and
a controller configured to output a notification message in a predetermined region of the display if change information of game play information is received from the server and display a score board including the game play information on the display if a game play information call signal is input through a user interface,
wherein the score board includes a shortcut menu for executing the game application when a signal for selecting shortcut menu is input through the user interface.

12. The image display device according to claim 11, wherein the controller outputs the notification message only when setting a notification mode of the game play information.

13. The image display device according to claim 11, wherein the controller displays the notification message only when user ranking information is changed according to the received change information of the game play information.

14. The image display device according to claim 11, wherein the controller displays the score board including only ranking information and score information of users included in a specific group.

* * * * *